(12) United States Patent
Olsson et al.

(10) Patent No.: US 9,690,390 B2
(45) Date of Patent: Jun. 27, 2017

(54) USER INTERFACE DEVICES

(71) Applicants: Mark S. Olsson, La Jolla, CA (US); David A. Cox, San Diego, CA (US)

(72) Inventors: Mark S. Olsson, La Jolla, CA (US); David A. Cox, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 521 days.

(21) Appl. No.: 14/281,761

(22) Filed: May 19, 2014

(65) Prior Publication Data
US 2014/0340372 A1    Nov. 20, 2014

Related U.S. Application Data

(60) Provisional application No. 61/824,965, filed on May 17, 2013.

(51) Int. Cl.
| | | |
|---|---|---|
| *G06F 3/033* | (2013.01) | |
| *G06F 3/02* | (2006.01) | |
| *G06F 3/01* | (2006.01) | |
| *G06F 3/0338* | (2013.01) | |

(52) U.S. Cl.
CPC ............ *G06F 3/0202* (2013.01); *G06F 3/016* (2013.01); *G06F 3/0338* (2013.01)

(58) Field of Classification Search
CPC ..................................................... G06F 3/0202
USPC ......................................................... 345/184
See application file for complete search history.

(56) References Cited

U.S. PATENT DOCUMENTS

| | | | |
|---|---|---|---|
| 3,112,464 A | 11/1963 | Ratajaski | |
| 3,170,323 A | 2/1965 | Kurt | |
| 3,331,971 A | 7/1967 | Moller | |
| 3,764,779 A | 10/1973 | Kadoya | |
| 3,980,808 A | 9/1976 | Kikuchi | |
| 4,107,604 A | 8/1978 | Bernier | |
| 4,161,726 A | 7/1979 | Burson | |
| 4,216,467 A | 8/1980 | Colston | |
| 4,293,837 A | 10/1981 | Jaffe | |
| 4,348,142 A | 9/1982 | Figour | |

(Continued)

FOREIGN PATENT DOCUMENTS

| | | |
|---|---|---|
| DE | 19501439 | 9/1996 |
| DE | 19806611 | 8/1999 |

(Continued)

OTHER PUBLICATIONS

Melexis Microelectronic Integrated Systems, Product Information on Absolute Position Sensor IC, MLX90333.

(Continued)

*Primary Examiner* — Jason Olson
(74) *Attorney, Agent, or Firm* — Steven C. Tietsworth, Esq.

(57) ABSTRACT

User interface devices (UIDs) for sensing position or motion of an actuator assembly in multiple degrees of freedom are disclosed. In one embodiment a UID includes a frame having a top and bottom assembly, an actuator assembly disposed within a volume between the top and bottom of the frame having magnets disposed therein, a sensor array for sensing magnetic fields from the magnets in multiple axes, and a processing element for receiving the sensed magnet fields and generating a UID output signal corresponding to a position, translation, rotation, deformation, or other action of the actuator assembly.

29 Claims, 41 Drawing Sheets

(56) References Cited

U.S. PATENT DOCUMENTS

| | | |
|---|---|---|
| 4,459,578 A | 7/1984 | Sava |
| 4,489,303 A | 12/1984 | Martin |
| 4,500,867 A | 2/1985 | Ishitobo |
| 4,651,558 A | 3/1987 | Martin |
| 4,733,214 A | 3/1988 | Andresen |
| 4,774,458 A | 9/1988 | Aronoff |
| 4,785,180 A | 11/1988 | Dietrich |
| 4,825,157 A | 4/1989 | Milkan |
| 4,853,630 A | 8/1989 | Houston |
| 4,879,556 A | 11/1989 | Duimel |
| 4,998,182 A | 3/1991 | Krauter |
| 5,045,842 A | 9/1991 | Galvin |
| 5,146,566 A | 9/1992 | Hollis, Jr. |
| 5,160,918 A | 11/1992 | Saposnik |
| 5,168,221 A | 12/1992 | Houston |
| 5,450,054 A | 9/1995 | Schmersal |
| 5,504,502 A | 4/1996 | Arita |
| 5,525,901 A | 6/1996 | Clymer |
| 5,565,891 A | 10/1996 | Armstrong |
| 5,598,090 A | 1/1997 | Baker |
| 5,619,195 A | 4/1997 | Allen |
| 5,670,987 A | 9/1997 | Doi |
| 5,687,080 A * | 11/1997 | Hoyt ............... G05G 9/047 345/161 |
| 5,706,027 A | 1/1998 | Hilton |
| 5,749,577 A | 5/1998 | Couch |
| 5,767,840 A | 6/1998 | Selker |
| 5,831,554 A | 11/1998 | Hedayat |
| 5,831,596 A | 11/1998 | Marshall |
| 5,850,142 A | 12/1998 | Rountos |
| 5,939,679 A | 8/1999 | Olsson |
| 5,959,863 A | 9/1999 | Hoyt |
| 6,002,184 A | 12/1999 | Delson |
| 6,129,527 A | 10/2000 | Donahoe |
| 6,144,125 A | 11/2000 | Birkestrand |
| 6,225,980 B1 | 5/2001 | Weiss |
| 6,329,812 B1 | 12/2001 | Sundin |
| 6,333,734 B1 | 12/2001 | Rein |
| 6,462,731 B1 | 10/2002 | Stoffers |
| 6,501,458 B2 | 12/2002 | Baker |
| 6,550,346 B2 | 4/2003 | Gombert |
| 6,573,709 B1 | 6/2003 | Gandel |
| 6,593,729 B2 | 7/2003 | Sundin |
| 6,597,347 B1 | 7/2003 | Yasutake |
| 6,606,085 B1 * | 8/2003 | Endo ............... G05G 9/04796 345/159 |
| 6,707,446 B2 | 3/2004 | Nakamura |
| 6,727,889 B2 | 4/2004 | Shaw |
| 6,738,043 B2 * | 5/2004 | Endo ............... G06F 3/0338 324/207.13 |
| 6,753,519 B2 | 6/2004 | Gombert |
| 6,762,748 B2 | 7/2004 | Maatta |
| 6,804,012 B2 | 10/2004 | Gombert |
| 6,822,635 B2 | 11/2004 | Shahoian |
| 6,831,679 B1 | 12/2004 | Olsson |
| 6,879,316 B2 | 4/2005 | Kehlstadt |
| 6,891,526 B2 | 5/2005 | Gombert |
| 6,925,975 B2 | 8/2005 | Ozawa |
| 6,928,886 B2 | 8/2005 | Meusel |
| 7,084,856 B2 | 8/2006 | Huppi |
| 7,148,880 B2 | 12/2006 | Magara |
| 7,151,526 B2 | 12/2006 | Endo |
| 7,164,412 B2 | 1/2007 | Kao |
| 7,233,318 B1 | 6/2007 | Farag |
| 7,474,296 B2 | 1/2009 | Obermeyer |
| 7,552,541 B2 | 6/2009 | Sakuri |
| 7,733,327 B2 | 6/2010 | Harley |
| 7,737,945 B2 | 6/2010 | West |
| 7,800,581 B2 | 9/2010 | Lye |
| 7,825,903 B2 | 11/2010 | Anastas |
| 7,958,782 B2 | 6/2011 | Le |
| 7,978,175 B2 | 7/2011 | Orsley |
| 8,089,039 B2 | 1/2012 | Pascucci |
| 8,100,030 B2 | 1/2012 | Koschke |
| 8,139,033 B2 | 3/2012 | Yamamoto |
| 8,274,358 B2 | 9/2012 | Ando |
| 8,289,385 B2 | 10/2012 | Olsson |
| 8,497,767 B2 | 7/2013 | Hollis, Jr. |
| 2002/0033795 A1 | 3/2002 | Shahoian |
| 2003/0107551 A1 | 6/2003 | Dunker |
| 2006/0256075 A1 | 11/2006 | Anastas |
| 2007/0182842 A1 | 8/2007 | Sonnenschein |
| 2007/0216650 A1 | 9/2007 | Frohlich |
| 2007/0262959 A1 | 11/2007 | Gu |
| 2008/0001919 A1 | 1/2008 | Pascucci |
| 2008/0174550 A1 | 7/2008 | Laurila |
| 2008/0290821 A1 | 11/2008 | Brandt |
| 2009/0025094 A1 | 1/2009 | York |
| 2009/0058802 A1 | 3/2009 | Orsley |
| 2009/0071808 A1 | 3/2009 | Kang |
| 2009/0115749 A1 | 5/2009 | Kim |
| 2010/0265176 A1 * | 10/2010 | Olsson ............... G05G 5/05 345/161 |
| 2011/0050405 A1 | 3/2011 | Hollis, Jr. |
| 2012/0169595 A1 * | 7/2012 | Nien ............... G06F 3/0362 345/158 |

FOREIGN PATENT DOCUMENTS

| | | |
|---|---|---|
| EP | 0628976 | 12/1994 |
| EP | 0982646 | 3/2000 |
| EP | 1193643 | 4/2002 |
| EP | 1953621 | 6/2008 |
| EP | PCT/IB10/01039 | 10/2011 |
| EP | PCT/US11/37069 | 11/2012 |
| EP | PCT/US11/48535 | 2/2013 |
| EP | PCT/US11/56039 | 4/2013 |
| EP | PCT/US11/59835 | 5/2013 |
| EP | PCT/US11/63186 | 6/2013 |
| EP | PCT/US14/38656 | 11/2015 |
| JP | 03036946 | 2/1991 |
| WO | WO 01/69343 | 9/2001 |

OTHER PUBLICATIONS

Tietsworth, Steven C., Response to Non-Final Office Action and Amendment (dated Jan. 7, 2012), regarding Magnetic Manual User Interface Devices, U.S. Appl. No. 12/756,068.

* cited by examiner

USER INTERFACE DEVICES

CROSS-REFERENCE TO RELATED APPLICATIONS

This application claims priority under 35 U.S.C. §119(e) to U.S. Provisional Patent Application Ser. No. 61/824,965, entitled DUAL SPRING MAGNETICALLY SENSED USER INTERFACE DEVICES, Filed May 17, 2013, the content of which is incorporated by reference herein in its entirety for all purposes.

FIELD

This disclosure relates generally to user interface devices for use with computers, gaming systems, control systems, and other electronic computing devices and systems or associated equipment. More specifically, but not exclusively, the disclosure relates to magnetically sensed user interface apparatus, devices, and systems using magnets and multi-axis magnetic sensors to determine user-applied actuator positions, displacements and/or deformations in multiple dimensions and degrees of freedom.

BACKGROUND

The use of devices to interface with computers, gaming systems, control systems, and other electronic devices and systems has become an everyday occurrence, as has the use of computer-based interface devices with equipment such as construction equipment, vehicles, and other systems. Many existing user interface devices are designed to work with two degrees of freedom. However, such interface devices fail to efficiently handle scenarios where more than two degrees of freedom need to be sensed and/or controlled. Some existing user interface devices may be capable of controlling additional degrees of freedom; however, these fail to address ergonomic factors, resolution of the device, and/or have other deficiencies.

Accordingly, there is a need in the art to address the above-described as well as other problems.

SUMMARY

This disclosure relates generally to user interface devices for use with computers, gaming systems, control systems, and other electronic computing devices and systems or associated equipment. More specifically, but not exclusively, the disclosure relates to magnetically sensed user interface apparatus, devices, and systems using magnets and multi-axis magnetic sensors to determine user-applied actuator positions, displacements and/or deformations in multiple dimensions and degrees of freedom.

In one aspect, a user interface device may include a frame having a top and bottom in a fixed position relative to each other, an actuator assembly positioned in a volume between the top and bottom of the frame, and a sensor array and processing element to provide an indication of position or displacement of the actuator element from a released state position in two or more dimensions and provide a UID output signal to an external electronic computing device or system.

In another aspect, the actuator may include an outer actuator element may including one or more magnets, and the sensor array may include magnetic sensors disposed on a printed circuit board element or other element coupled to the frame. The magnets may be ferromagnets and the magnetic sensors may be, for instance, magnetic compass or Hall-Effect sensors for sensing magnetic fields in three orthogonal axes. The actuator may include haptic feedback elements such as vibrational motors, piezoelectric devices, and the like.

In another aspect, a user interface device may include a fixed base and top assembly. Such a fixed base and top assembly may provide an ergonomic advantage in providing space for the user's hand to rest when the device is in use. The actuator assembly element may be positioned circumferentially about the fixed base and top assembly. The actuator element may displaceable in tilting, side-to-side, front-to-back, up-and-down, and rotations and permutations of each of these displacements. The actuator element may further be pliant and flexible, thereby allowing a squeeze-type or deformation displacement of the actuator assembly or components of the actuator assembly.

In another aspect, a top assembly of the user interface device may include one or more buttons, a scroll wheel, and/or a touchpad. The top assembly may further include lights or light tubes through which LED or other optical outputs are provided. The top assembly may further include other sensors and/or audible or visual output elements such as speakers, microphones, and the like.

In another aspect, a user interface device may include spring arrays which may be configured with radially oriented springs that may secure and allow displacements of the actuator element relative to the fixed base and top assembly of the frame. Multiple concentric assemblies of radially oriented springs, such as in a triple or higher order spring assembly, may also be used to provide a greater range of motion. The springs may be coupled to an outer actuator element, one or more inner actuator elements, and to the frame or to a core join or other element coupled to the frame.

In another aspect, the magnets or other displacement elements and paired magnetic sensor or sensing elements may be equally spaced about or near to the periphery of the device, such as just within the circumference in an equidistant circular array when the device is in a released state. In embodiments utilizing magnets and magnetic sensors, the magnets may be fixed such that neighboring ones of the magnets may be oriented with alternating polarity facing the magnet's corresponding magnetic sensor. In other embodiments utilizing magnets and magnetic sensors, the polarity of the magnets may all be oriented in the same direction. The sensor outputs may be provided to a processing element or elements to generate a UID output signal.

In another aspect, one or more vibration motors may be positioned within a user interface device to provide haptic feedback to the user. A vibration motor may, for instance, be positioned at the base of each spring or elsewhere on an actuator assembly or frame. In such embodiments, the spring may comprise, for example, tin plated wire or other conductive material suitable to manufacturing a spring in a coil spring configuration, and be further used to electrical connect the vibration motors. Furthermore, multiple vibration motors may be controlled in timing, intensity, frequency, and/or direction, thereby providing unique haptic feedback to the user. The haptic feedback may be controlled by a processing element of the UID.

In another aspect, one or more proximity sensors may be included in a UID to enable detection of the presence of a user's hand. In such embodiments, the detected presence of a user's hand may be used to change the state of a user interface device in keeping with the present disclosure from a "released" to a "displaced" state, or vice-versa. In a released state the UID may be operated in a low power mode, such as when operating on battery power. An initialization procedure may be implemented whereby a measurement of each magnet during the last recorded "released" state may be used as a basis to calculate future displacements of each magnet that may result from displacements of the actuator.

In another aspect, a magnetically sensed user interface device may be integrated into a control system or other electronic computing system or be connected with a computing system such as a personal computer or laptop or a control system of a vehicle or machinery or heavy equipment. Both wired, such as with the use of a flat USB cable or other wired interface, and/or wireless interfaces, such as Bluetooth or other wireless interfaces, may be used to connect a user interface device in accordance with the present disclosure with such computing systems.

In another aspect, the disclosure relates to a user interface device (UID). The UID may include, for example, a frame including a base assembly and a top assembly. The top assembly may be in a fixed position relative to the base assembly. The UID may further include an actuator assembly. The actuator assembly may be disposed between the top assembly and the base assembly. The actuator assembly may be disposed in a volume between the top assembly and the base assembly with the UID. The UID may include a grip cover or boot to cover the actuator assembly and/or all or portions of the frame. The actuator assembly may include one or more actuator elements and a plurality of springs mechanically coupling the one or more actuator elements to the frame. The UID may further include a plurality of sensors disposed within the frame between the top assembly and the base assembly. The sensors may sense positional information associated with the actuator assembly, and provide one or more sensor output signals corresponding to the sensed positional information. The sensor output signals may be provided to one or more processing elements. The one or more processing elements may generate UID output signals to be provided to a communicatively coupled electronic computing device or system.

In another aspect, the disclosure is directed to a user interface device (UID). The user interface device may include, for example, a frame including a base assembly and a top assembly. The top assembly may be in a fixed position relative to the base assembly. The UID may further include an actuator assembly. The actuator assembly may be disposed between the top assembly and the base assembly. The actuator assembly may include an outer actuator element having a cylindrical shape, an inner actuator element, an outer spring array including a plurality of springs mechanically coupling the outer actuator element to the inner actuator element, an inner spring array including a plurality of springs mechanically coupling the inner actuator element to the frame or to an element coupled to the frame, and a plurality of magnets disposed on the outer actuator element in an equidistant circular array. The inner actuator element may have a triangular shape. The UID may further include a printed circuit board having a processing element and a plurality of multi-axis magnetic sensors. The printed circuit board may be disposed within the frame between the top assembly and the base assembly for sensing positional information associated with ones of the plurality of magnets and providing one or more sensor output signals corresponding to the sensed positional information to the processing element. The processing element may generate a UID output signal corresponding to a position, movement, displacement or deformation of the actuator assembly based at least in part on the multi-axis magnetic sensor outputs.

In another aspect, the disclosure relates to a method of providing a user interface device (UID) output signal to an electronic computing device or system. The method may include, for example, sensing, at a plurality of sensors, positional information associated with corresponding sensed elements disposed on an actuator element of the UID. The method may further include providing a plurality of sensor output signals to a processing element. The method may further include generating, in the processing element, based at least in part on the received plurality of sensor output signals, a UID output signal corresponding to a position, translation, displacement or deformation of the actuator assembly. The method may further include providing the UID output signal to a communicatively coupled electronic computing device or system. The sensors may, for example, be multi-axis magnetic field sensors. The sensed elements may be magnets.

In another aspect, the disclosure relates to a non-transitory processor-readable medium. The medium may include instructions for causing a processing element to implement or control a stages of receiving a plurality of sensor output signals from multi-axis sensors corresponding to sensed position, translation, displacement, or deformation of an actuator assembly, generating, based at least in part on the received plurality of sensor output signals, a UID output signal corresponding to a position, translation, displacement or deformation of the actuator assembly, and providing the UID output signal to a communicatively coupled electronic computing device or system. The sensors may be multi-axis magnetic field sensors for sensing positions of magnets disposed on the actuator assembly.

In another aspect, the disclosure relates to methods for performing operating functions in UIDs such as those disclosed herein, in whole or in part.

In another aspect, the disclosure relates to processor readable media including instructions for implementing methods and functions associated with the user interface devices described herein, in whole or in part.

In another aspect, the disclosure relates to means for implementing the UID devices and functions described herein, in whole or in part.

Various additional aspects, features, devices, systems, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Terminology

Figure 1:
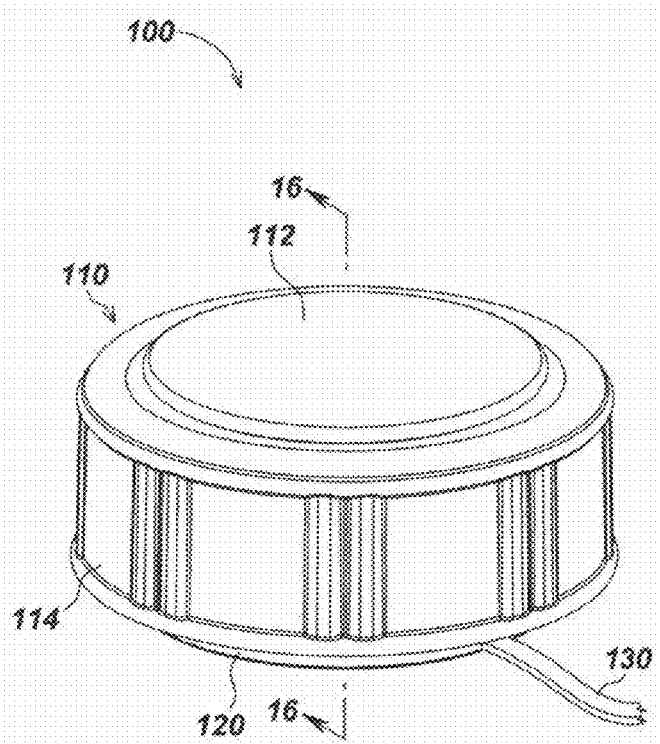
FIG. 1 is a front isometric view of one user interface device embodiment in accordance with aspects of the present disclosure.

As used herein, the term "permanent magnet" refers to any device or object that is magnetized and creates its own persistent magnetic field. Permanent magnets may comprise ferrous materials or other materials. For example, suitable ferromagnetic materials for a permanent magnet include iron, nickel, cobalt, rare earth metals and their alloys, e.g. Alnico and Neodymium, as well as other ferromagnetic materials known or developed in the art. Permanent magnets may also be made of powderized ferromagnetic material held together with an organic binder or with other materials known or developed in the art that exhibit persistent magnetic fields. Further, while exemplary embodiments detailed subsequently herein are described using permanent magnets for magnetic field generation in conjunction with magnetic sensors, some alternate embodiments may use "electromagnets," which are objects that generate magnetic fields in response to an applied electrical current, typically through a corresponding coil, in addition to or in place of permanent magnets. Such embodiments may also include corresponding electronic circuitry for generating the currents to control operation of the electromagnets, as well as power supplies and the like. Other embodiments may alternately use other sensor elements and types, such as optical, acoustic, or other sensing technologies known or developed in the art to sense position or displacement of the actuator (and its corresponding elements) relative to the base.

The term "released state" as used herein describes a device state in which no operator-initiated forces are acting upon an actuator of the UID (typically a magnetically-sensed actuator) besides those which are inherently an aspect of the structure of the device or system itself and/or are naturally occurring, such as from gravity or other naturally occurring or environmentally occurring forces. The released state orientation of various elements of a UID as described herein may vary depending on the relative orientation of the device with respect to applied forces (e.g., whether the device is oriented right-side up or upside-down or at an angle relative to the Earth's gravity or to other forces such as wind forces, etc.) due to spring softness and other mechanical features of the UID. In some embodiments, calibration functions or sensing functions may be implemented or assisted by knowing the released state orientation of elements of the UID in various orientations and calibrating these out or compensating for them in signal processing in one or more processing elements within the UID or external to the UID.

The terms "electronic computing device" and "electronic computing system" as used herein refers to any device or system that can be operated or controlled by electrical, optical, or other outputs from a user interface device such as the various UID embodiments described herein. Examples of an electronic computing system include, but are not limited to; personal computers, notebook or laptop computers, video game systems, simulators, robotic devices, personal digital assistants (PDAs), cellular phones, computer tablet devices, graphical art systems such as computer aided design systems, monitoring and control systems, remote systems, remotely controlled vehicles, construction equipment such as cranes, shovels, backhoes, bulldozers, loaders, and the like, manned vehicles (e.g., cars, buses, trains, airplanes, boats, etc.), drones or unmanned aerial vehicles (UAVs) or other terrestrial, airborne, or marine vehicles, and/or other similar systems or devices that receive user inputs and perform operations involving processing the received inputs to generate data or information, display or store the data or information, generate or control electronic or mechanical outputs, send data or information, or otherwise use UID output signals received from the UID to perform some function or operation. Electronic computing devices or systems may also be modules or subsystems of larger devices or systems, such as control systems for mechanical arms or shovels on electronic construction equipment or controllers for UAVs or other vehicles.

The term "spring" as used herein refers to a resilient elastic device for stretching, exerting tension, and/or absorbing movement that can be pressed, twisted, and/or pulled to at least some degree in one or more axes but then returns to its initial or former shape upon release. Example springs as described herein are typically in the form of a metal coil or helix formed from wire or ribbon of spring steel or piano wire, but can alternately be made of plastic, rubber, or other materials having similar spring-action properties and/or can be of other shapes such as bands, leaves, bows, and the like.

In certain additional embodiments, a UID in accordance with the aspects described herein may alternately be used as a sensor device without need for specific user input. For example, due to the high potential multiple-axis movement sensitivity of UID embodiments in accordance with the aspects described herein, such a UID may be used to sense motion or vibration, such as in the form of an earthquake or seismic sensor, or in a machine such as an engine to monitor vibration and generate corresponding output signal corresponding to the time or frequency domains. Accordingly, an electronic system as used herein may also be a system for monitoring a physical parameter (e.g., motion or vibration) independent of specific user-applied inputs (e.g., as would be provided by a user when interfacing with a desktop computer or computer-aided-design CAD system in a fashion corresponding to that of a standard joystick or computer mouse).

The terms "displace" and "displacement," as used herein in reference to the interface device elements such as actuators and permanent magnets (or other sensor elements such as acoustic or optical elements), refers to various manual movements thereof (relative to the base and top) from a neutral or released state position, including, but not limited to, lateral movements of the actuator along the X and Y axes, vertical movements along the Z axis, tilting, rotation, squeeze and/or actuator deformation movements, and permutations and combinations thereof. The same definition refers to movement of the magnetic or other sensors in a converse arrangement where the sensors are coupled to the actuator and move adjacent to stationary corresponding permanent magnets or electromagnets or other similar or equivalent elements.

As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Overview

This disclosure relates generally to user interface devices for use with computers, gaming systems, control systems, and other electronic computing devices and systems or associated equipment. More specifically, but not exclusively, the disclosure relates to magnetically sensed user interface apparatus, devices, and systems using magnets and multi-axis magnetic sensors to determine user-applied actuator positions, displacements and/or deformations in multiple dimensions and degrees of freedom.

Additional details of user interface devices that may be used in embodiments in conjunction with the disclosures herein are described in co-assigned patent applications including U.S. patent application Ser. No. 12/756,068, filed on Apr. 7, 2010, entitled MAGNETIC MANUAL USER INTERFACE DEVICES, U.S. patent application Ser. No. 13/110,910, filed May 18, 2010, entitled USER INTERFACE DEVICES, APPARATUS, AND METHODS, U.S. patent application Ser. No. 13/590,099, filed Aug. 20, 2011, entitled MAGNETIC SENSING USER INTERFACE DEVICE METHODS AND APPARATUS USING ELECTROMAGNETS AND ASSOCIATED MAGNETIC SENSORS, U.S. patent application Ser. No. 13/272,172, filed Oct. 12, 2011, entitled MAGNETIC THUMBSTICK DEVICES, U.S. patent application Ser. No. 13/292,038, filed Nov. 8, 2011, entitled SLIM PROFILE MAGNETIC USER INTERFACE DEVICES, and U.S. patent application Ser. No. 13/310,670, filed Dec. 2, 2011, entitled MAGNETICALLY SENSED USER INTERFACE APPARATUS AND DEVICES. The content of each of these applications is hereby incorporated by reference herein in its entirety.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

This disclosure relates generally to user interface devices for use with computers, gaming systems, control systems, and other electronic computing devices and systems or associated equipment. More specifically, but not exclusively, the disclosure relates to magnetically sensed user interface apparatus, devices, and systems using magnets and multi-axis magnetic sensors to determine user-applied actuator positions, displacements and/or deformations in multiple dimensions and degrees of freedom.

In one aspect, a user interface device may include a frame having a top and bottom in a fixed position relative to each other, an actuator assembly positioned in a volume between the top and bottom of the frame, and a sensor array and processing element to provide an indication of position or displacement of the actuator element from a released state position in two or more dimensions and provide a UID output signal to an external electronic computing device or system.

In another aspect, the actuator may include an outer actuator element may including one or more magnets, and the sensor array may include magnetic sensors disposed on a printed circuit board element or other element coupled to the frame. The magnets may be ferromagnets and the magnetic sensors may be, for instance, magnetic compass or Hall-Effect sensors for sensing magnetic fields in three orthogonal axes. The actuator may include haptic feedback elements such as vibrational motors, piezoelectric devices, and the like.

In another aspect, a user interface device may include a fixed base and top assembly. Such a fixed base and top assembly may provide an ergonomic advantage in providing space for the user's hand to rest when the device is in use. The actuator assembly element may be positioned circumferentially about the fixed base and top assembly. The actuator element may displaceable in tilting, side-to-side, front-to-back, up-and-down, and rotations and permutations of each of these displacements. The actuator element may further be pliant and flexible, thereby allowing a squeeze-type or deformation displacement of the actuator assembly or components of the actuator assembly.

In another aspect, a top assembly of the user interface device may include one or more buttons, a scroll wheel, and/or a touchpad. The top assembly may further include lights or light tubes through which LED or other optical outputs are provided. The top assembly may further include other sensors and/or audible or visual output elements such as speakers, microphones, and the like.

In another aspect, a user interface device may include spring arrays which may be configured with radially oriented springs that may secure and allow displacements of the actuator element relative to the fixed base and top assembly of the frame. Multiple concentric assemblies of radially oriented springs, such as in a triple or higher order spring assembly, may also be used to provide a greater range of motion. The springs may be coupled to an outer actuator element, one or more inner actuator elements, and to the frame or to a core join or other element coupled to the frame.

In another aspect, the magnets or other displacement elements and paired magnetic sensor or sensing elements may be equally spaced about or near to the periphery of the device, such as just within the circumference in an equidistant circular array when the device is in a released state. In embodiments utilizing magnets and magnetic sensors, the magnets may be fixed such that neighboring ones of the magnets may be oriented with alternating polarity facing the magnet's corresponding magnetic sensor. In other embodiments utilizing magnets and magnetic sensors, the polarity of the magnets may all be oriented in the same direction. The sensor outputs may be provided to a processing element or elements to generate a UID output signal. Suitable magnetic sensors may include, but is not limited to, Hall-effect such as the MLX-90399 available from Melexis Microelectronic Integrated Systems, giant magnetoresistance (GMR) sensors, anisotropic magnetoresistance (AMR) sensors, fluxgate sensors, etc.

In another aspect, one or more vibration motors may be positioned within a user interface device to provide haptic feedback to the user. A vibration motor may, for instance, be positioned at the base of each spring or elsewhere on an actuator assembly or frame. In such embodiments, the spring may comprise, for example, tin plated wire or other conductive material suitable to manufacturing a spring in a coil spring configuration, and be further used to electrical connect the vibration motors. Furthermore, multiple vibration motors may be controlled in timing, intensity, frequency, and/or direction, thereby providing unique haptic feedback to the user. The haptic feedback may be controlled by a processing element of the UID.

In another aspect, one or more proximity sensors may be included in a UID to enable detection of the presence of a user's hand. In such embodiments, the detected presence of a user's hand may be used to change the state of a user interface device in keeping with the present disclosure from a "released" to a "displaced" state, or vice-versa. In a released state the UID may be operated in a low power mode, such as when operating on battery power. An initialization procedure may be implemented whereby a measurement of each magnet during the last recorded "released" state may be used as a basis to calculate future displacements of each magnet that may result from displacements of the actuator.

In another aspect, a magnetically sensed user interface device may be integrated into a control system or other electronic computing system or be connected with a computing system such as a personal computer or laptop or a control system of a vehicle or machinery or heavy equipment. Both wired, such as with the use of a flat USB cable or other wired interface, and/or wireless interfaces, such as Bluetooth or other wireless interfaces, may be used to connect a user interface device in accordance with the present disclosure with such computing systems.

In another aspect, the disclosure relates to a user interface device (UID). The UID may include, for example, a frame including a base assembly and a top assembly. The top assembly may be in a fixed position relative to the base assembly. The UID may further include an actuator assembly. The actuator assembly may be disposed between the top assembly and the base assembly. The actuator assembly may be disposed in a volume between the top assembly and the base assembly with the UID. The UID may include a grip cover or boot to cover the actuator assembly and/or all or portions of the frame. The actuator assembly may include one or more actuator elements and a plurality of springs mechanically coupling the one or more actuator elements to the frame. The UID may further include a plurality of sensors disposed within the frame between the top assembly and the base assembly. The sensors may sense positional information associated with the actuator assembly, and provide one or more sensor output signals corresponding to the sensed positional information. The sensor output signals may be provided to one or more processing elements. The one or more processing elements may generate UID output signals to be provided to a communicatively coupled electronic computing device or system.

The UID may, for example, include a plurality of magnets. The magnets may be disposed between the top assembly and the base assembly. The sensors may be magnetic field sensors for sensing magnetic fields from the magnets and generating the positional information based at least in part on the sensed magnetic fields. The sensors may be multi-axis magnetic sensors. The multi-axis magnetic sensor outputs may be provided to the processing element or elements for use in generating UID output signals.

The magnets may, for example, be disposed on the actuator assembly, and the sensors may be disposed on a printed circuit board element coupled to the frame or on another element coupled to or fixed relative to the frame or top and bottom assembly. The UID may include an electrical connector disposed on the printed circuit board. The electrical connector may be a Universal Serial Bus (USB) connector. Alternately, the magnets may be disposed on a printed circuit board element coupled to the frame or on another element coupled to or fixed relative to the frame or tom and bottom assembly, and the sensors may be disposed on the actuator assembly.

The magnetic sensors may, for example, be three-axis magnetic sensors. The three-axis magnetic sensors may provide output signals corresponding to magnetic fields sensed in three orthogonal axes at a point or small area in space, such as a point or small area in an integrated circuit chip.

The one or more actuator elements may, for example, include an outer actuator element. The plurality of springs may comprise a spring array. The spring array may be coupled between the outer actuator element and the frame or a core-join element fixedly coupled to the frame. The plurality of springs may be arranged in a radial array outward from the center of the UID.

The one or more actuator elements may alternately include, for example, an outer actuator element and an inner actuator element. The plurality of springs may include an outer spring array coupled between the outer actuator element and the inner actuator element, and an inner spring array coupled between the inner actuator element and the frame or a core-join element fixedly coupled to the frame. The inner and/or outer spring arrays may have springs arranged in a radial array outward from the center of the UID. The outer actuator element may have a substantially cylindrical shape. The inner actuator element may have a triangular shape. The outer spring array and the inner spring array may be in an overlapping spring array configuration wherein an outer end of the inner array springs is further from the center of the UID than the inner end of the outer array springs. The actuator may further include a damping element disposed on or within one or more of the springs of the inner spring array and/or the outer spring array. The damping element may be of a memory foam material or other foam or flexible material.

The UID may, for example, comprise a plurality of magnets disposed on the outer actuator element. The sensors may be magnetic field sensors for sensing magnetic fields from the magnets and generating the positional information based at least in part on the sensed magnetic fields. The sensor output signals may be provided to a processing element for generation of a UID output signal to be provided to a communicatively coupled electronic computing device or system. The outer actuator element may have a cylindrical shape. The magnets may be disposed on a retaining arm of the outer actuator element or elsewhere on or within the outer actuator element. Additional magnets may be disposed on or in inner actuator elements. The plurality of magnets may be six magnets. The six magnets may be arrayed equidistantly around the outer actuator element, such as in a circular array on the inside of the outer actuator element.

The base may, for example, include a weight element of a dense material for stabilizing the UID on an operating surface. The weight may be integral to or coupled to the base or base components. The weight may be an element of a coupled limiter assembly.

The UID may, for example, further include a haptic feedback element. The haptic feedback element may be disposed on the actuator assembly and/or on the frame on the top or bottom assembly. The haptic feedback element ma be a vibrational motor or piezoelectric device or other vibrational device. The vibrational motor may be coupled to a printed circuit board connector of the UID. The vibrational motor may be coupled using a flexible circuit cable. The UID may include a plurality of switches on the top assembly or within the UID and mechanically or electrically coupled to the top assembly.

The UID may, for example, include a printed circuit board. The printed circuit board may be coupled to the frame or to an element fixed to the frame. The magnetic sensors may be disposed on the printed circuit board or on the frame or the top assembly or bottom assembly. The may further include a processing element. The processing element may be disposed on the printed circuit board. The processing element may be configured for receiving output signals from the magnetic field sensors corresponding to positions of the magnets and generating, based at least in part on the received output signals, a UID output signal for provision to a coupled electronic computing device or system. The UID may further include one or more LEDs. The one or more LEDs may be disposed on the printed circuit board or on the actuator assembly or on the frame. The UID may further include a gyroscopic sensor. The gyroscopic sensor may be disposed on the printed circuit board and coupled to the processing element for providing gyroscopic data to the processing element. The gyroscopic element may be positioned at or near the axial center of the UID.

One or both of the inner spring array and the outer spring array may be arrays of three coil springs. The coil springs may be spring steel or music wire. The inner spring array springs may be coupled radially between the inner actuator element and the frame or core-join element. The outer spring array springs may be coupled radially between the inner actuator element and the outer actuator element. One or both of the inner spring array springs and the outer spring array springs may be thermally bonded to the inner actuator element and/or the outer actuator element. The UID may further include a flexible grip cover. The flexible grip cover may be disposed around the actuator assembly and/or around all or part of the frame.

The UID may further include a limiter assembly for limiting the motion of the actuator element to a predefined range of motion. The limiter assembly may include a plurality of limiting arms and corresponding limiting pockets. The limiter assembly may include a structural element and an elastomeric cushion.

In another aspect, the disclosure is directed to a user interface device (UID). The user interface device may include, for example, a frame including a base assembly and a top assembly. The top assembly may be in a fixed position relative to the base assembly. The UID may further include an actuator assembly. The actuator assembly may be disposed between the top assembly and the base assembly. The actuator assembly may include an outer actuator element having a cylindrical shape, an inner actuator element, an outer spring array including a plurality of springs mechanically coupling the outer actuator element to the inner actuator element, an inner spring array including a plurality of springs mechanically coupling the inner actuator element to the frame or to an element coupled to the frame, and a plurality of magnets disposed on the outer actuator element in an equidistant circular array. The inner actuator element may have a triangular shape. The UID may further include a printed circuit board having a processing element and a plurality of multi-axis magnetic sensors. The printed circuit board may be disposed within the frame between the top assembly and the base assembly for sensing positional information associated with ones of the plurality of magnets and providing one or more sensor output signals corresponding to the sensed positional information to the processing element. The processing element may generate a UID output signal corresponding to a position, movement, displacement or deformation of the actuator assembly based at least in part on the multi-axis magnetic sensor outputs.

In another aspect, the disclosure relates to a method of providing a user interface device (UID) output signal to an electronic computing device or system. The method may include, for example, sensing, at a plurality of sensors, positional information associated with corresponding sensed elements disposed on an actuator element of the UID. The method may further include providing a plurality of sensor output signals to a processing element. The method may further include generating, in the processing element, based at least in part on the received plurality of sensor output signals, a UID output signal corresponding to a position, translation, displacement or deformation of the actuator assembly. The method may further include providing the UID output signal to a communicatively coupled electronic computing device or system. The sensors may, for example, be multi-axis magnetic field sensors. The sensed elements may be magnets.

In another aspect, the disclosure relates to a non-transitory processor-readable medium. The medium may include instructions for causing a processing element to implement or control a stages of receiving a plurality of sensor output signals from multi-axis sensors corresponding to sensed position, translation, displacement, or deformation of an actuator assembly, generating, based at least in part on the received plurality of sensor output signals, a UID output signal corresponding to a position, translation, displacement or deformation of the actuator assembly, and providing the UID output signal to a communicatively coupled electronic computing device or system. The sensors may be multi-axis magnetic field sensors for sensing positions of magnets disposed on the actuator assembly.

In another aspect, the disclosure relates to methods for performing operating functions in UIDs such as those disclosed herein, in whole or in part.

In another aspect, the disclosure relates to processor readable media including instructions for implementing methods and functions associated with the user interface devices described herein, in whole or in part.

In another aspect, the disclosure relates to means for implementing the UID devices and functions described herein, in whole or in part.

Various additional aspects, features, and functions are described below in conjunction with FIGS. 1 through 48 of the appended Drawings.

Example User Interface Device Embodiments

In various configurations, embodiments of user interface devices in accordance with this disclosure may include a frame, an actuator assembly movably coupled to the frame, and a sensor array disposed within a volume between the top and the bottom of the frame to sense position, motion, displacement, and/or deformation of the actuator relative to the frame.

The frame may include a top assembly (also referred to herein as a "top" for brevity) and a bottom or base assembly (also referred to herein as a "bottom" or "base") that are fixed in position relative to each other, such as through screws or other mechanical attachment hardware or by adhesives, thermal forming, and the like. The top and bottom may be joined or coupled through a central post or columnar section or volume (also referred to herein as "column" for brevity) of various shapes and sizes. The column may be formed from all or portions of the top and/or base, or may be made from separate components in some embodiments. For example, in some embodiments the top, bottom, and column may include multiple components, while in other embodiments they may include just a top and bottom element screwed or attached together with the column in between, or formed as a single element. The column may have various shapes, sizes, cross-sectional areas, and vertical and cross-sectional shapes in different embodiments.

The top assembly may include a hard or rigid surface on which additional elements such as lights, switches, vibrational motors, and the like may be disposed. For example, the top assembly may include two or more switches as described subsequently herein with respect to FIG. 19 to allow user actuator of the switches by pressing on them or on an associated surface or plate separately from or during manipulation of the actuator assembly.

Figure 40:
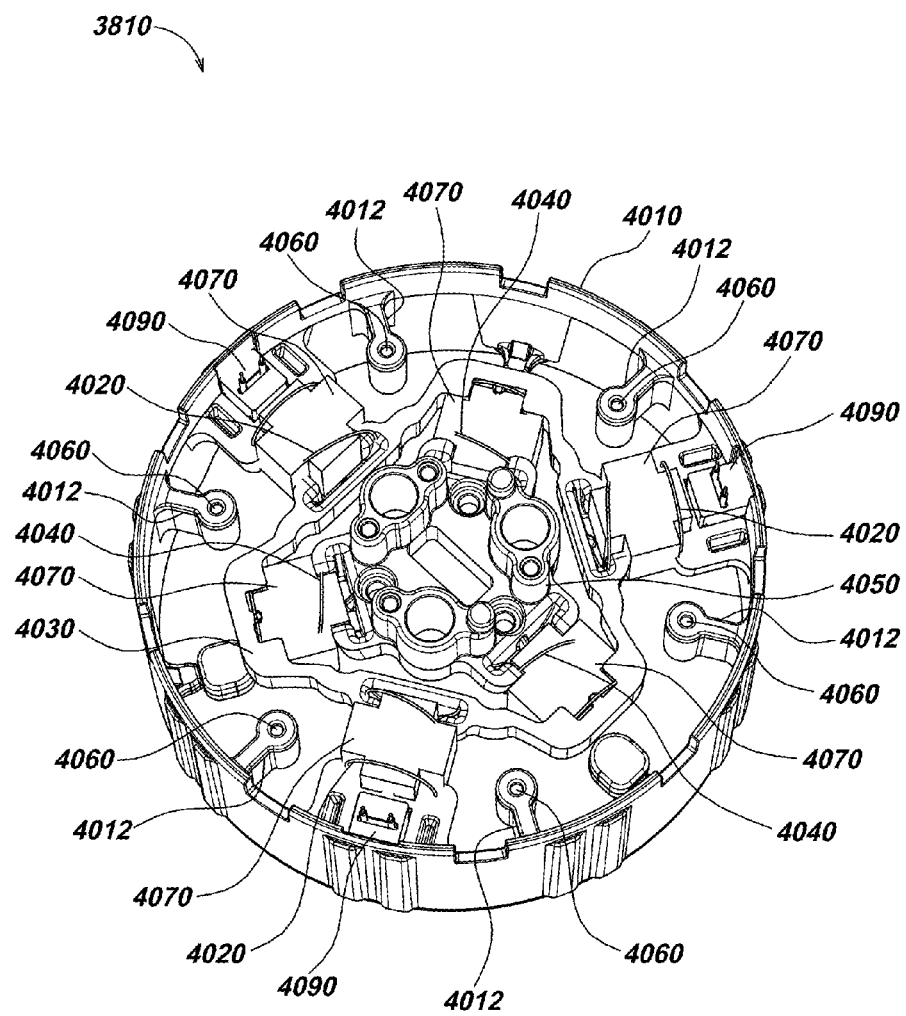
FIG. 40 is a top down isometric view of the actuator assembly with the PCB removed.

The actuator assembly may include an outer actuator element (also denoted herein as a "grip") and one or more spring arrays coupling the outer actuator element to the frame. The actuator may be coupled to the frame at the column or to one or more elements coupled to the column and/or to the top or base. In some embodiments the actuator may include one or more intermediate elements between the outer actuator element and the column, with the spring array(s) coupling between the outer actuator element, the one or more intermediate actuator elements, and the frame. A dampening material, such as foam materials or other dampening material elements may be disposed around or within the springs to dampen spring response. The dampening material may be bonded to the springs with adhesives or by heating or thermal bonding to form a foam or other material within or around the springs. An example of a damping element, in the form of a memory foam cross-shaped element disposed within coils of a spring is shown in FIG. 40 as element 4070. Other dampening materials may be used in alternate embodiments.

Figure 46A:
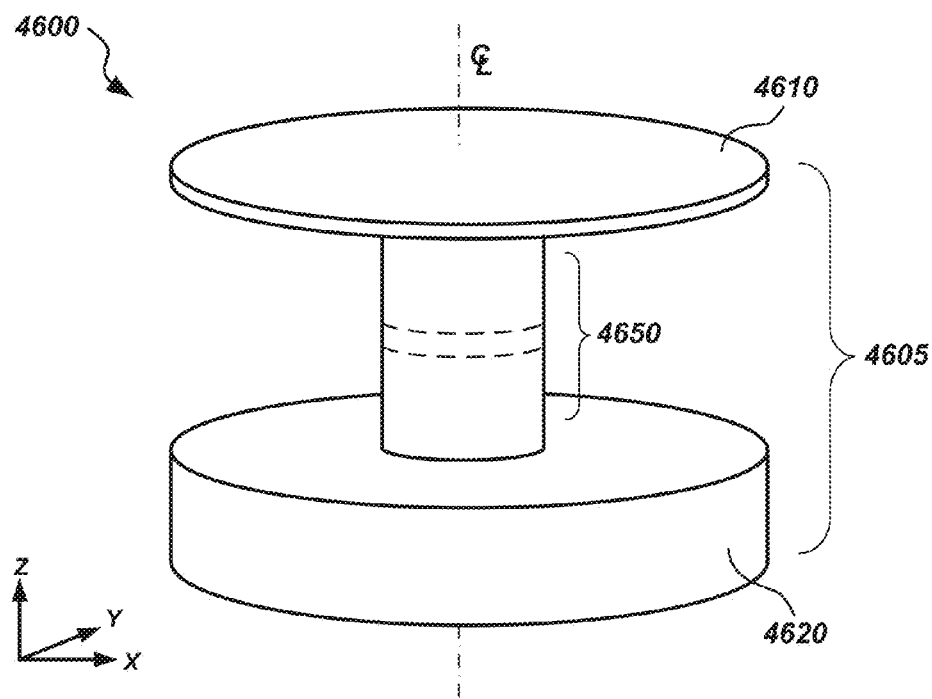
FIG. 46A illustrates details of a user interface device frame embodiment.

Turning to FIG. 46A, details of a simplified embodiment of a frame structure 4605 of a UID 4600 as it would be oriented when positioned upright on a desk or other operational surface are shown. As shown in FIG. 46, a top assembly 4610 is coupled to a base assembly 4620 through a columnar section or structure 4650. The columnar section 4650 need not be columnar in shape or circular in cross-sectional area but rather defines a structure between the top 4610 and the base 4620 through which the two are fixed or coupled. In a typical embodiment the actuator assembly is also coupled to the frame through the column structure, as may be additional elements such as a printed circuit board and other elements as described herein. As described subsequently, column 4600 may be of various shapes and sizes and may include multiple elements and/or portions of the top and bottom assemblies. Various additional elements not shown in FIG. 46 for clarity may be included in frame assembly 4600 of UID 4600, such as those shown in detail in other embodiments described herein or their equivalents.

Figure 46B:
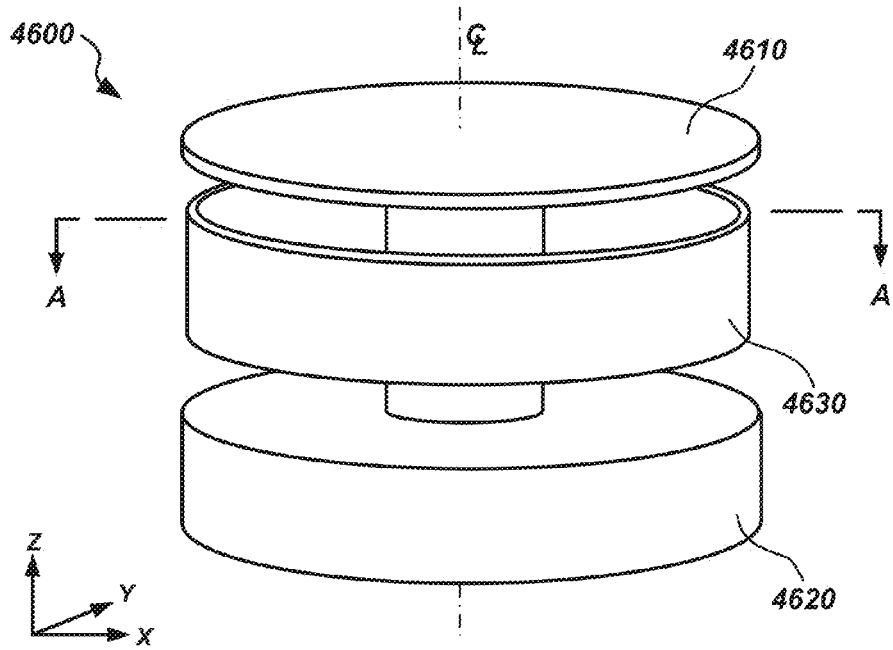
FIG. 46B illustrates details of a user interface device embodiment including the frame embodiment of FIG. 46A along with details of an actuator assembly embodiment disposed within the frame.
Figure 46C:
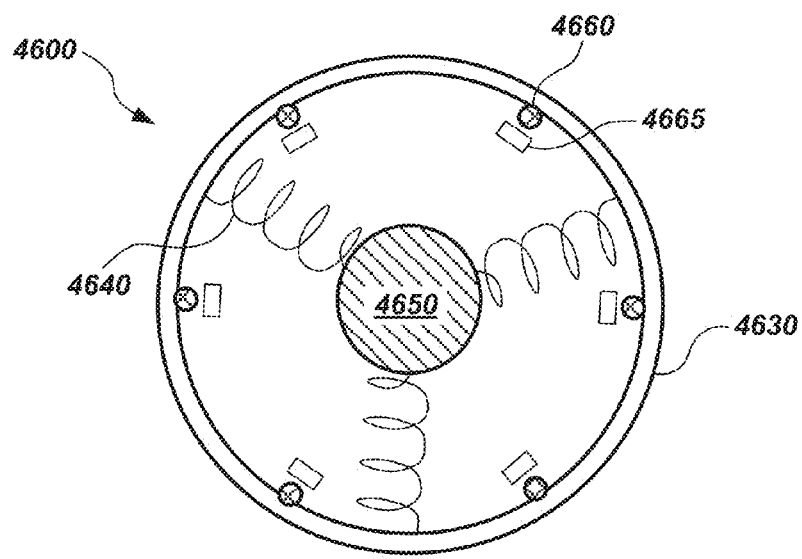
FIG. 46C illustrates details of the user interface device embodiment of FIG. 46B having a single spring array actuator assembly in a cutaway top-down view along line A-A.
Figure 46D:
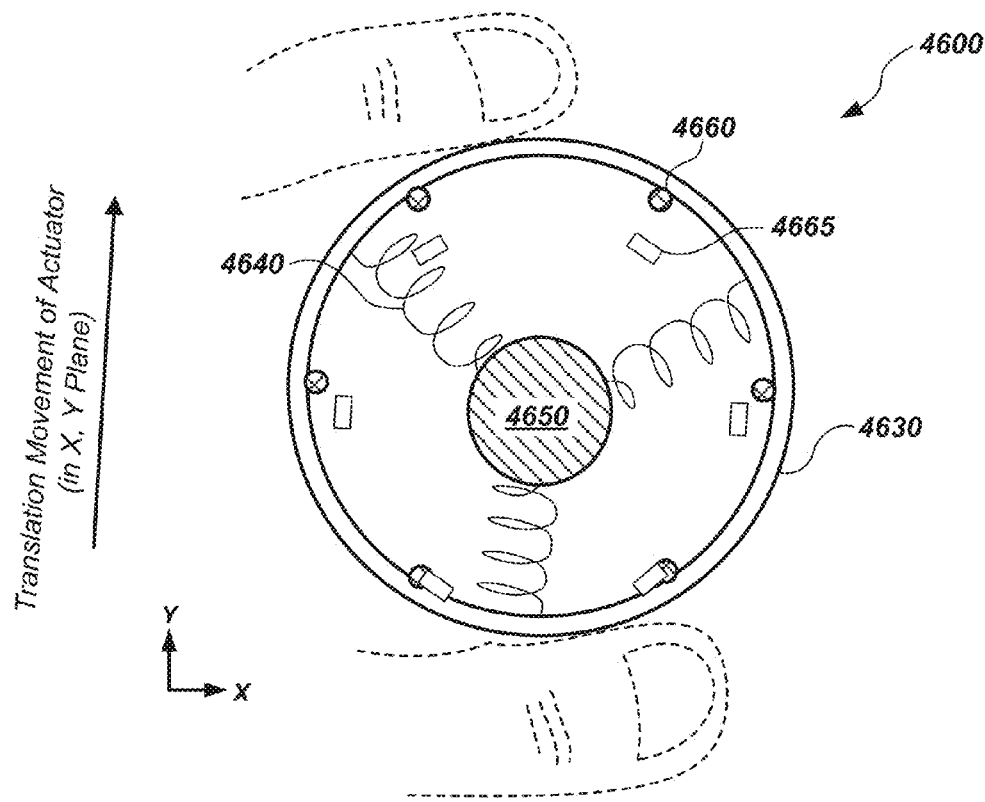
FIG. 46D illustrates the user interface device embodiment of FIG. 46C during a user-applied translational action.

FIG. 46B illustrates certain details of an actuator element embodiment 4630, positioned between top 4610 and base 4620 within a volume defined between the top and bottom surface. Actuator element 4630 as shown may correspond with outer actuator elements described subsequently herein, and may comprise a flexible material in a cylindrical ring shape as shown that can be moved and/or deformed by a user or by other forces (e.g., vibration on or within another device, shock or impacts through the surface on which it is positioned, etc.). Examples of translational movements (in an X-Y plane typically parallel with an operation surface) are shown in FIGS. 46C and 46D, respectively.

Figure 47:
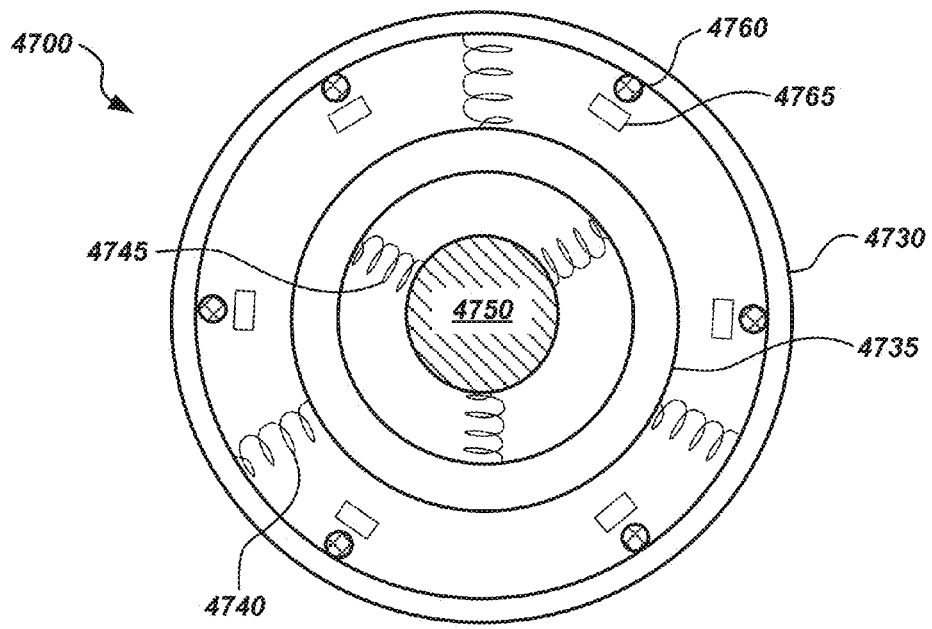
FIG. 47 illustrates details of an alternate user interface device embodiment having a dual spring array actuator assembly in a cutaway top-down view.
Figure 48:
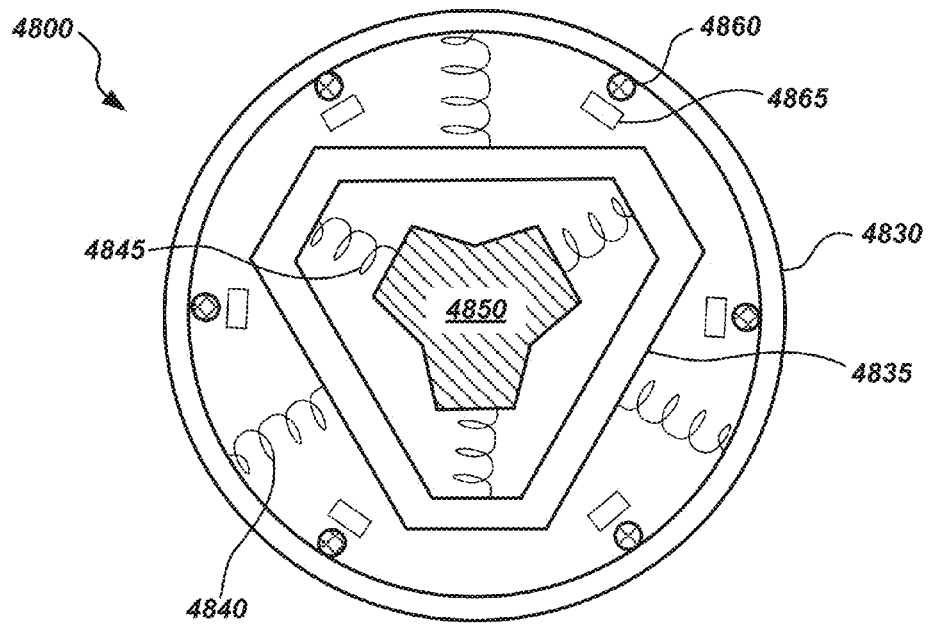
FIG. 48 illustrates details of another alternate user interface device embodiment having a dual spring array actuator assembly in a cutaway top-down view.

Although not shown in FIG. 46B, the actuator element 4630 is mechanically coupled to the frame 4605 at or near the column 4650 and/or to the base 4610 and/or top 4610 through a spring assembly (shown in the example embodiments of FIG. 46C, FIG. 47, FIG. 48, as well as in additional embodiment such as those shown in FIG. 8, FIG. 25, and FIG. 40) comprising one or more spring arrays. In some embodiments a single array of springs may be used, with the springs of the array coupled between the actuator element and column section such as shown in FIG. 46C. In other embodiments, the actuator may include one or more intermediate elements, with corresponding arrays of springs coupling between the outer actuator element, the intermediate actuator element or elements, and the column section of the frame, such as shown in FIG. 47 and FIG. 48

Figure 10:
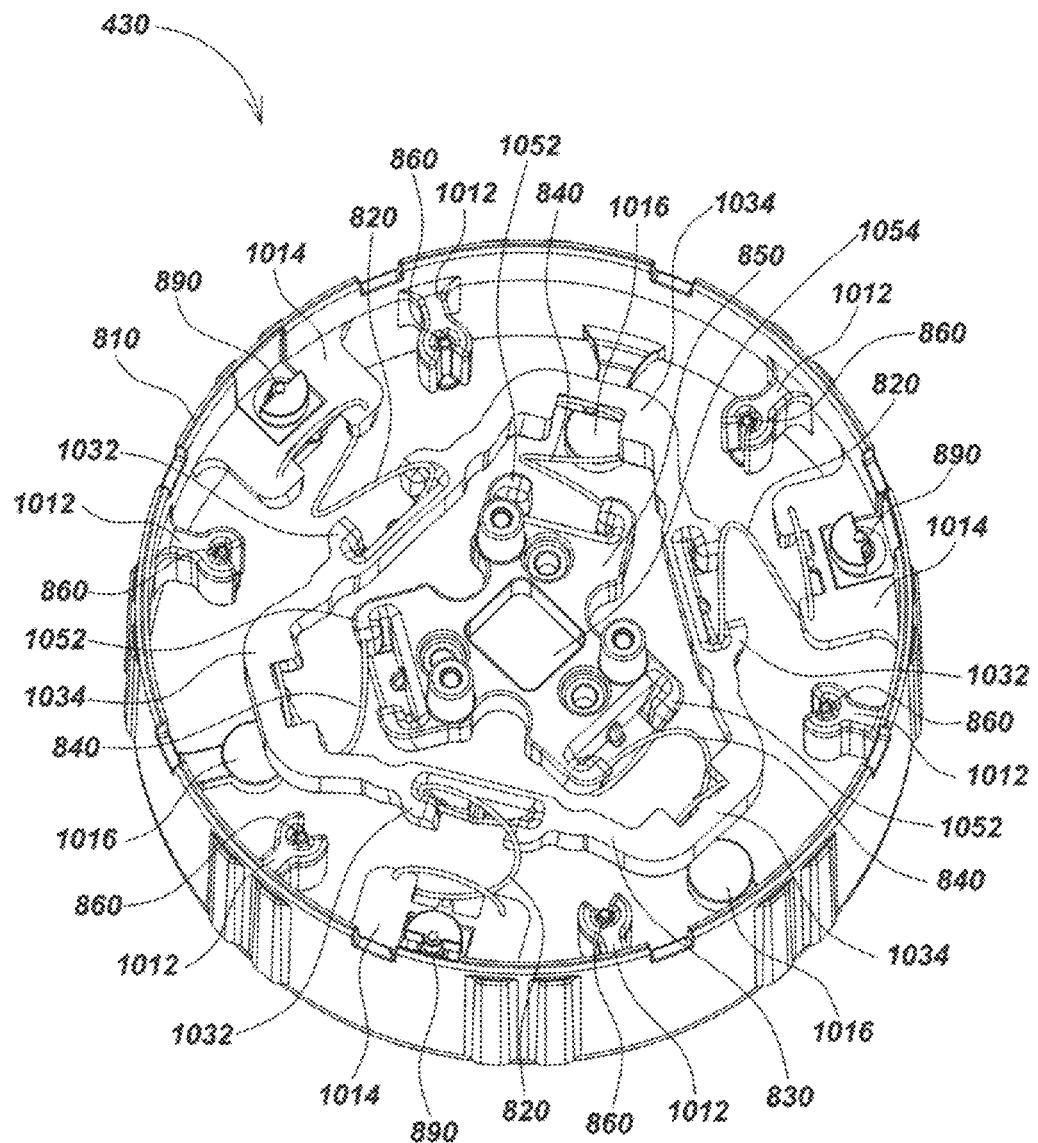
FIG. 10 is a top down isometric view of the actuator assembly embodiment of the user interface device embodiment of FIG. 1 with the printed circuit board removed.

Various sensing may be used in user interface device embodiments in accordance with this disclosure. However, an exemplary embodiment uses magnetic sensing, with magnets and magnetic sensors for sensing positional or motion information associated with movements and deformation of the actuator assembly and a processing element or elements to generate output signals based on the sensed position or motion information for provisional to an electronic computing device or system. In such magnetically sensed embodiments, magnets may be disposed on or within the actuator element 4630 of an actuator assembly. In an exemplary embodiment the magnets are disposed equidistantly around the actuator element, such as around a cylindrically shaped outer actuator element. However, in other embodiments magnets may be disposed in various configurations in two or three dimensional space on the actuator assembly, with correspondingly placed magnetic sensors. If the magnets are disposed on or within element 4630, corresponding magnetic sensors may be disposed in proximity to the magnets, such as on a printed circuit board coupled to the column 4650 or elsewhere within the volume defined between the top 4610 and bottom 4620. In an exemplary embodiment the magnetic sensors are multi-axis magnetic sensors, such as three-axis magnetic sensors for sensing magnetic fields in three orthogonal axes at a single point in space or small area in space. As the actuator element 4630 is moved or deformed (e.g., by translating it in the X, Y, or Z axes as shown, squeezing it, twisting, rotating it about the centerline, etc.) the position of the magnets relative to the frame may be determined by sensing the magnetic fields generated by the magnets at the magnetic sensors and processing these magnetic field signals to generate output signals usable by the electronic computing device or system An example of details of such an actuator assembly is shown in FIG. 46C. Outer actuator element 4630 has an array of magnets 4660 (6 magnets in this embodiment, however different numbers and/or positioning of the magnets may be used in various embodiments). Magnets 4660 may be mounted on or within outer actuator element 4630 or may be disposed on or within other elements coupled to the actuator assembly. FIG. 10, described subsequently herein, illustrates one example outer actuator element embodiment with magnets 860 disposed on retaining arms 1012. In the embodiment of FIG. 46C, the actuator assembly includes a single array of springs 4640 (including three springs as shown, however, alternate embodiments may use fewer or more springs in the spring array). The springs 4640 are coupled either directly or through additional elements to the column structure or, in alternate embodiments, to the top and/or bottom assemblies. In a typical spring array configurations the actuator assembly may move up or down relative to the top and base. Varying the orientation of the UID in a known, controlled fashion while receiving and processing signals may be used to calibrate the UID device's operation. For example, the UID may be first placed on a level operating surface in an upright position as shown in FIG. 1 and the sensor output signals processed while the UID is in a released state in this orientation to determine a first calibration reference. The springs may be soft enough to allow deflection of the actuator assembly in the vertical direction relative to the operating surface so that the actuator assembly will be closed to the base of the UID in this orientation. The UID may then be rotated to a second position, such as an upside down position relative to the operating surface, and a second set of sensor output signals received and processed while the UID is in a relaxed state in this position to determine a second calibration reference. In this orientation the springs may allow the actuator assembly to move downward towards the top of the UID. Other rotations and/or translations may be done with corresponding calibration references taken so as to provide a UID calibration data set for use in determining a calibrated release state position in level and/or in non-level mounting orientations.

An array of magnetic sensors 4665 may be disposed in the volume between the top and bottom assemblies, such as on a printed circuit board or other mounting structure. The magnetic sensors are typically in a fixed position relative to the base and top assemblies so as to sense movements and/or deformations of the actuator assembly relative to the frame. In an exemplary embodiment a printed circuit board is mounted on or coupled to the column structure and the magnetic sensors are disposed thereon, however, other mounting locations and structures may be used in alternate embodiments, such as on structures formed on or around the frame or coupled to the frame at the top, bottom, and/or column structure.

FIG. 46D illustrates an example user translational movement of the actuator assembly. A user's hand may grip the actuator assembly and outer actuator element or grip (which may be covered by a cover or boot structure as described subsequently herein but not shown in FIG. 46D) and move the actuator in the X-Y plane as shown (typically corresponding to the plane of the mounting surface). As the magnets 4660 move relative to the magnetic sensors 4665 (and the springs 4640 of the spring array expand or contract to restrain the actuator movement) the magnetic sensors provide output signals corresponding to the magnetic fields generated by the magnets, typically in two or three orthogonal axes. The output signals from the magnetic sensors are provided to a processing element, which then generates a UID output signal to be provided to electronic computing device or system that corresponds to position and/or movement of the actuator.

Figure 46E:
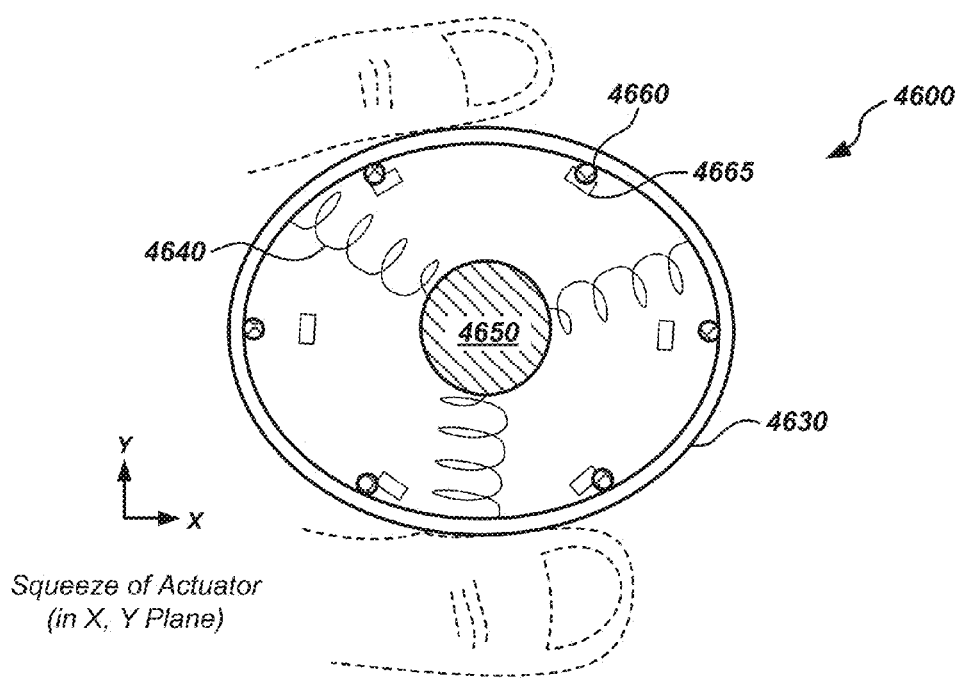
FIG. 46E illustrates the user interface device embodiment of FIG. 46C during a user-applied squeeze action.

FIG. 46E illustrates an example user action, in this case a deformation of the outer actuator element 4630 through a squeezing action applied by the user. Similar magnetic field sensing and processing may be done to generate a UID output signal corresponding to the deformation of the actuator.

FIG. 47 illustrates details of an alternate actuator assembly embodiment of a UID 4700. This actuator assembly includes an outer actuator element 4730 and an intermediate or inner actuator element 4735 between the outer actuator element 4730 and the column structure 4750. Two arrays of springs (also denoted herein as a "dual spring" or "dual spring array" configuration) may be used, with the first or outer spring array including springs 4740 (4 in this example, but fewer or more springs may be used in alternate embodiments) and a second or inner spring array of springs 4745 (4 in this example, but fewer or more springs may be used in alternate embodiments). The inner actuator element may be circular as shown or may be in various other shapes and sizes in alternate embodiments. Magnets 4760 and magnetic sensors 4765 may be used to sense position, motion, and/or deformation of the actuator assembly. The embodiment of FIG. 47 may correspond generally with the embodiment of FIG. 46 but with the additional inner actuator element and the inner array of springs 4745.

Figure 27:
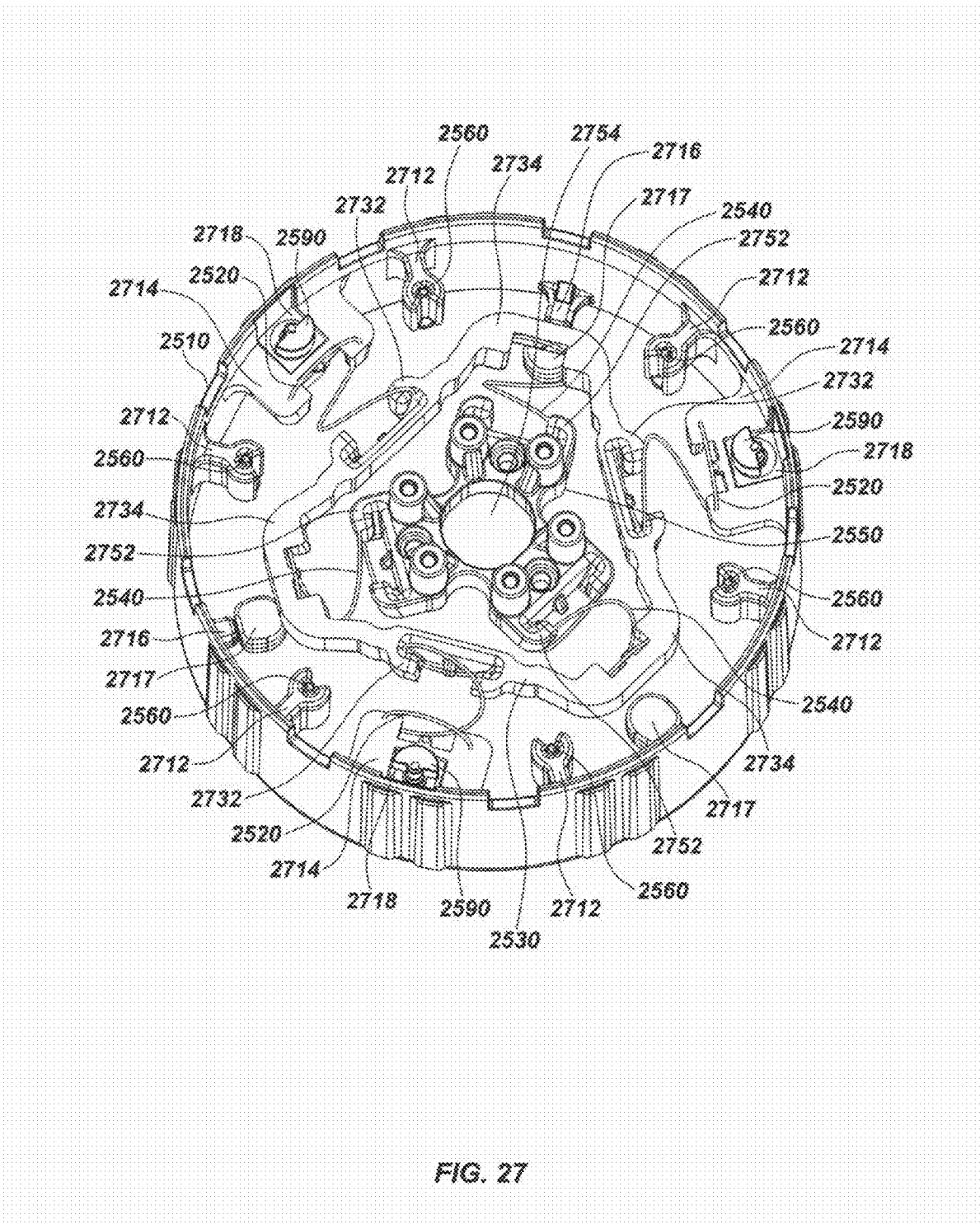
FIG. 27 is a top down isometric view of the actuator assembly embodiment of FIG. 25 with the printed circuit board removed.

FIG. 48 illustrates details of another actuator assembly embodiment of a UID 4800. This embodiment is similar to the embodiment of FIG. 47 but with a generally triangular shaped inner actuator element 4835. Outer actuator element 4830 may be same as or similar to the outer actuator element 4730 of FIG. 47, and magnets 4760 and magnetic sensors 4765 may be the same as or similar to those shown in FIG. 47. Use of triangular shaped inner actuator elements allows for a slightly different set of springs arrays in embodiment 4800 as compared to embodiment 4700. In particular, in UID embodiment 4800, the inner end of the outer spring array springs 4840 is located closer to the column structure 4850 than the outer end of the inner springs 4845. In general, a configuration where the outer ends of the inner spring array lie further from the centerline of the UID than the inner ends of the outer spring array (also denoted as an overlapping spring array configuration) may be advantageous in facilitating actuator movement. Similar overlapping spring array configurations are shown in the embodiments of FIG. 10, FIG. 27, and FIG. 40. Additional details of various embodiments are described subsequently herein.

Figure 2:
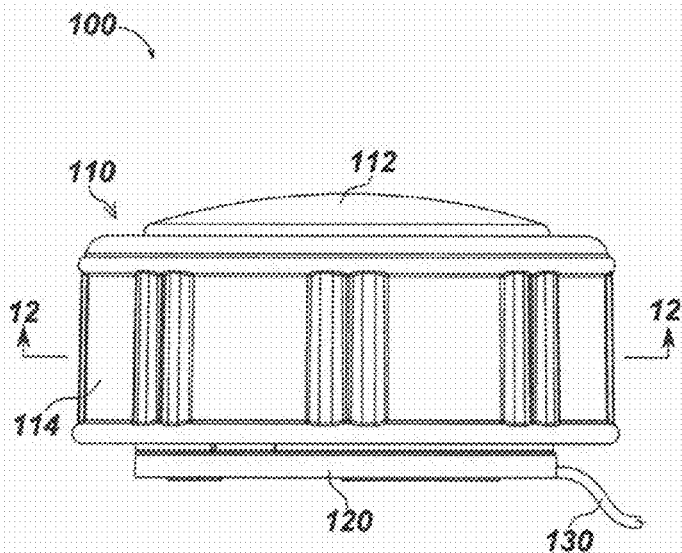
FIG. 2 is a side view of the user interface device embodiment of FIG. 1.

Turning to FIG. 1 and FIG. 2, an exemplary embodiment 100 of a user interface device (UID) in accordance with certain aspects is illustrated. FIG. 1 illustrates UID embodiment 100 in an isometric view relative to an operating surface such as a desk or table, with connector cable 130 coming out of the bottom of the UID along the top of the operating surface. FIG. 2 is corresponding side view of embodiment 100. Embodiment 100, as well as other embodiments described herein, may also be referred to as a "spring array" UID or "dual spring array" UID (in certain configurations), which reflects an internal configuration of the UID having a spring construction with one or more spring arrays coupling an actuator assembly to a frame of the UID, such as at a central columnar section as shown in FIG. 46A as section 4650.

In typical embodiments the actuator assembly includes an outer actuator element or grip element through which a user may grip the UID to interact with it. A spring array may couple the outer actuator element to the frame such as shown in FIG. 46C. In other embodiments the actuator assembly may include an outer actuator element and one or more intermediate actuator elements, with the spring array coupling the outer actuator element to the frame through the intermediate actuator elements. If a single intermediate actuator element is used it may be referred to herein as an inner actuator element.

In an exemplary embodiment, the spring array includes two spring sections or arrays separating an outer actuator element of the UID's actuator assembly from the frame through an inner actuator element such as shown in FIGS. 47 and 48, as well as FIG. 10, FIG. 27 and FIG. 40. Various additional aspects of actuator, frame, and spring array constructions are further described in detail subsequently herein in conjunction with the drawings.

In typical UID embodiments, such as UID embodiment 100 as shown, magnets and corresponding magnetic sensors (internal to the details shown in FIG. 1) are used to sense position as well as various movements, displacements, and/or deformations of the UID's actuator assembly and its corresponding component elements (e.g., the outer actuator element, springs, and inner actuator element as shown in embodiment 100). However, alternate embodiments may use other sensing technologies such as optical, acoustic, mechanical, and the like to implement similar sensing of position and/or movement the actuator assembly and its component elements.

User interface device 100 may include an enclosure or housing that includes a top assembly (also denoted herein as "top" for brevity), such as top assembly 110 (and associated elements not shown in FIG. 1) as shown, a base or bottom assembly (also denoted herein as "base" or "bottom" for brevity), such as a base plate 120 (and associated elements not shown in FIG. 1), as well as an electrical or optical interface element or connector, such as electrical connector cable 130 which, in an exemplary embodiment, is a USB cable, for providing electrical or optical sensor output signals from the UID to a coupled electronic computing device or system. Alternate embodiments may include a wireless interface module to provide a wireless communication connection between the UID and an associated electronic computing device or system, such as a Bluetooth, Wi-Fi, ZigBee, or other wireless interface module. The UID may also include (not shown) a battery compartment or connection to provide power to the UID when connected power through an interface such as a USB interface is not available (e.g., in wireless versions of the UID).

Figure 4:
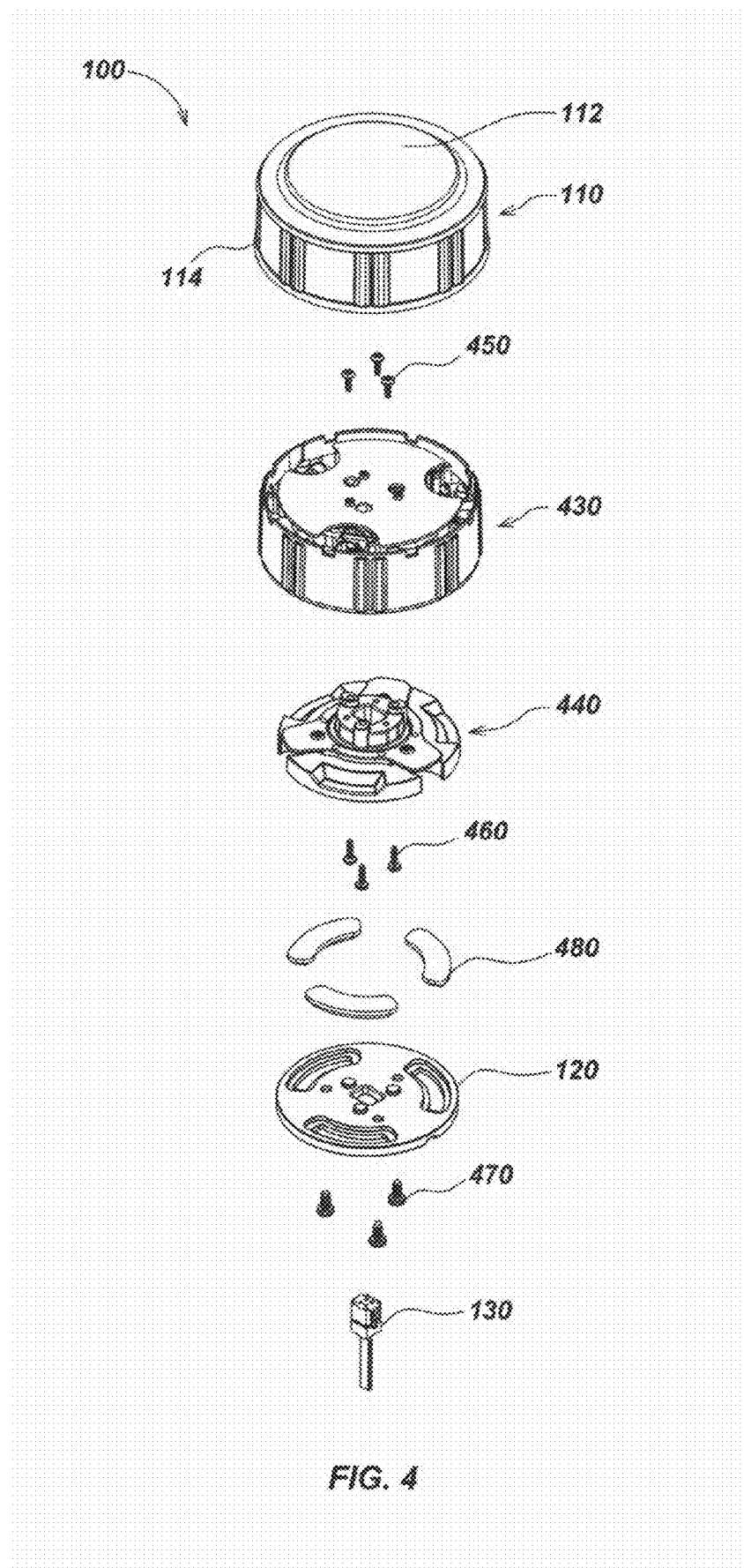
FIG. 4 is a top down exploded view of the user interface device embodiment of FIG. 1.
Figure 35:
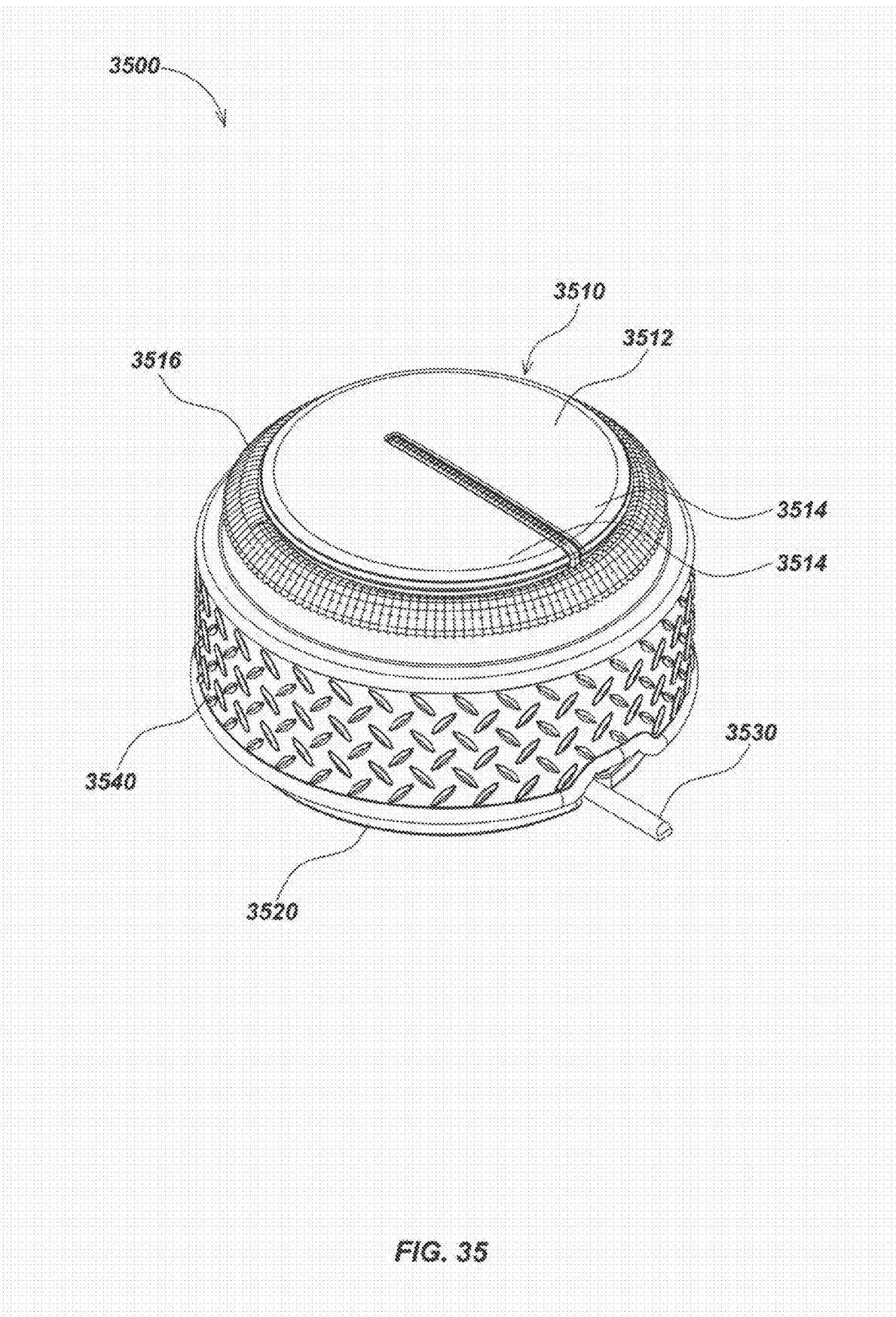
FIG. 35 illustrates details of an alternate user interface device embodiment.

The top assembly 110 may include a top outer plate 112 and an actuator grip cover or boot 114, which may be separate elements or may be integrally formed in some embodiments. The actuator grip cover may be formed to conform to and cover the actuator assembly, such as by being close to or in contact with an outer actuator element or grip element. The actuator grip cover 114 may include a raised or textured surface or surface elements of various types. For example, FIG. 1 illustrates a series of vertically-oriented raised bars, while FIG. 35 illustrates an alternate embodiment with a "diamond plate" surface with raised diamond-shaped features. Various other surface features, such as raised or indented circles, ovals, lines, grids, etc. may be used in alternate embodiments. If separately formed, the grip cover or boot 114 may cover all or part of the top as well as all or part of the sides of the UID (in effect covering the actuator assembly which in internal to the cover 114 as shown in FIG. 1 and additionally other areas of the UID such as all or portions of the top assembly and bottom assembly). The grip cover 114 may be formed of a soft material such as latex, rubber, vinyl, etc., and may be readily removable from the UID for replacement, cleaning, etc. FIG. 4 illustrates UID embodiment 100 in exploded view showing the grip cover 114 separated from the remainder of the UID as may be done by a user for cleaning or replacement.

As noted previously, in an exemplary embodiment, the top assembly is fixed in position relative to the bottom or base assembly, with the movable actuator assembly in between (the actuator assembly is covered in FIG. 1 by the grip cover 114, but is shown in part in embodiment 430 in FIG. 4). By fixing the top of the UID relative to the base, a user may grip either the base or top (or both) with one hand and simultaneously move, twist, rotate, squeeze, lift up or down, etc. the actuator assembly relative to the base and top. By fixing the top relative to the base (where the base is typically disposed on a surface such as a desk, etc., or on or within another device such as a tablet, notebook computer, phone, etc.), one or more switches or buttons may be disposed below the top surface (e.g., under grip cover 114) and may be actuated by the user by pressing on a corresponding area of the top while holding the edge of the top and/or the base. In one embodiment corresponding to a computer mouse, two switches may be disposed on or under the top to provide left and right mouse-click functionality. Fewer or more switches may be used in different embodiments to provide alternate switching functionality. This structure advantageously allows for simultaneous actions with a single hand, such as moving/deforming the actuator while pressing switches on the top, while the UID is fixed in place on a desk or other surface or within another device such as a phone, notebook, tablet, floor or control panel of construction equipment (e.g., crane, backhoe, etc.) or vehicles, and the like.

The actuator grip cover 114 may comprise an elastomer or other pliant or flexible material, and may be formed to move and flex during translations, displacements, or deformations of the actuator assembly 430 (as shown in FIG. 4) and its associated component elements. For example, the actuator grip cover may be formed as a pliant rubber boot-type element or other flexible element and may stretch or bend to follow movements of the actuator assembly.

In some embodiments, graphics, letters, shapes, or other features may be formed or molded into the cover 114. In addition, openings may be formed in the cover 114 to provide for airflow, light output (e.g., via LEDs and light pipes, etc.), sensor contact with the exterior of the UID, haptic feedback from vibration motors, piezoelectric elements, and the like. Clear or opaque areas may be formed into the boot to correspond on the surface of the UID with internal features such as LEDs, switches, sensors, etc. The actuator grip cover 114 may be shaped or formed to circumscribe and enclose actuator assembly 430 within the user interface device 100 and aid in preventing unwanted external substances, such as dust or dirt, fluids, or other contaminants from coming into contact with the internal components of the user interface device 100. In some embodiments, the grip cover may include o-rings, rubber or other bands, adhesives, or other seals or sealing elements for securing it to the UID to make the UID dirt or water resistant, air resistant, or otherwise enhance sealing of the UID interior from its exterior environment.

Figure 3:
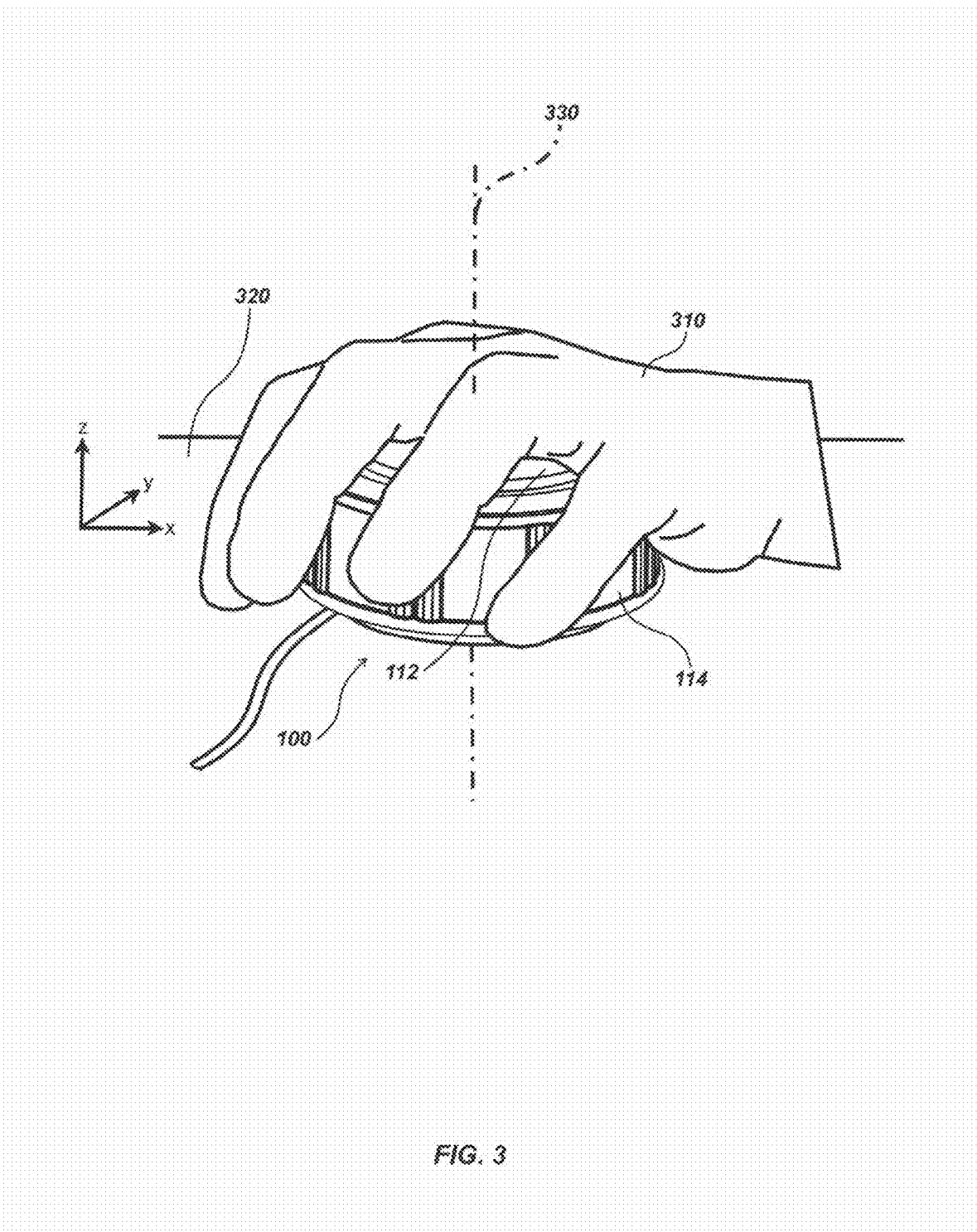
FIG. 3 is a front isometric view of a user's hand positioned on the user interface device embodiment of FIG. 1.

As described in further detail subsequently herein, the various actuator assembly components, as well as the actuator grip cover or boot 114, may be formed to move relative to the top outer plate 112 and base plate 120 in response to user actuation, and may further advantageously reduce user fatigue by transferring loading (e.g., the user's hand and arm weight) through the UID from the top to the base. For example, as shown in FIG. 3, a user's hand 310 may be rested on the top assembly at the top outer plate 112 of UID 100 while the user grips the actuator grip cover 114. The top outer plate 112 may aid in preventing fatigue to the user's hand by transferring the weight of the user's hand internally through the base plate 120 and to the desk or other surface 320 on which the UID is placed or mounted. The base may be formed of a dense material or may have weights added to aid in retaining it on the operating surface in embodiments where the UID is not attached to an operating surface. Alternate embodiments, where the UID's base is attached to a mounting surface, such as in a vehicle control application, on a panel of various types of equipment, and the like, may omit weighting of the base. In these embodiments the base may include mounting features such as bolt or screw holes, clamps or latches, or other attachment structures for coupling the UID to a separate device or piece of equipment.

By allowing the user's hand 310 to rest upon the user interface device 100 as shown, the user interface device 100 may more readily be held in place in relation to the operating surface (e.g., a desktop, tabletop, or other supporting surface), such as the operating surface 320 as shown in FIG. 3 through compression. Weighting the base as described above may aid in support. In some embodiments, a textured or rubberized or other grip material or feet (not shown in FIG. 3) may be placed on the bottom of the UID to further aid in maintaining it in position on operating surface 320.

Referring again to FIG. 3, a user may perform various UID actuations while resting a hand on the UID as shown. For example, the user may squeeze the UID with the fingers to cause deformation, rotate or twist the actuator (relative to the top and bottom) about a central vertical axis 330 to effect rotational actions, lift the actuator up or down (relative to the fixed top and bottom) along a Z-axis as shown to effect up or down or vertical translational actions, move the actuator in a two-dimensional motion along the X-Y plane as shown to effect planar translational actions, and the like.

Referring back to FIG. 1 as well as FIG. 2, the base plate 120 of the base assembly may include elements of a dense or heavy material for stabilizing it on an operating surface such as, for example, zinc, brass, lead, or other dense materials for keeping the user interface device 100 stable and stationary upon its operating surface. In alternative embodiments, various other mechanisms for keeping the UID stationary may be used such as, for example, addition of separate weight(s), and/or elastomeric feet (not shown) or other grip or attachment materials or structures, screws, bolts, latches, or other mechanical fasteners, and the like positioned on along the base of the user interface device.

Figure 5:
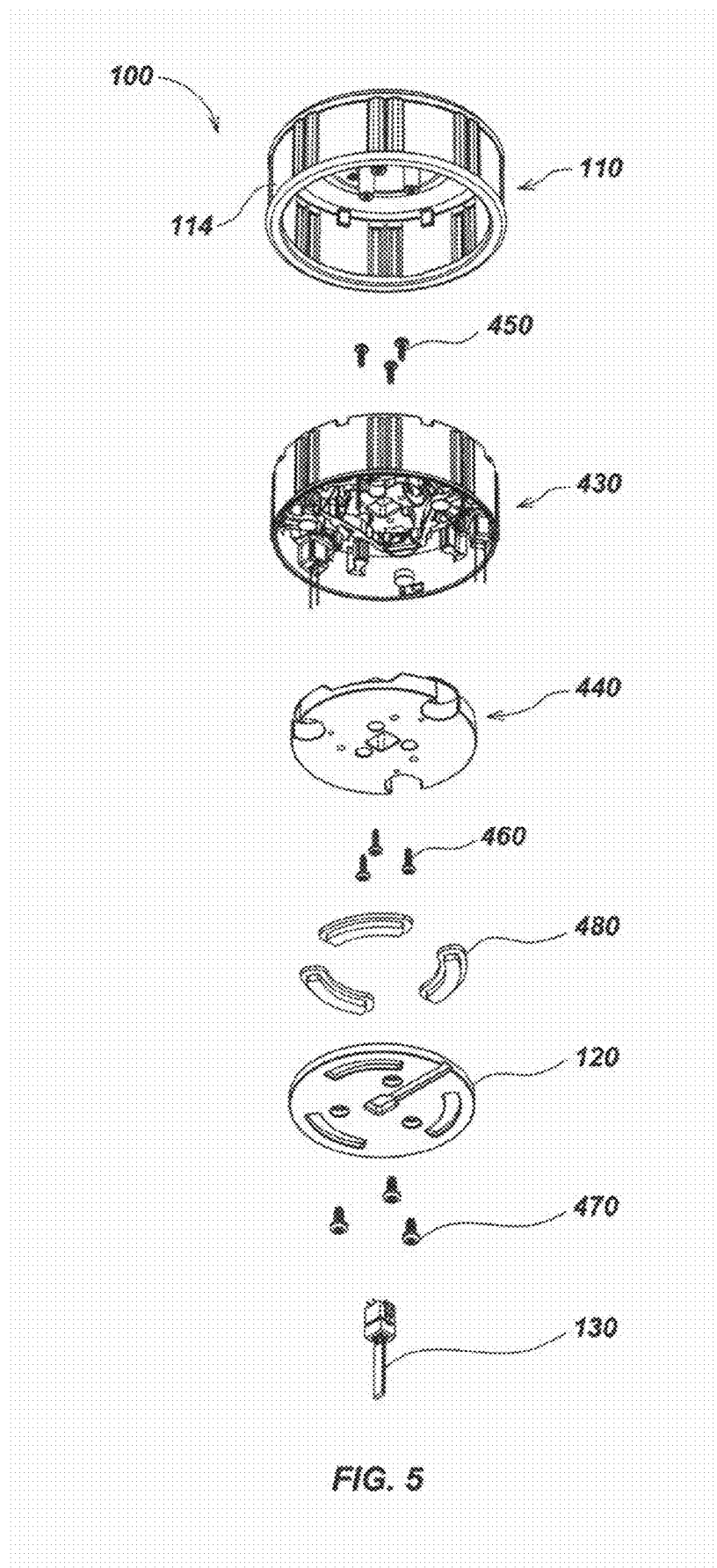
FIG. 5 is a bottom up exploded view of the user interface device embodiment of FIG. 1.

Turning to FIGS. 4 and 5, additional details of the user interface device 100 embodiment are shown. For example, UID 100 may include internal elements comprising an actuator assembly 430 and a limiter assembly 440. In operation, a user may rotate, tilt, twist, squeeze, push, and/or perform a combination of these actions causing movement or distortion of all of or a portion of the actuator assembly (and included magnets), with the movements and/or distortions magnetically sensed by multi-axis magnetic sensors. In an exemplary embodiment the actuator assembly includes an outer actuator element in a cylindrical ring configuration on which an array of magnets are disposed as further detailed in FIG. 8.

The limiter assembly may be included to limit movements of the actuator assembly 430 to prevent overextension and/or damage to elements of the user interface device such as outer or inner actuator elements, springs, and the like. In an exemplary embodiment, the various elements may be attached to the frame at a columnar section within the UID 100. For example, a series of small screws 450 or other attachment elements may be used to secure a frame attachment point of the actuator assembly 430 to the limiter assembly 440, and series of long screws 460 or other attachment elements may be used to secure the limiter assembly 440 to the top assembly 110 of the top of the UID. A series of large screws 470 or other attachment elements may be used to secure the base plate 120 of the base assembly to the limiter assembly 440.

As noted previously, the actuator grip cover or boot 114 may be dimensioned and shaped or formed to fit snugly over the actuator assembly 430 to act as a protective cover and user-grip element to aid in gripping and actuating the user interface device. Elastomeric feet 480 may be secured about the base plate 120 to act as grips to secure the user interface device to an operating surface such as the operating surface 320 of FIG. 3. The elastomeric feet 480 may be made of a sticky material and have high friction to attached surfaces to aid in securing the user interface device to the operating surface.

Figure 8:
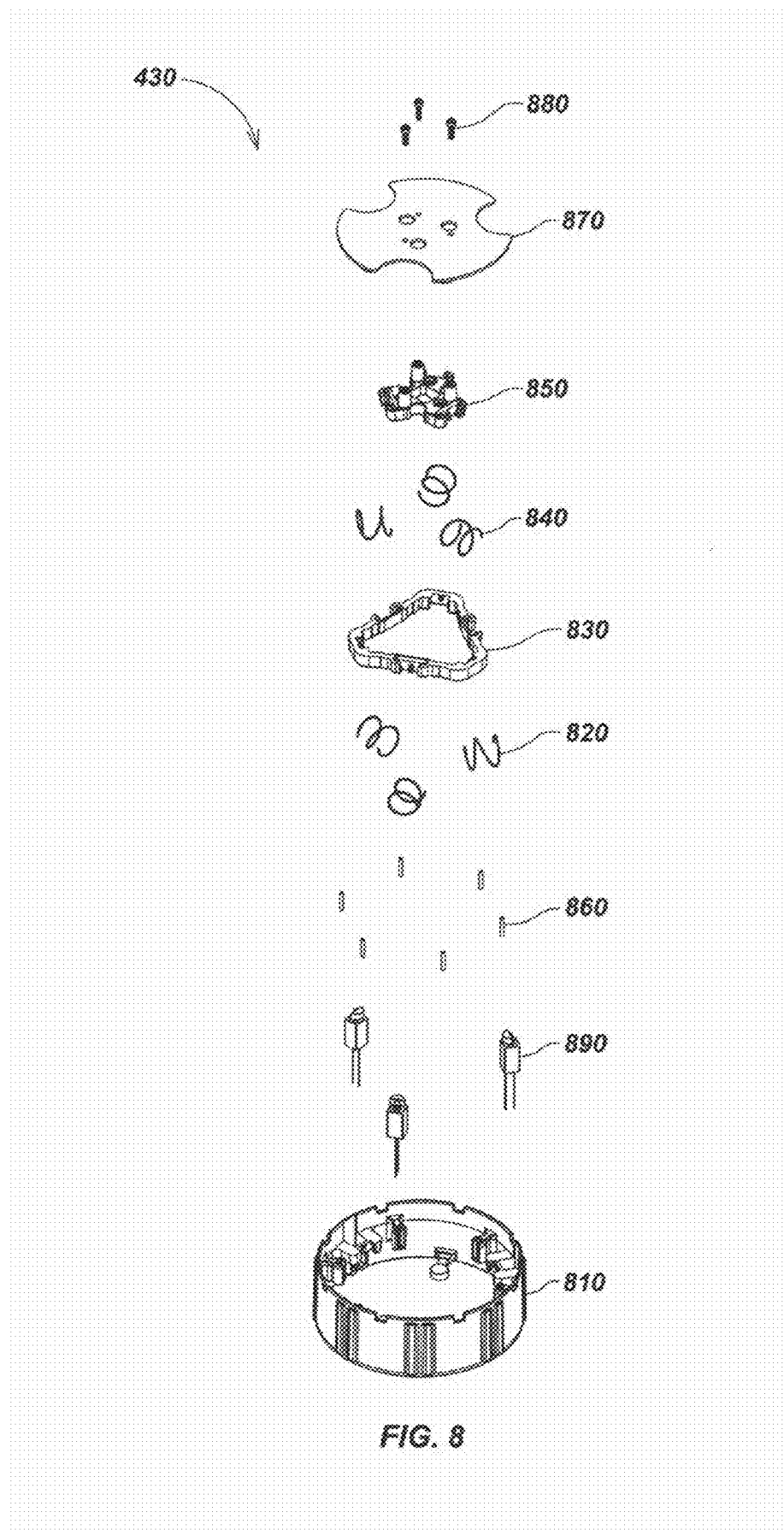
FIG. 8 is a top down exploded view of the actuator assembly embodiment of the user interface device embodiment of FIG. 1.
Figure 9:
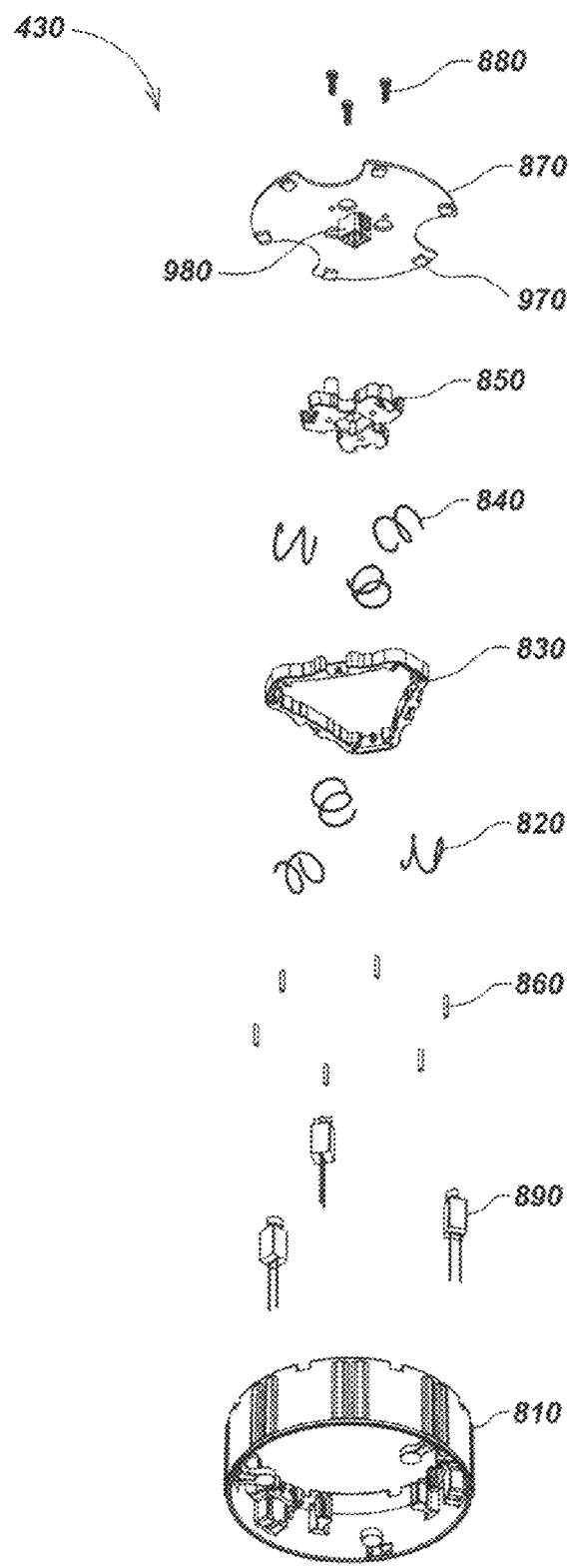
FIG. 9 is a bottom up exploded view of the actuator assembly embodiment of the user interface device embodiment of FIG. 1.

The limiter assembly 440 may comprise dense materials such as zinc or brass metals or other dense materials to keep the user interface device 100 in place on operating surface 320 during use by adding additional weight (when the limiter is positioned near the base of the UID, such as in the embodiment shown). A connector cable 130 may connect to a wiring connector 980 (as shown in FIG. 9), and may be positioned centrally on the underside of a printed circuit board (PCB) 870 (as shown in FIG. 8) on the actuator assembly 430. Alternately, or in addition, a wireless communications module (not shown) may be included in the UID to provide wireless connection of output signals from the UID to a connected electronic computing device or system.

Figure 6:
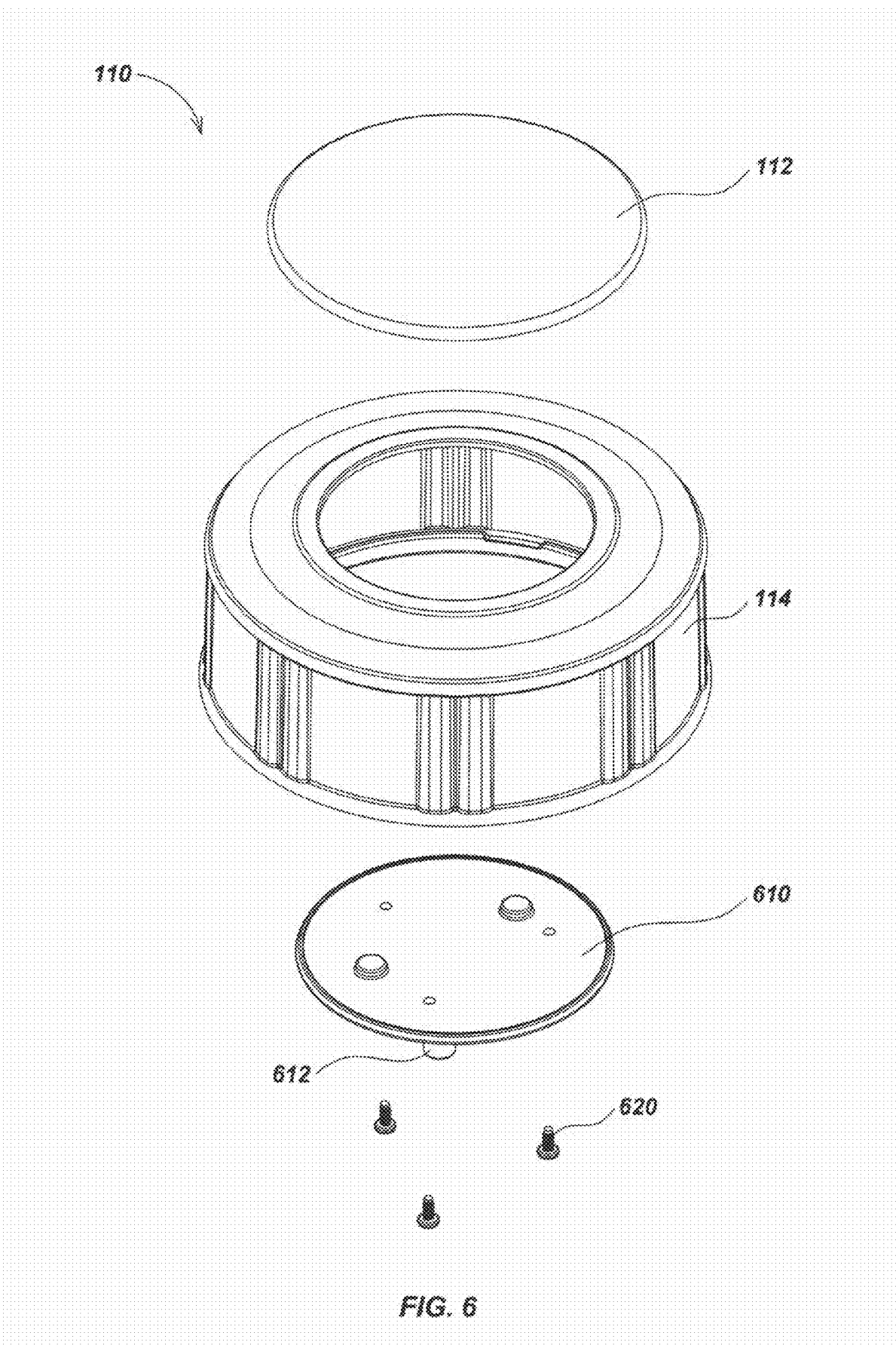
FIG. 6 is a top down exploded view of a top assembly embodiment of the user interface device embodiment of FIG. 1.
Figure 7:
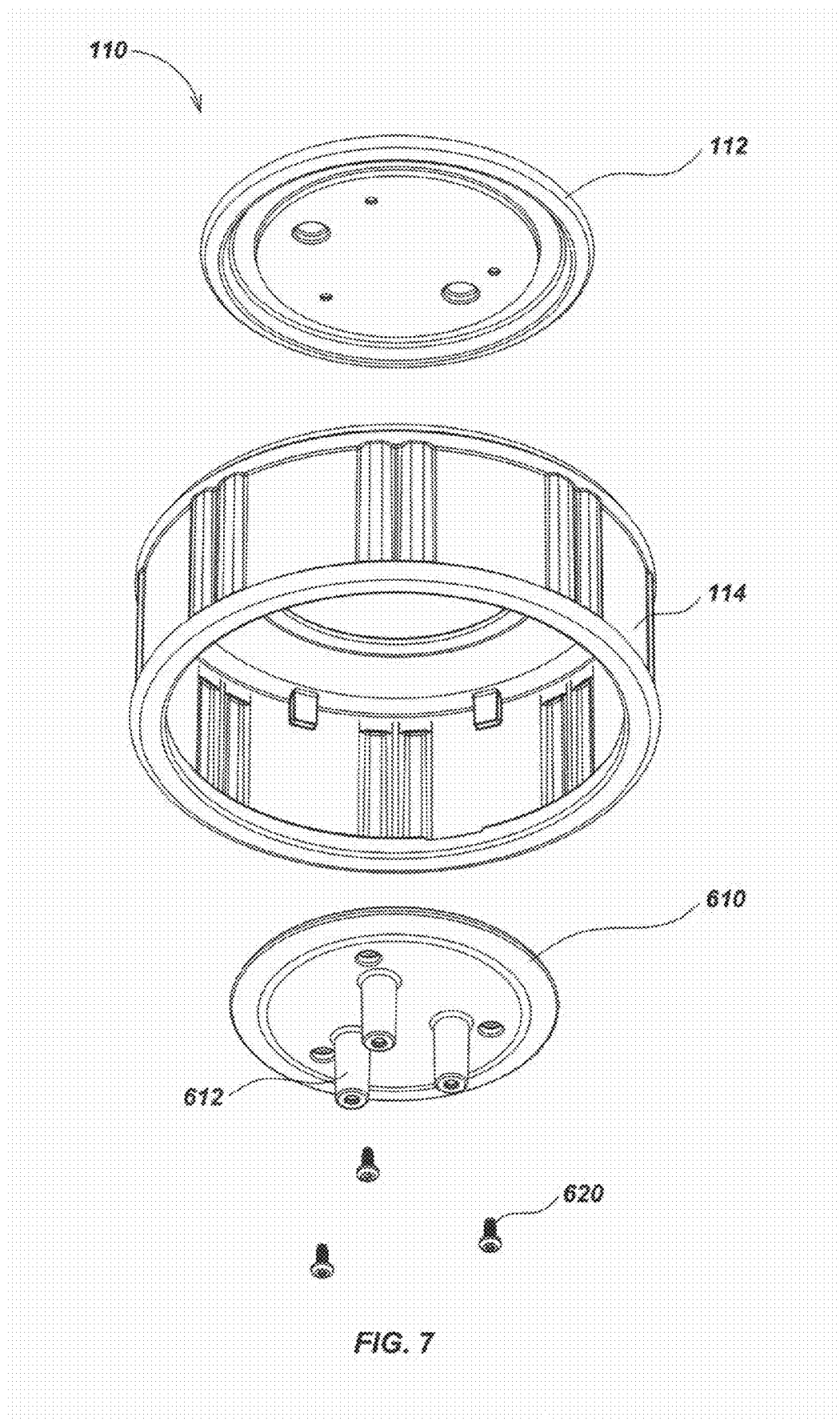
FIG. 7 is a bottom up exploded view of the top assembly embodiment of the user interface device embodiment of FIG. 1.

As illustrated in FIGS. 6 and 7, the top outer plate 112 and a top inner plate 610 of the top assembly 110 may be secured together by a series of top assembly screws 620 or other attachment mechanisms that may secure the top lip of the actuator grip cover 114 between the two plates. A series of screw post features 612 may be formed centrally along the bottom of the top inner plate 610. Holes formed on the bottom of the screw post features 612 may be threaded to accommodate the long screws 460 of FIG. 4. In assembly, the screw post features 612 may fit through holes formed through the actuator assembly 430 (FIG. 4) allowing the top assembly 110 to be secured to the limiter assembly 440 (FIG. 4) via the long screws 460 (FIG. 4). The top assembly 110, limiter assembly 440, base assembly, and/or actuator assembly 430 may be coupled using other attachment mechanisms in alternate embodiments.

In various embodiments of dual spring user interface devices, the actuator assembly may be coupled to the frame through a mounting or core-join element mechanically coupled by a first or inner array of springs to an inner or intermediate actuator element that is mechanically coupled via a second or outer array set of springs to an outer actuator element, thereby comprising a dual spring array actuator assembly. In some embodiments, additional intermediate elements and/or corresponding spring arrays may also be included (not shown herein). For example, as shown in the exemplary embodiment of actuator element 430 as shown in further detail in FIGS. 8 and 9, the actuator assembly 430 may include an outer element in the form of an outer actuator element or grip 810, a series of outer springs 820 comprising an outer spring array, an intermediate or inner actuator element 830, which may be of a triangular shape as shown to provide an overlapping spring array configuration, and a series of inner springs 840 comprising an inner spring array. A mounting or core-join element 850 may be used to couple the actuator assembly to the frame in the central columnar section. An array of magnets 860, and a PCB 870 that may be coupled to the frame or core join element 850 by a series of PCB screws 880 or other attachment mechanisms, such as pins, adhesives, solder, and the like may be included. Magnetic sensors may be disposed on the PCB, as may be additional electronic elements (not shown) such as one or more processing elements, analog or digital circuitry, LED or other lights, haptic feedback elements, speaker or audio output elements, microphones or audio input elements, and the like.

Figure 34:
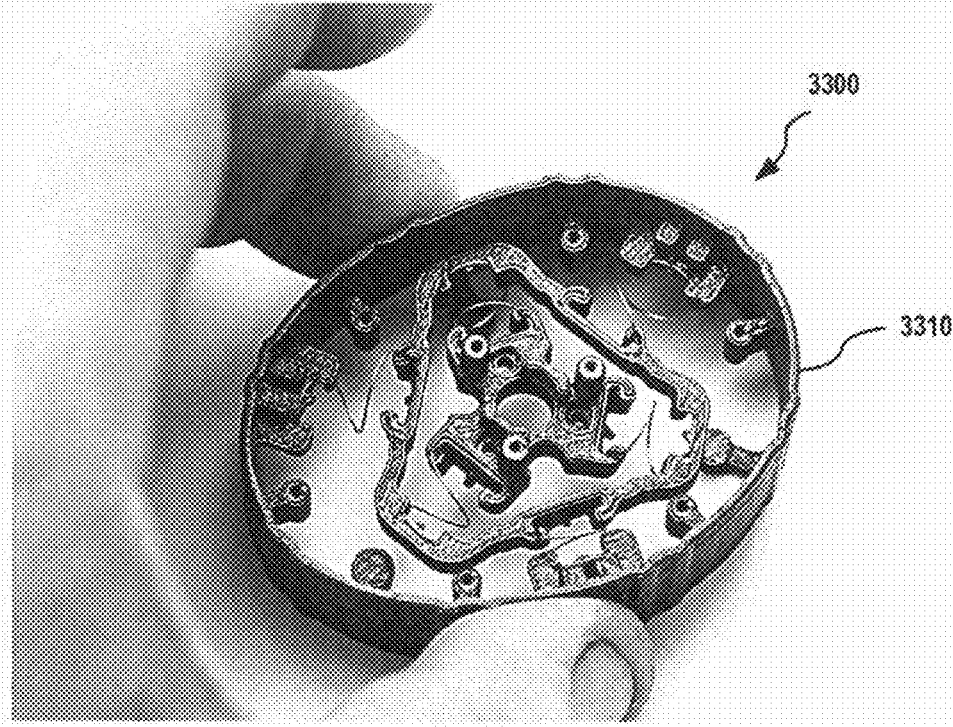
FIG. 34 illustrates an example actuation of the actuator assembly element of FIG. 33.

FIG. 34 illustrates portions of one embodiment 3300 of elements of an actuator assembly (additional elements have been removed for clarity) that may correspond to actuator assembly 430 in a dual spring array configuration. Embodiment 3300 includes an outer actuator or grip element 3310, which may be formed in a cylindrical shape from a semi-rigid plastic or other material that retains a rest position shape but can bend or flex in response to a user squeeze action, such as shown in FIG. 34, and then return to the relaxed or released state position. Three springs 3320 comprising an outer spring array mechanically couple the outer element 3310 to an inner actuator element 3330 (although three springs are used in the illustrated exemplary embodiment, alternate embodiments may use fewer or more springs in various shapes and configurations between outer element 3310 and inner element 3330).

As shown in FIG. 34, inner actuator element 3330 may substantially retain its shape when outer actuator element 3310 is squeezed as shown, however, inner actuator element 3330 may comprise a semi-rigid plastic or other material (which may be the same as or similar to the material used in outer element 3310) that allows some flex or bending when the outer actuator element 3310 is squeezed, twisted relative to the inner actuator element 3330, rotated, lifted, or otherwise moved or distorted through user interaction with the actuator assembly. Inner actuator element 3330 may be mechanically coupled to mounting or core-join element 3350 using springs 3340 as shown comprising an inner spring array (as with springs 3320, although three springs are used in the illustrated exemplary embodiment, alternate embodiments may use fewer or more springs in various shapes and configurations between the middle element 3330 and inner element 3350).

Various types of springs may be used in this embodiment as well as other embodiments described herein. In an exemplary embodiment the springs are formed from spring steel or other metallic spring materials such as tin-plated music wire or plain music wire. The spring geometry of an exemplary embodiment is a compressing spring with two active coils and open coil ends, having dimensions of 0.350 inches long and 0.350 inch outside diameter, with a 0.010" wire diameter. Alternate embodiments may use various coil shapes, sizes, and wire diameters depending on the internal space of the UID and actuator assembly. For example, in alternate embodiments to those described herein wire diameters of from approximately 0.008" through 0.018" may be used. The spring coil sizing and wire diameter may significantly affect feel and operation of the UID and may be tuned to a particular UID size and internal element shaping and dimensions. Therefore, alternate spring configurations may be used in various embodiments. In addition to metallic wires, other embodiments may include springs of other materials such as plastics, foam or rubber type materials, and/or other materials having spring action properties. Likewise, while coiled springs are used in an exemplary embodiment, other embodiments may use other spring shapes such as bars or plates, non-circular coils, and the like.

In the illustrated embodiment, wherein a 0.01" wire diameter coil spring is used, the spring constant is non-linear, having characteristics as described below in Table 1 illustrating applied force versus spring displacement. Springs of various types having similar spring constants over some or all of the operating range may be used in alternate embodiments, as may other springs in embodiments having different operating requirements (e.g., more sensitive, as with an earthquake or vibrational sensor application, less sensitive in a machine or vehicle control application).

TABLE 1

Spring Characteristics of Exemplary UID Embodiment for Two Test Runs

| RUN 1 | | | RUN 2 | |
|---|---|---|---|---|
| force (grams) | displacement (micrometers) μm | | force (grams) | displacement (micrometers) |
| 0 | 0 | 0.0154 gram/μm | 0 | −37 |
| 1 | 69 | 1.00E+06 μm/m | 1 | 90 |
| 1.5 | 130 | 1.00E+03 gram/kg | 2 | 171 |
| 2 | 173 | 1.54E+01 kg/meter | 10 | 537 |
| 3 | 222 | 9.8 1 m/s$^2$ | 30 | 1000 |
| 4 | 249 | 151.0 newton/meter | 55 | 1500 |
| 5 | 308 | | | |
| 6 | 414 | | | |
| | | 151.0 newton/meter | | |

Figure 33:
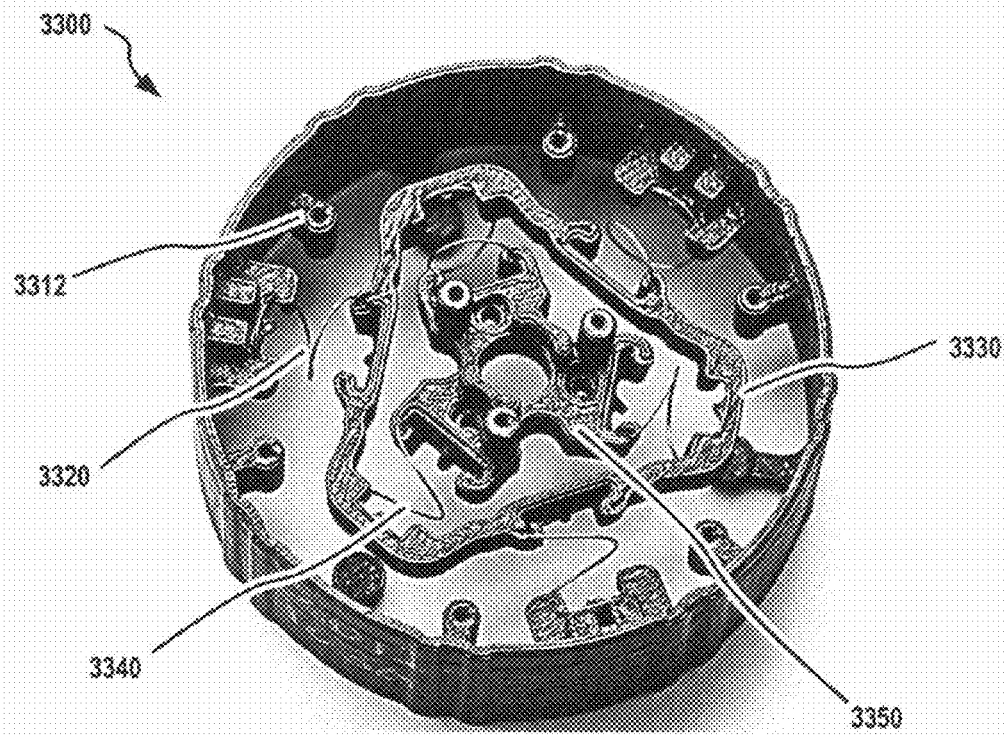
FIG. 33 illustrates details of elements of an actuator assembly embodiment.

Magnets (not shown in FIGS. 33 and 34) may be mounted on the outer actuator element, such as on the arms 3312 as shown in FIG. 33. In an exemplary embodiment, six magnets and corresponding magnetic sensors (not shown) may be used; however, alternate embodiments may use fewer or more magnets in various shapes and configurations. In an exemplary embodiment the magnets are mounted equidistantly around the actuator assembly, such as on a cylindrical-shaped outer actuator element as shown when the UID is in a released state. In addition, in some embodiments electromagnets may be used in addition to or in place of permanent magnets. In addition, in some embodiments, additional intermediate (e.g., inner) elements may be used, for example, in the form of an intermediate element in two or more component parts, or two or more concentric middle elements, which may be coupled to additional sets of springs or spring arrays. For example, in some embodiments, triple spring arrays, rather than dual spring arrays (inner and outer spring arrays as shown in FIG. 34) may be used.

As shown in FIG. 34, when a user actuates a user interface device such as described herein, the outer actuator element 3310 distorts in shape, and the corresponding positions of the magnets may be sensed at corresponding magnetic sensors (not shown), with the sensed magnet information then provided to one or more processing element. The processing element(s) may then generate information about the actuation, such as positional information, rotation or twist information, tilt information, squeeze information, rise or fall (vertically) information, or other information associated with distortion of the outer element and change in position and/or orientation of the corresponding magnets. With multi-axis magnetic sensors used to sense the magnetic fields generated by the magnets, position, rotation, tilts, deformations, and the like of the magnets may be sensed for each magnet and used to generate a map or representation of the overall change in position and/or distortion of the outer element. This information may then be provided as an output signal from the UID to a coupled electronic communication device or system.

In some embodiments, additional magnets and/or magnetic sensors may be used and may be positioned on the outer actuator element, inner actuator element, or on other elements of the actuator assembly, or on or coupled to the frame, to provide further movement or deformation information. Further, the outer actuator element, inner actuator element, and/or other actuator elements may comprise multiple component parts or elements that may be rigidly fixed relative to each other or may be loosely coupled in some embodiments to allow further movement of the magnets in response to user actuations.

Returning to FIG. 8, one or more vibration motors, such as the vibration motors 890 as shown, or other haptic output elements, may also be included to provide haptic feedback to the user. For example, in the user interface device embodiment 100, multiple vibration motors 890 may be used that may be controlled in timing, intensity, vibrational frequency, and/or direction to provide unique haptic feedback to the user in response to particular actions or as feedback from a coupled computer or other electronic computing device or system. For example, in some embodiments the haptic feedback may be generated in response to a signal received at the UID from a connected electronic computing device or system, such as through a USB connector cable such as cable 130. As one example, a software application running on the electronic computing device may provide feedback when a pointer being controlled by the UID is in proximity to an object displayed on a computer display so as to notify the user that the object is within a certain distance. User actuations of the UID may then be used to interact with the object, such as by allowing a user to squeeze the actuator assembly to pick up the object or move the object through translation, tilt, lift, rotation, and the like. Various other haptic feedback control signals may be used to control output of the haptic feedback elements of the UID, either from actions or states internal to the UID or from external feedback signals from a coupled electronic computing device or system. The outer springs 820 of the outer spring array and the inner springs 840 of the inner spring array may comprise tin plated wire or other electrically conductive material so as to, when used in combination with other wiring (not illustrated), electrically connect the vibration motors 890 to circuit elements on the UID's printed circuit board or externally.

In an exemplary embodiment, the actuator grip 810 may be largely cylindrical in shape and may comprise materials such as elastomers, rubber materials, flexible plastics, or other materials allowing the actuator grip 810 to bend and flex when squeezed by a user, as well as being translated, rotated, or lifted up or down. The material used may be selected based on the UID geometry to have an approximately rigid state when minimal squeeze pressure is applied so as to primary allow for translation, rotational, tilt, or lift actions. As further pressure is applied, the material may flex to allow deformation actions, such as squeeze actions, where the overall shape of the outer actuator element is deformed, such as from circular to oval.

When such forces are applied to the actuator grip 810, one or more of the magnets 860 may move relative to paired magnetic sensors 970 (as shown in FIG. 9) on the underside of the PCB 870. The magnetic sensors 970, which may, for example, be three axis MLX-90399 sensors available from Melexis Microelectronic Integrated Systems or other multi-axis magnetic sensors, or arrays of single axis magnetic sensors, may generate signals analogous to the corresponding magnet displacement. These signals may then be provided to one or more processing elements, such as the processing element 1810 of FIG. 18, which may process the received magnetic sensor signals and determine a specific command or control output signal to be provided to a coupled electronic computing device or system, such as, for example, a movement of an object in CAD program, the selection of a menu item in virtual space, movement of a vehicle (e.g., a manned or unmanned vehicle such as an aerial drone), construction equipment such as buckets, lifts, shovels, or other user interface functions on various devices where multi-axis control is used.

The mounting or core-join element 850 may be secured to the top assembly 110 (as shown in FIG. 4) and the limiting assembly 440 (as shown in FIG. 4) and may be configured to remain stationary relative to the base and operating surface, while the actuator assembly 440 may move during displacements from user actuation such as described previously.

A wiring connector 980 (as shown in FIG. 9) may be positioned centrally on the underside of the PCB 870. The wiring connector 980 may be configured to mate with the connector cable 130 (as shown in FIG. 4) and allow communication between components connected to the PCB 870, such as the magnetic sensors 970 (as shown in FIG. 9), and one or more processing elements, such as the processing element 1810 of FIG. 18. The wiring connector 980 may also be dimensioned so as to fit within or allow connected wiring, such as the connector cable 130 (as shown in FIG. 4), to pass through wiring passage 1054 (as shown in FIG. 10) on the core-join element 850. In some embodiments, optical or wireless, rather than electrical, output connections may be used. In an exemplary embodiment the connector 980 is a USB connector, however, other connector types and associated communication standards may be used in alternate embodiments.

Turning to FIG. 10, additional details of the actuator assembly embodiment 430 are illustrated. As shown in FIG. 10, the actuator assembly may include a series of magnet retaining arms 1012, which may be formed extending inwards along the circumference of the actuator grip or outer actuator element 810 to retain the magnets 860 in the outer element. In an exemplary embodiment, a total of six of the magnet retaining arms 1012 are formed to accommodate a total of six of the magnets 860, however, other embodiments may use fewer or more magnets and magnetic sensors in various shapes and orientations, along with corresponding magnetic sensors.

A series of three grip spring retention features 1014 and three limiting arms 1016 may also be formed extending inward along the circumference of the outer actuator element 810. The limiting arms 1016 may be formed such that each limiting arm 1016 may extend within a limiting pocket 1112 (FIG. 11) on the limiter assembly 440 (FIG. 11) so as to limit the travel of the outer actuator element 810 when in use. The limiting arms 1016 may be covered with a soft elastomer or other cushioning material to serve as a cushioning limiting stop bumper.

The outer springs 820 of the outer spring array may extend radially between the actuator grip 810 and the middle or mid-ring element 830 such that one end of each of the outer springs 820 may be secured to or within one of the grip spring retention features 1014 on the outer actuator element 810, and the opposite end of each outer spring 820 may be secure to or within an inner actuator element spring retainer feature 1032 on the inner actuator element 830. In some embodiments, such as shown in FIG. 40 as element 4070, a damping material, such as memory foam or other damping materials or elements, may be disposed within or coupled to the inner and/or outer springs of the inner and outer spring arrays to dampen spring movement. The damping material may be adhesively or thermally bonded to the springs, such as by heating the spring wires to melt and mold, through magnetic induction or other processes, the damping material to or around the interior of the springs.

In an exemplary embodiment, the end of the outer springs 820 may be secured in place using magnetic induction or other mechanisms, such as through use of adhesives, clips, and the like. Details of use of a magnetic induction method as may be used in various embodiments in combination with the disclosures herein is provided in co-assigned U.S. patent application Ser. No. 13/110,910, filed May 18, 2010, entitled USER INTERFACE DEVICES, APPARATUS, AND METHODS, the content of which is incorporated by reference herein.

The inner springs 840 of the inner springs array may extend radially between the inner actuator element 830 and the core-join element 850 such that one end of each of the inner springs 840 may be secured to or within an inner actuator element spring retainer feature 1034 on the inner actuator element 830, and the opposite end of each inner spring 840 may be secure to or within a core-join spring retainer feature 1052 on the core-join element 850. The core-join element may be integral with the frame or coupled to the frame, such as in the central columnar area of the frame. A wiring passage 1054 (as shown in FIG. 10) formed through the core-join element 850 may be used for the connector cable 130 (as shown in FIG. 4) to pass through.

The aforementioned magnetic induction method may likewise be used to secure the inner springs 840 in place. The use of multiple concentric spring assemblies, such as that present with the use of the outer springs 820 and the inner springs 840 in a dual spring configuration as shown, may advantageously allow for a greater range of motion to the actuator grip 810 with attached magnets 860. Further, by shaping the actuator elements and arraying the spring arrays as shown, movement may be further enhanced by having an overlapping spring array configuration, where the inner ends of the outer array springs are closer to the center of the UID than the outer end of the inner array springs. In some embodiments, additional levels of springs and elements, such as a triple spring configuration with two inner elements, may also be used to provide greater range of motion and/or distortion. Examples of actuator grip 810 and magnet 860 displacements are further illustrated and described subsequently herein with respect to FIGS. 12-17, as well as FIG. 34.

Figure 11:
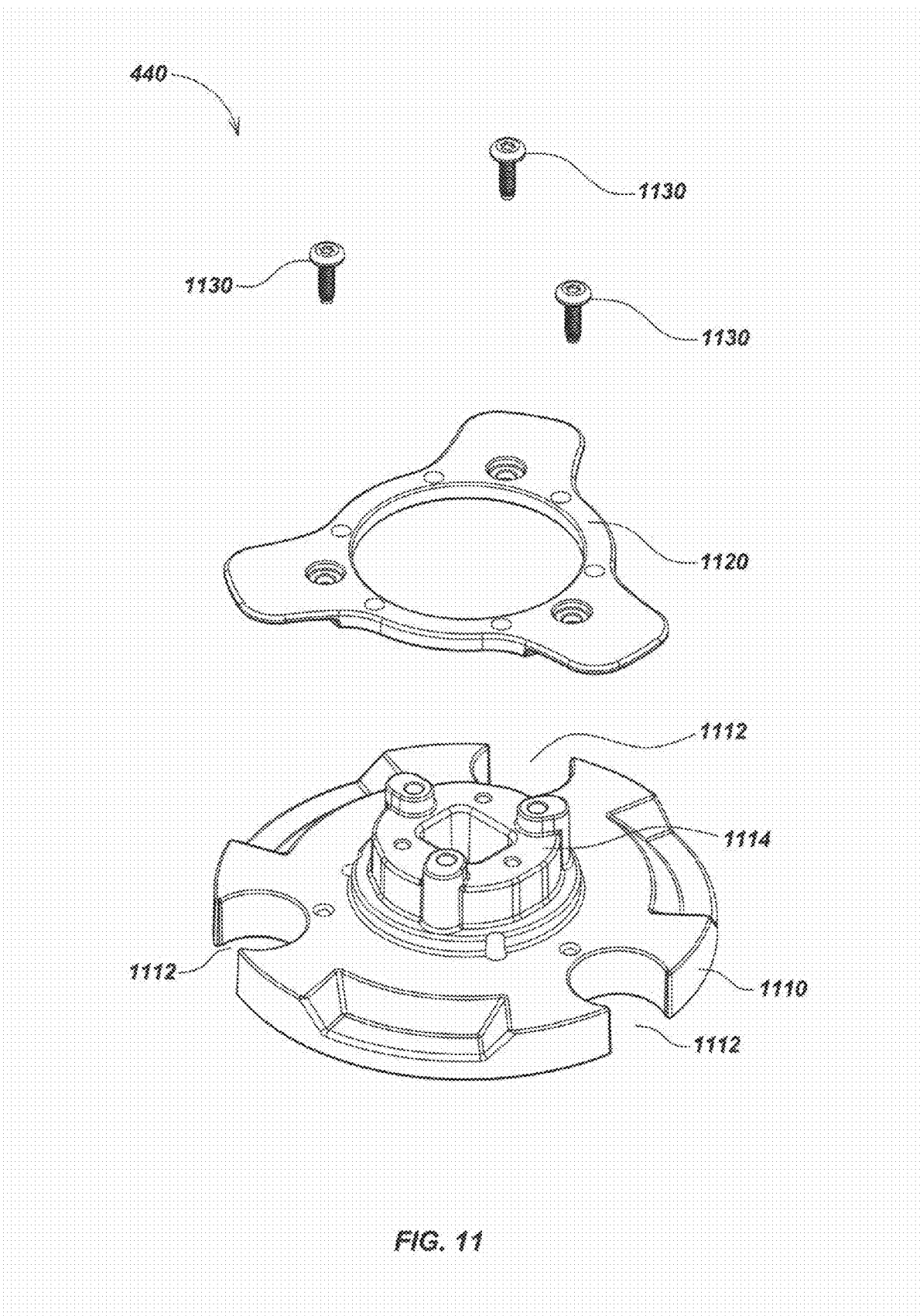
FIG. 11 is a top down isometric view of the limiter assembly embodiment of the user interface device embodiment of FIG. 1.

Turning to FIG. 11, additional details of the limiter assembly embodiment are illustrated. For example, the limiter assembly 440 may include a limiting plate 1110 and cover plate 1120. The limiting plate 1110 may be formed with a series of limiting pockets 1112 and a central mounting feature 1114. In assembly, each limiting pocket 1112 may allow one limiting arm 1016 (as shown in FIG. 10) on the outer actuator element 810 to extend within the limiting pocket 1112. The cover plate 1120 may secure to the top of the limiting plate 1110 through the screws 1130 (or other attachment mechanisms) such that top of each limiting pocket 1112 is covered by a section of the cover plate 1120 and the central mounting feature 1114 may extend centrally through the cover plate 1120. The travel of the outer actuator element 810 with attached limiting arms 1016 may thereby be limited. The core-join element 850 (as shown in FIG. 8) may secure atop the central mounting feature 1114 through the use of screws 450 (as shown in FIG. 4), securing the actuator assembly 430 (as shown in FIG. 4) to the limiter assembly 440 (as shown in FIG. 4). The limiter assembly may be part of or coupled to the frame and columnar section, such as between the top assembly and bottom assembly.

Figure 12:
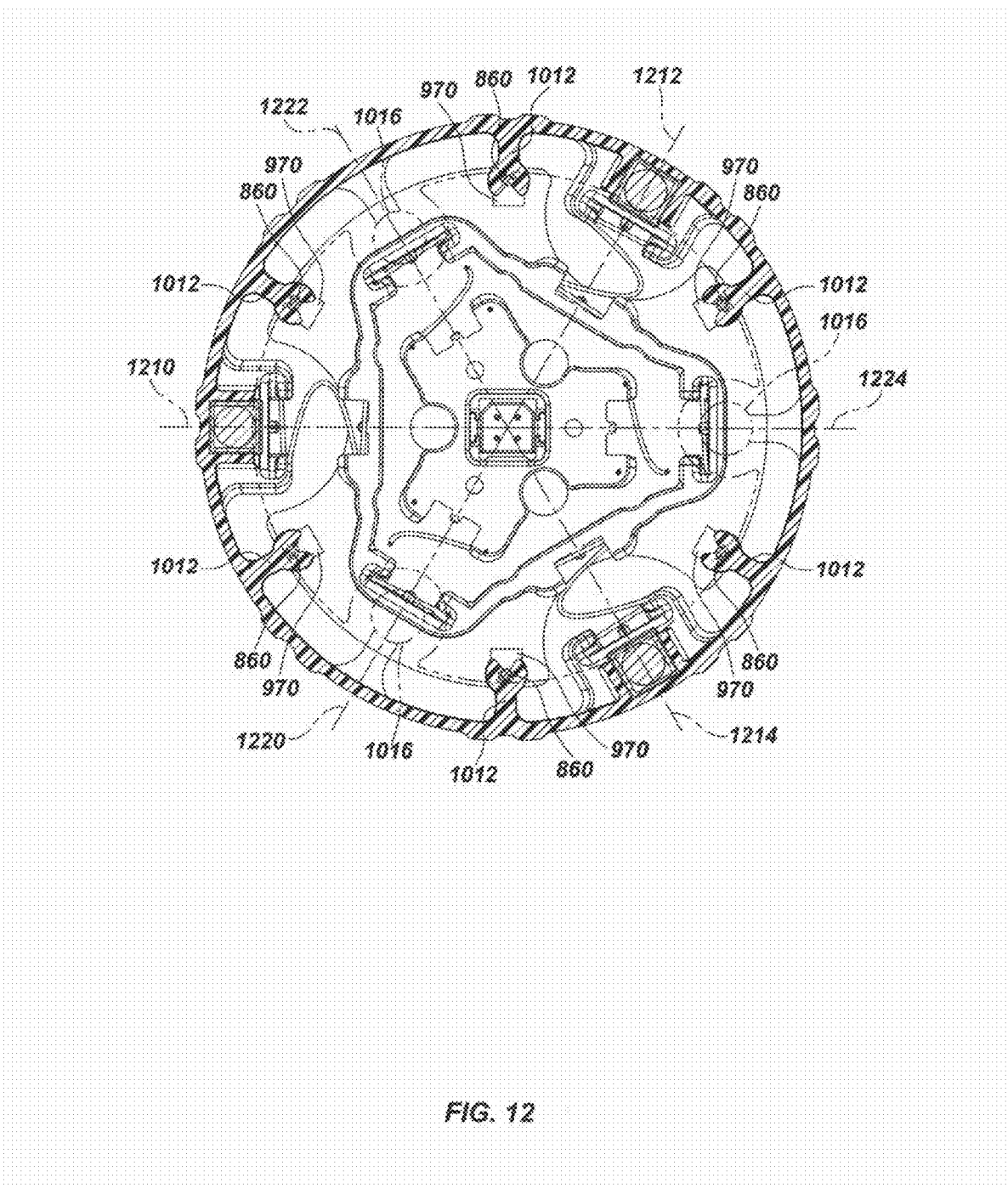
FIG. 12 illustrated a top sectional view of a user interface device embodiment in a released state.
Figure 13:
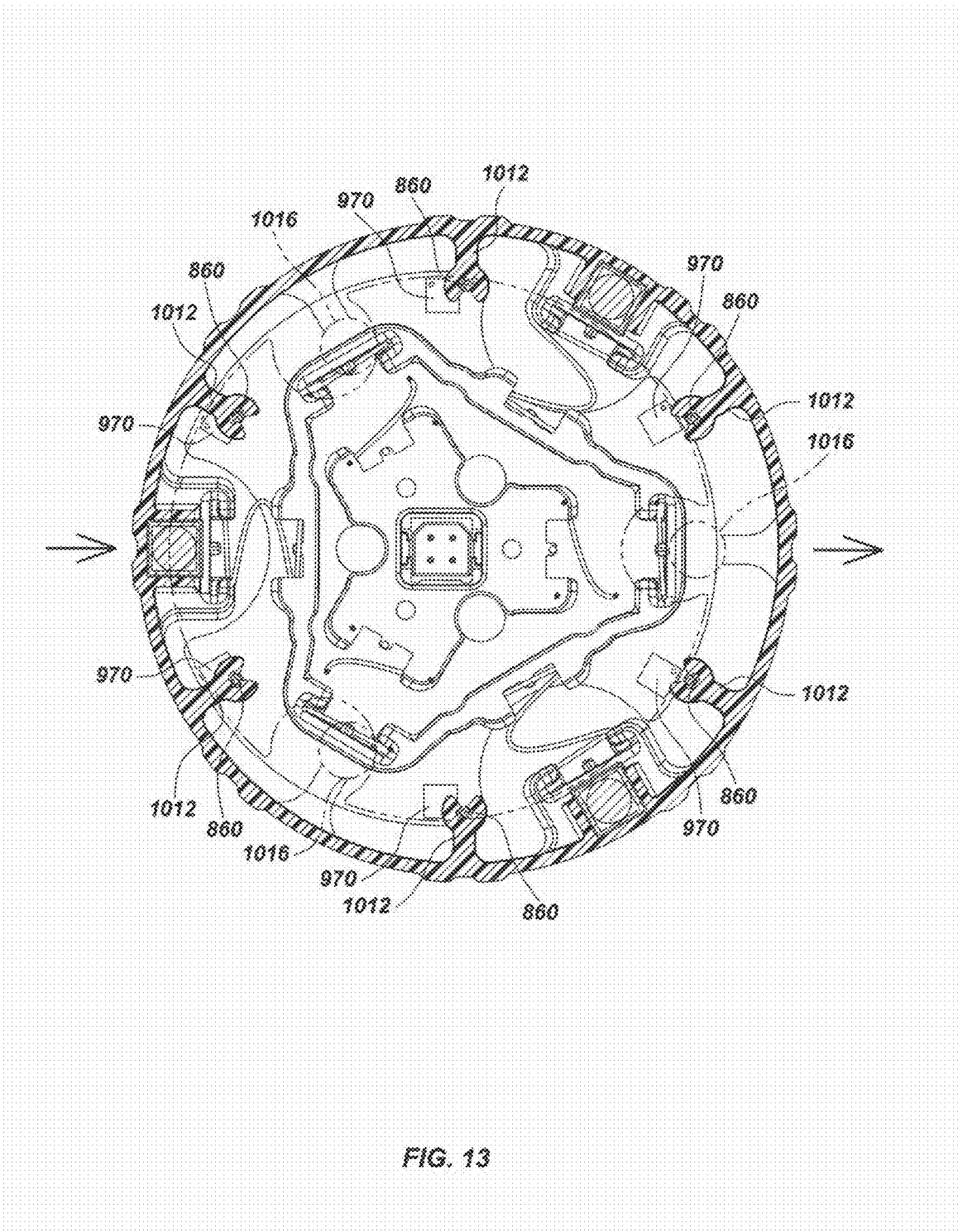
FIG. 13 illustrates a top sectional view of the user interface device embodiment of FIG. 12 in laterally displaced state.
Figure 14:
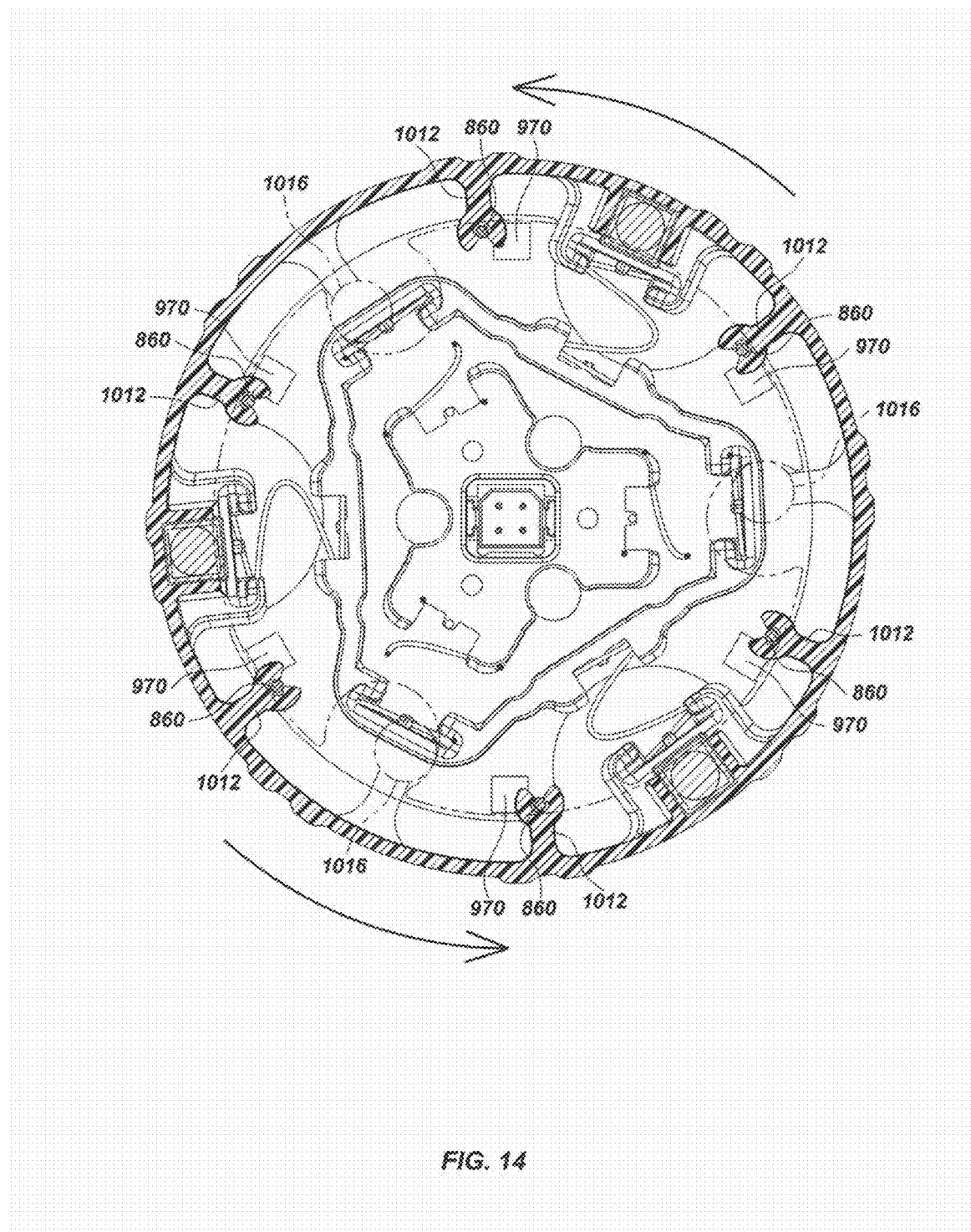
FIG. 14 illustrates a top sectional view of the user interface device embodiment of FIG. 12 during a rotation about a vertical axis.
Figure 15:
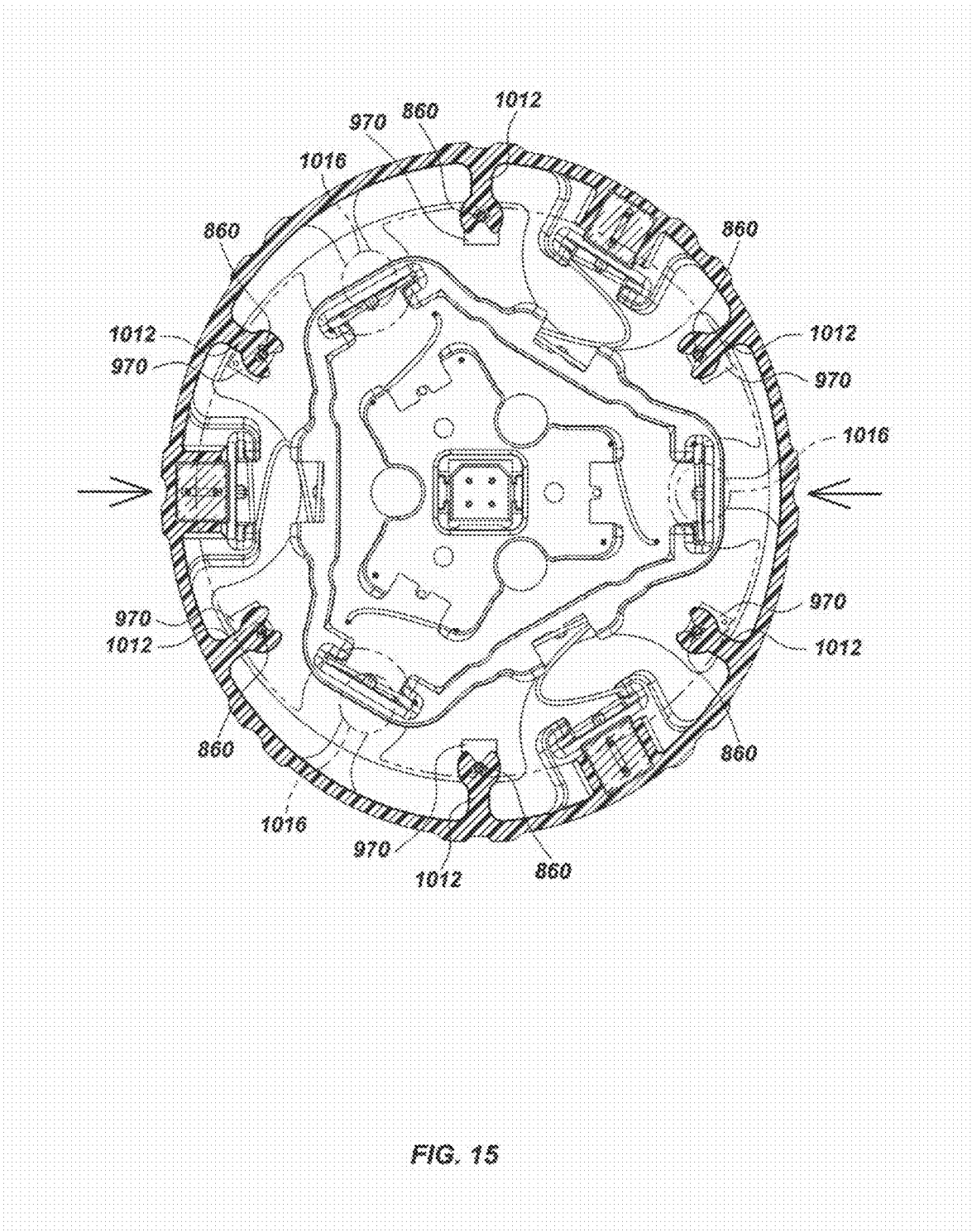
FIG. 15 illustrates a top sectional view of the user interface device embodiment of FIG. 12 during a squeeze-type action.
Figure 16:
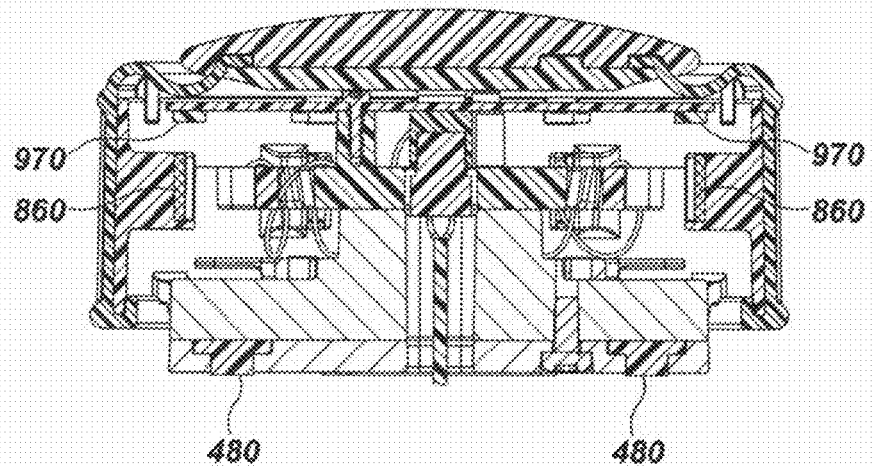
FIG. 16 illustrated a side sectional view of a user interface device embodiment in a released state.

Various example displacements of components within the actuator assembly 430 are illustrated in FIGS. 12-17, and FIG. 34. For example, FIG. 12 illustrates a top sectional view of a user interface device 100 in a released state, placed on an operating surface. In this state, the magnets 860 are positioned relative to corresponding magnetic sensors 970 in their released-state or relaxed position absent user actuations and only subject to external forces such as gravity. FIG. 13 illustrates a top sectional view of the user interface device 100 during a side-to-side, front-to-back, or other lateral displacement, with the magnets positioned relative to their corresponding magnetic sensors in offset positions relative to their released state, with the magnet offset sensed by the magnetic sensors by measuring the corresponding magnetic fields in multiple axes and providing corresponding output signals to a processing element. FIG. 14 illustrates a top sectional view of the user interface device 100 during a rotation actuation about a vertical axis as shown by the arrows, again illustrating positioning of the magnets 860 and corresponding magnetic sensors during this example user action, while FIG. 15 illustrates a top sectional view of the user interface device 100 during a squeeze-type displacement, with pressure applied to the outer actuator element as shown by the arrows.

Figure 17:
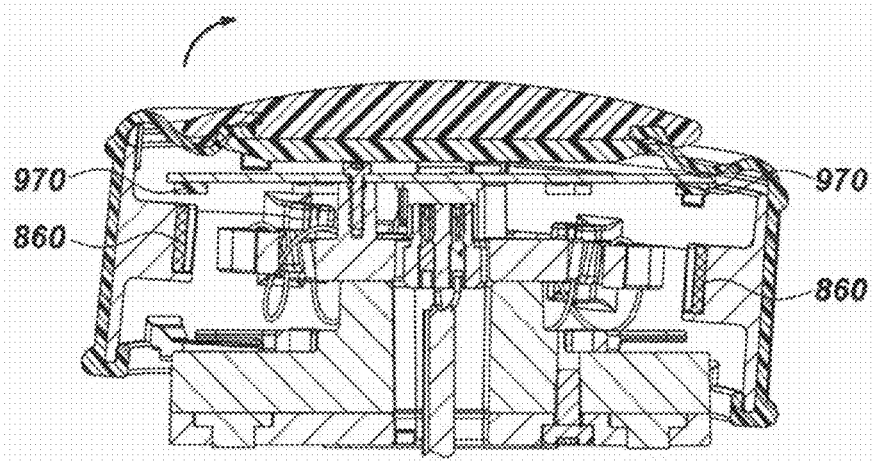
FIG. 17 illustrates a side sectional view of the user interface device embodiment of FIG. 16 during a rotation about a horizontal axis.

FIG. 16 again illustrates the user interface device in a released state, in this drawing showing a side sectional view, while FIG. 17 illustrates a side sectional view of the user interface device 100 during a rotation about a horizontal axis, illustrating position of the magnets 860, magnetic sensors 970, and outer and inner actuator elements along with the mounting or core-join element of the user interface device during this actuation. FIG. 34 illustrates a top view of a portion 3300 of an actuator assembly showing distortion of outer, inner and core-join elements (additional elements of the actuator assembly are omitted from FIG. 34 for clarity).

In operation, magnetic sensors, such as magnetic sensors 970 as shown, sense magnetic fields, typically in multiple axes, from corresponding magnets, such as magnets 860, and generate output signals corresponding to the sensed magnetic fields. These sensed magnetic field signals may then be provided to one or more processing elements, where they may then be further processed to determine position information associated with the corresponding magnets, which may in turn be used to determine overall positions and deformations of the actuator assembly 430 responsive to user-applied actuations, and corresponding output signals or commands may be generated in the processing element and provided to a coupled electronic computing device of system.

Figure 18:
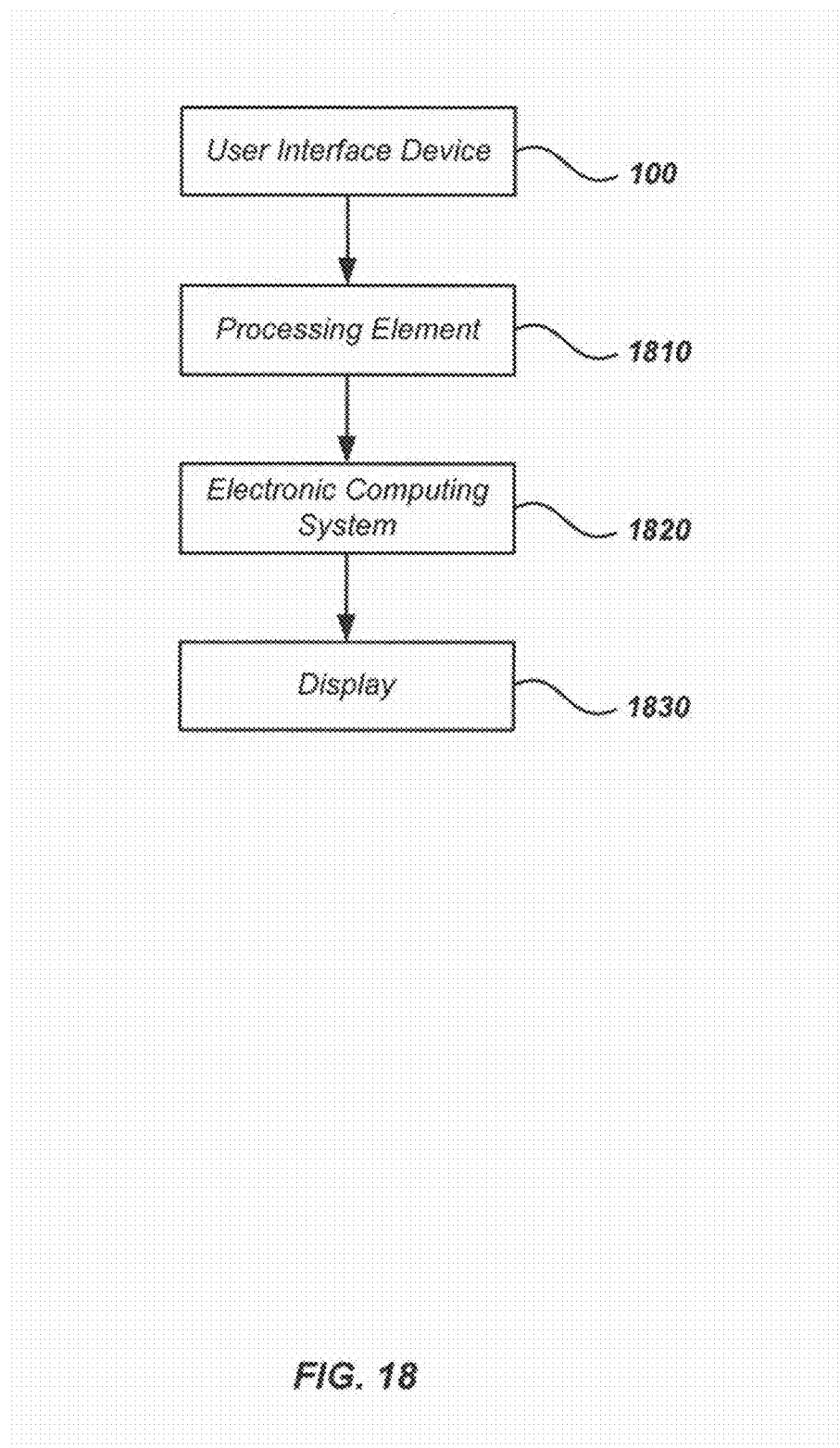
FIG. 18 is a block diagram demonstrating an example data flow of a user interface device embodiment.

For example, as illustrated in FIG. 18, the magnetic sensors 970 may generate signals associated with the various displacements of the magnets 860 in multiple axes, and thereby the attached actuator assembly 430 of the user interface device 100. Such signals generated by the magnetic sensors 970 in response to the displacements may be processed in a processing element 1810 and then mapped to corresponding commands or outputs, depending on the determined position and/or distortions of the actuator assembly. This processing may be done in various ways. For example, a model of the magnetic field signals for various defined distortions of the magnets may be generated through an initial calibration process and stored as a look up table or formula within the processing element. Then this information may be compared during operation with the sensed magnetic fields and an output generated based on the translations and/or deformations of the actuator assembly during calibration. In another implementation, a closed-form model of the actuator translations and deformations may be developed using data collected during a test procedure where the UID is subjected to displacements and distortions within the operating range of device, such as within all or part of the operating range as mechanically limited by the springs or as limited by a limited assembly within the UID or other limiting mechanism. This data may be then be used in a mathematical modeling program such as MatLab or Mathematica to generate a closed-form model, which may then be loaded into a memory of the processing element or coupled to the processing element, such as in firmware. During use, the magnetic sensor output data may then be applied to the loaded model and output signals corresponding to the translations or deformations generated from the model for provision to a coupled electronic computing device or system.

Example output signals may correspond with standardized movements (e.g., as provided under the USB standards for computer mice or joystick) or may be customized to a particular application or system of the coupled electronic computing device or system. For example, by tilting actuator grip 810 in one direction, a command generated and provided to the electronic computing system 1820 may be a command to rotate (or otherwise translate or distort or deform) an object in virtual space in an analogous direction. The electronic computing system 1820 may then command a display 1830 or other visual interface device to show the rotation of the virtual object (e.g., in software in a computer-aided-design or CAD system). The specific command or commands associated with each displacement of the actuator grip 810 may be different and may be customizable for each particular application. For example, in applications such as Google Earth, actuations may be mapped to motions such as translations across a map or image of the Earth's surface, up or down motion, twists or rotations, zooms in or out, and the like so that a user can zoom around within the modeled Earth in multiple degrees of freedom. Similarly, a control system for a vehicle such as a manned or unmanned vehicle (e.g., an aerial UAV or drone), or construction or other equipment, may be in the associated electronic computing device and may command the vehicle, in response to the UID output signals, to move around in three-dimensional space.

Figure 19:
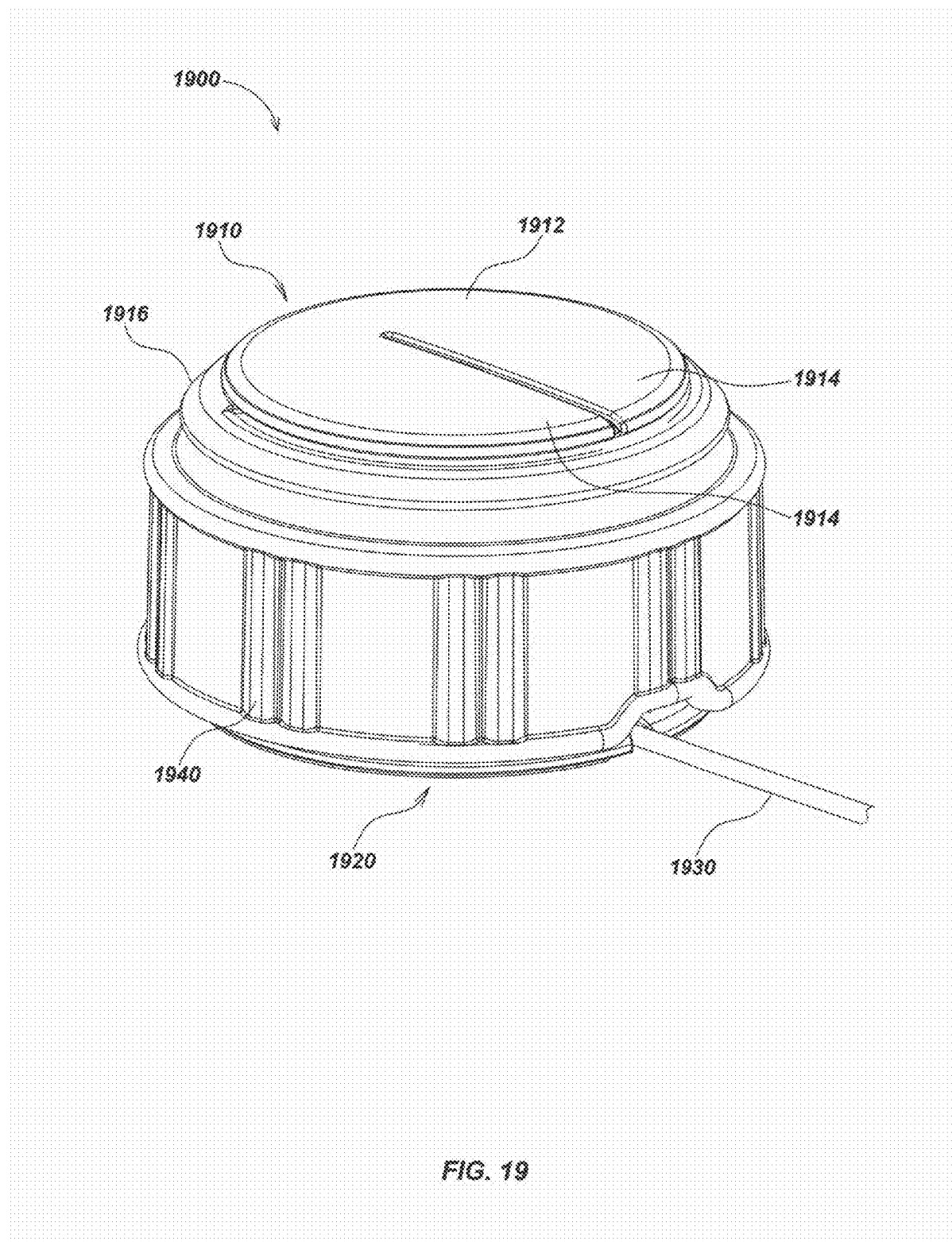
FIG. 19 is a front isometric view of a user interface device embodiment in accordance with aspects of the present disclosure.
Figure 20A:
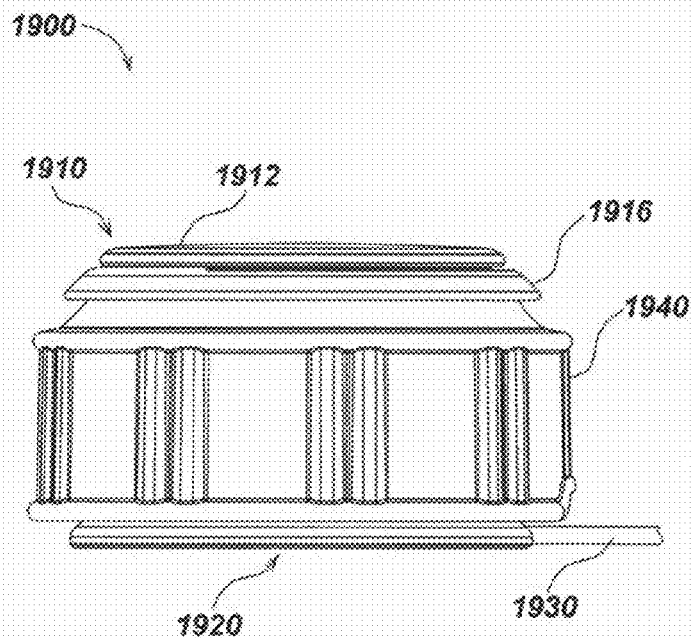
FIG. 20A is a side view of the user interface device embodiment of FIG. 19.
Figure 20B:
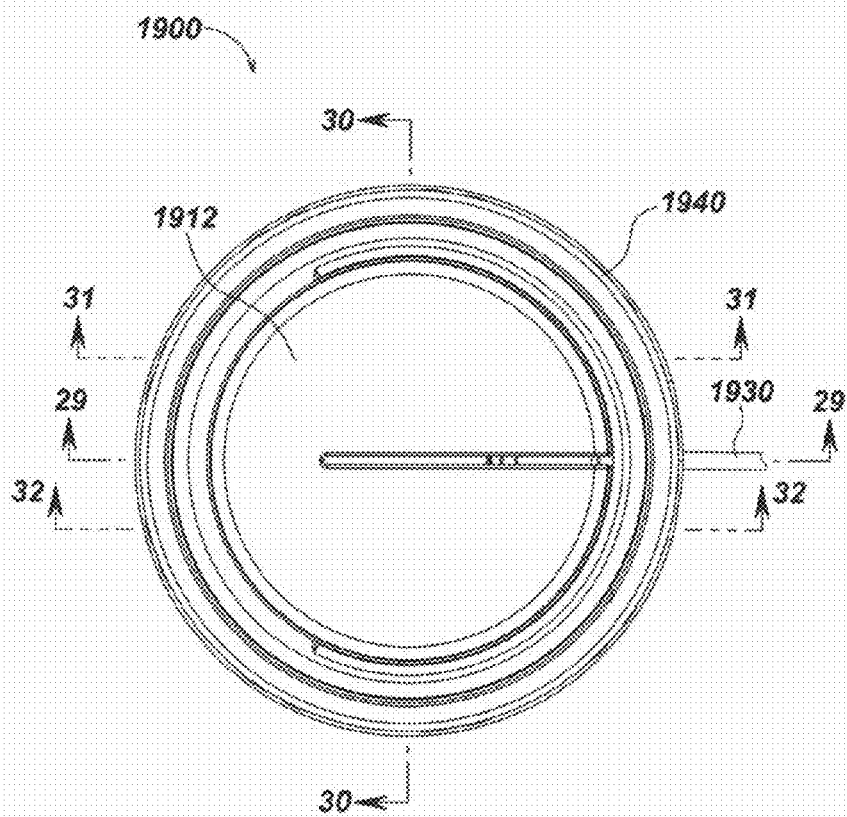
FIG. 20B is a top view of the user interface device embodiment of FIG. 19.

In another aspect, some magnetically sensed dual spring UIDs may include additional elements such as switches or other controls. For example, as shown in FIGS. 19-20B, user interface device embodiment 1900 may have include a top assembly 1910, a base assembly 1920 which may include a connector cable 1930, and an over-molded actuator cover 1940. The top assembly 1910 may further include an outer top plate 1912 with two switch or button features 1914 and also an inner plate 1916. Additional elements (not shown) such as lights or other visible outputs, audible inputs or outputs, and the like may be disposed on the top assembly. Various additional elements of UID embodiment 1900 may be the same as or similar to those described previously with respect to UID embodiment 100, with the exception of the top switches and related elements.

The actuator cover 1940 may comprise a pliant material such as elastomer or similar material and be made to move and flex during displacements of the actuator components, similarly to the actuator cover illustrated in FIGS. 1-10. The actuator cover 1940 may further be formed or shaped to circumscribe actuator components within the user interface device 1900 and aid in preventing unwanted external substances, such as dust or fluids, from accessing the internal workings of the user interface device embodiment 1900.

The various actuator components, as well as the actuator cover 1940, may be configured to allow movement relative to the top plate 1912 and base assembly 1920 which are fixed relative to each other. In this way, the top plate 1912 may allow a user's hand to rest while still displacing the actuator element and pressing or clicking of the button features 1914. In addition, the force from a user's hand resting upon the user interface device 1900 may aid in holding the user interface device 1900 in place in relation to an operating surface while in use.

The base assembly 1920 may include components comprising dense or heavy materials such as, but not limited to, zinc, steel, iron, lead, copper, or brass to aid in keeping the user interface device 1900 stationary upon the operating surface. In alternative embodiments, various other mechanisms to keep the user interface device stationary may be employed such as, but not limited to, through the addition of weights and/or elastomer feet or surfaces along the device's bottom, or mechanical connectors such as bolts, screws, latches, and the like. The connector cable 1930 may be a mini-B or micro-B USB cable, or other electrical or optical interface cable. Alternately, or in addition, a wireless interface module (not shown) may be used, and may be powered by a battery or batteries (not shown).

Figure 21:
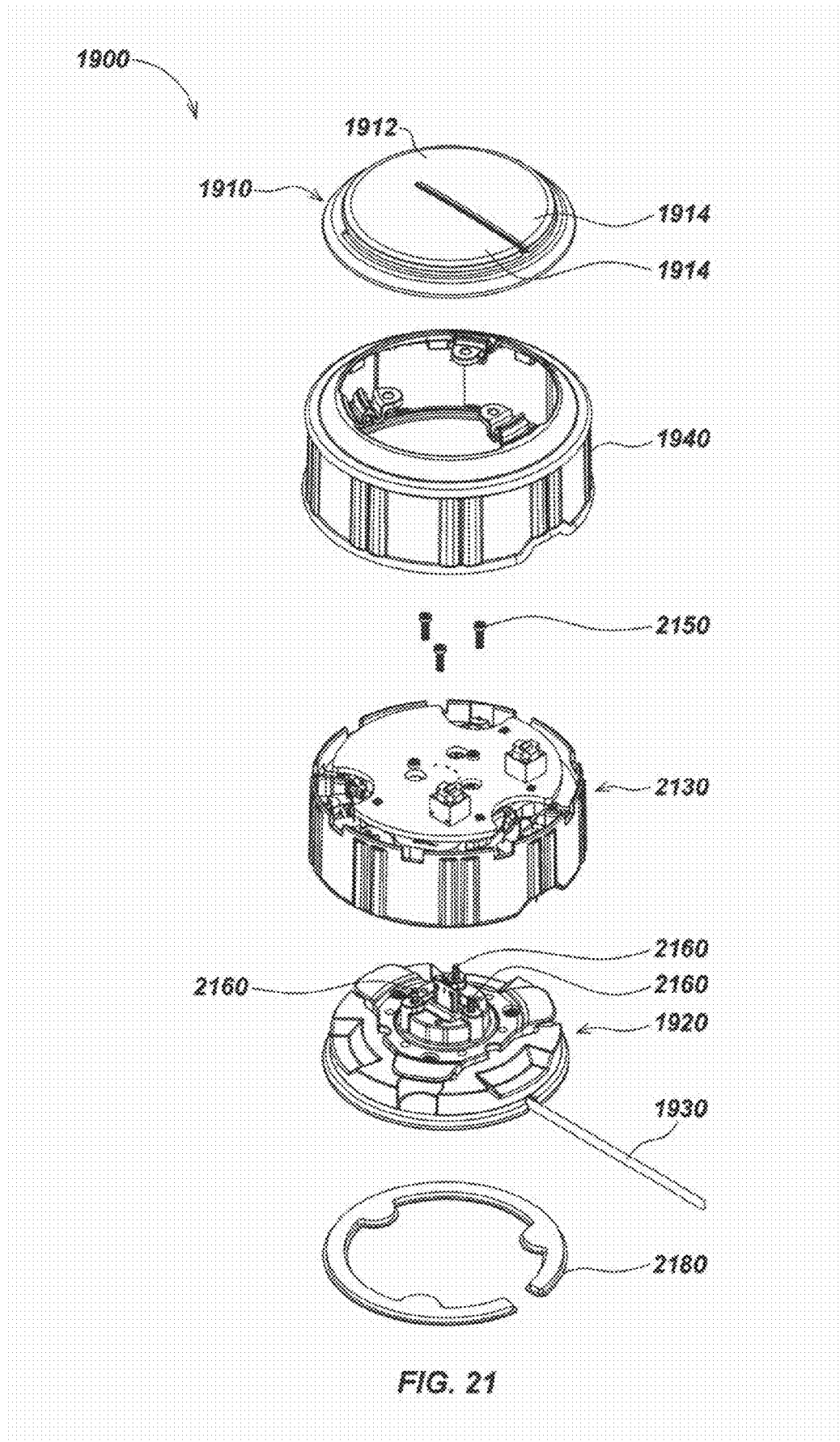
FIG. 21 is a top down exploded view of the user interface device embodiment of FIG. 19.
Figure 22:
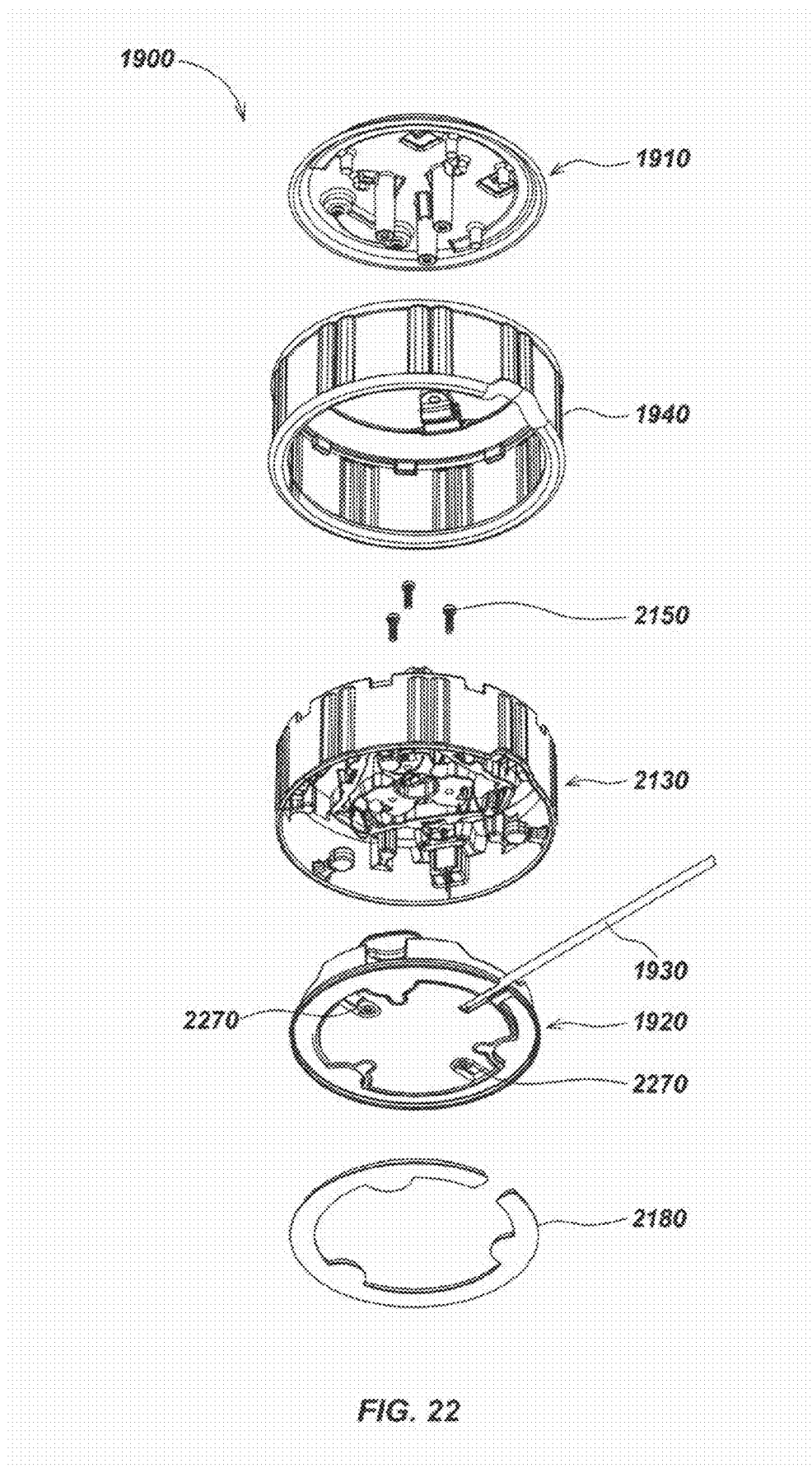
FIG. 22 is a bottom up exploded view of the user interface device embodiment of FIG. 19.

Turning to FIGS. 21 and 22, the user interface device embodiment 1900 may internally include an actuator assembly 2130, which may be similar to actuator assembly 430 as described previously herein. In assembly, the small screws 2150 may secure an attachment point of the actuator assembly 2130 such as a core-join element to frame at a central columnar section and/or to base assembly 1920, and the long screws 2160 (as shown in FIG. 21) may secure the base assembly 1920 to the top assembly 1910 through the central columnar section to form the frame. Large screws 2270 (as shown in FIG. 22) may be used to secure the various components of the base assembly 1920 as described subsequently with respect to FIG. 28. The actuator cover 1940 may be dimensioned to snugly fit over the actuator assembly 2130. An elastomer foot section 2180 may secure to the bottom of the base assembly 1920 and aid the user interface device 1900 to grip an operating surface such as the operating surface 320 of FIG. 3.

Figure 23:
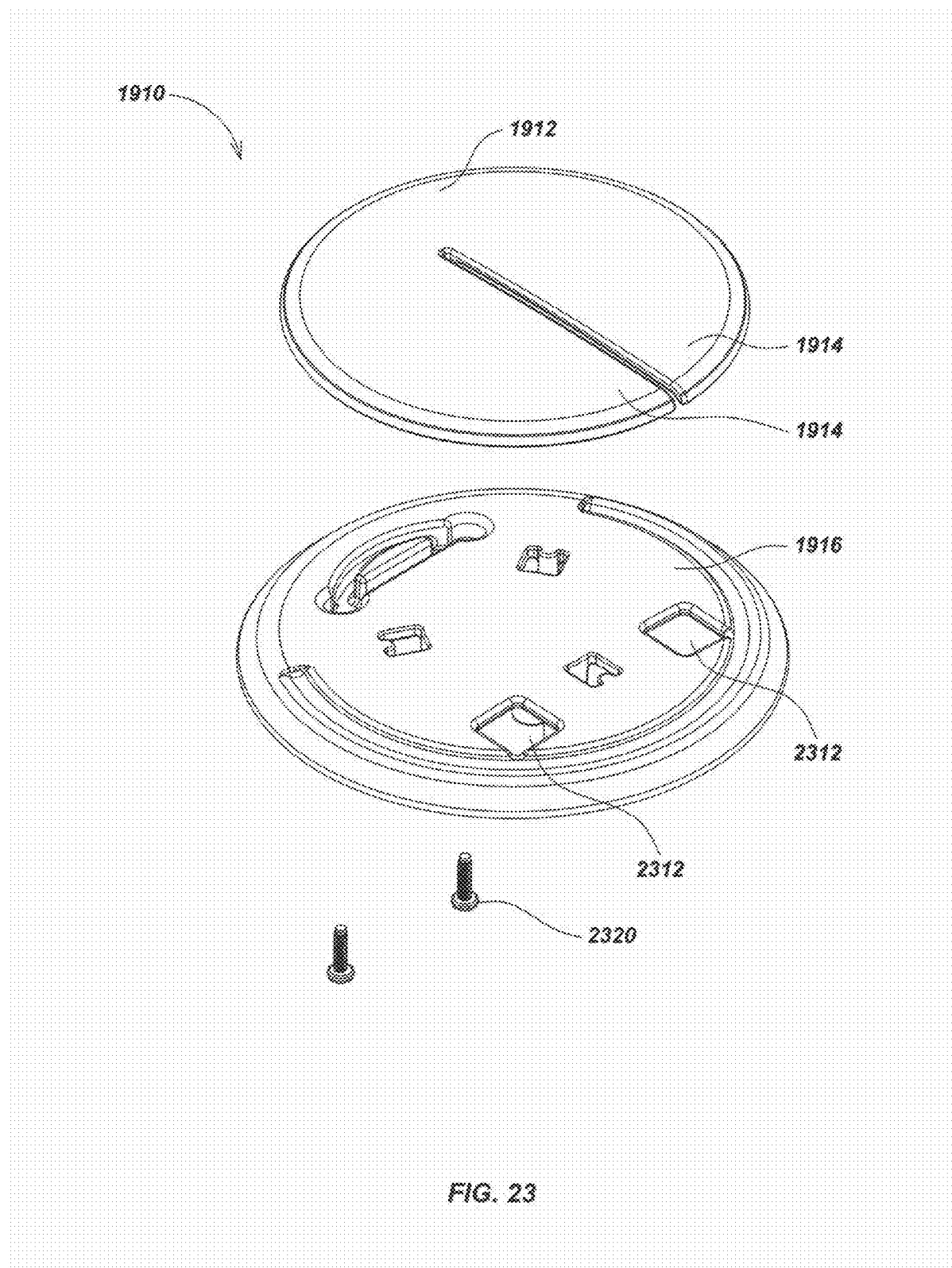
FIG. 23 is a top down exploded view of a top assembly embodiment of the user interface device embodiment of FIG. 19.
Figure 24:
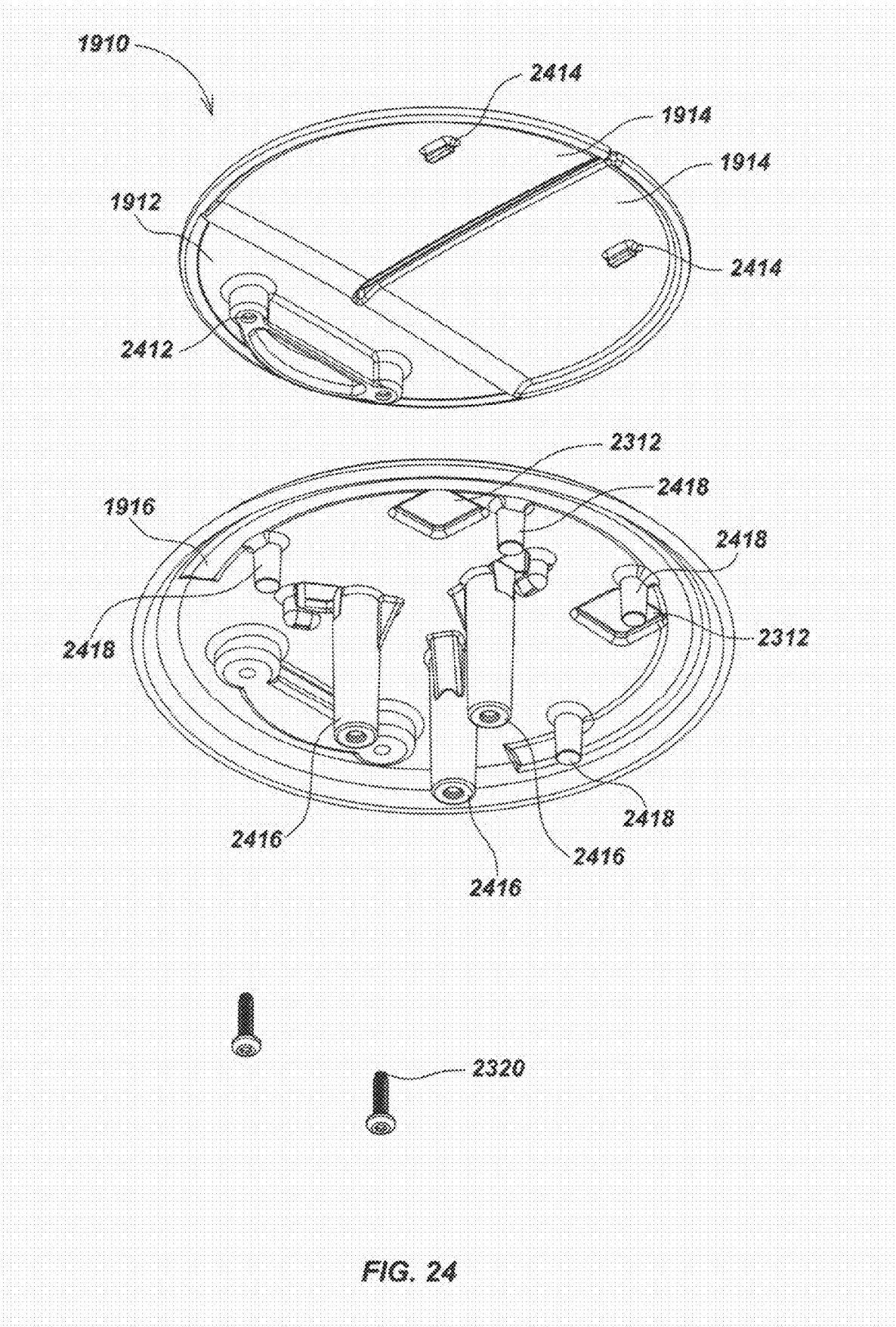
FIG. 24 is a bottom up exploded view of the top assembly embodiment of FIG. 23.

As illustrated in FIGS. 23 and 24, the top plate 1912 and an inner plate 1916 may secure together by a series of top assembly screws 2320. The top plate 1912 may include a set of switch or button features 1914 which may depress or pivot, thereby allowing a user to press or click the button features 1914 and, for instance, make a menu selection in virtual space or perform other switch actuation functions.

Figure 25:
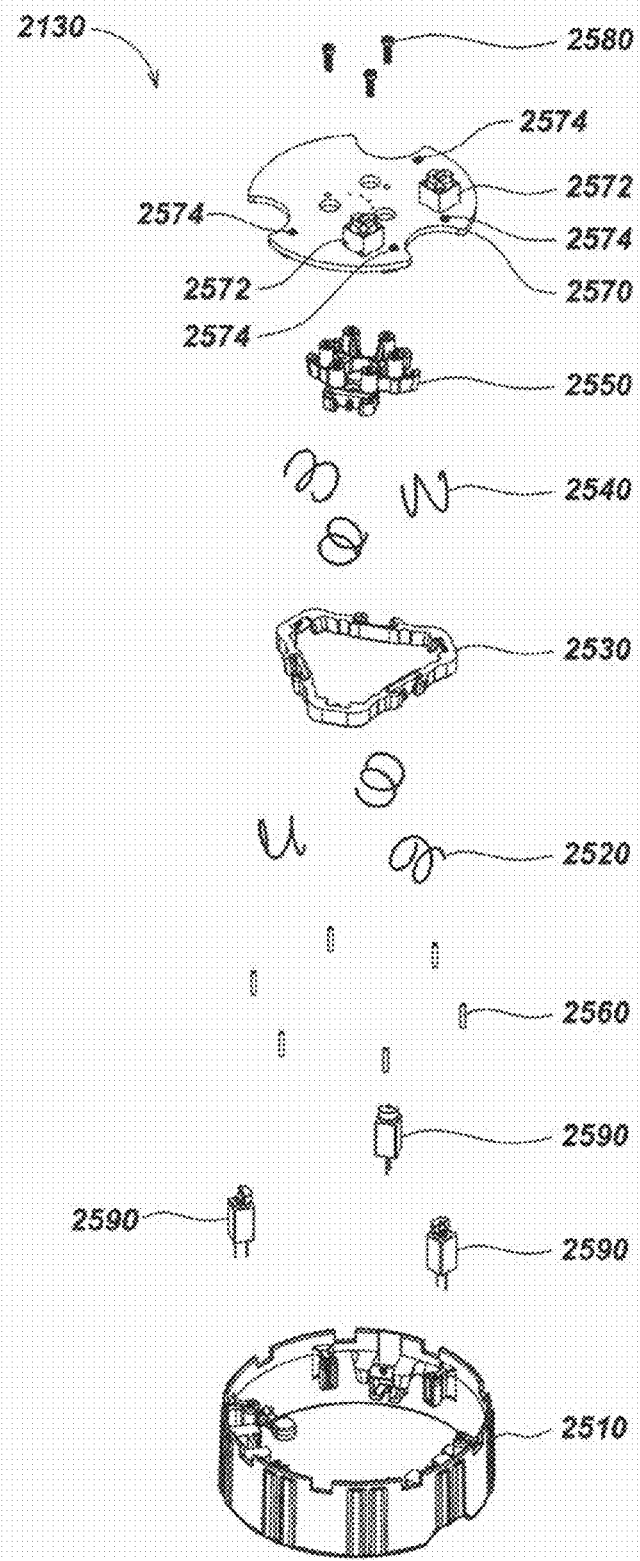
FIG. 25 is a top down exploded view of an actuator assembly embodiment of the user interface device embodiment of FIG. 19.

Beneath each button feature 1914, a tact switch punch 2414 may be formed such that when a user presses the button feature 1914, the tact switch punch 2414 may pass through one of the punch hole features 2312 formed through the inner plate 1916 and activate a tact switch 2572 illustrated in FIG. 25. The underneath side of the top plate 1912, as illustrated in FIG. 24, may also be formed with a plate mounting feature 2412. The top assembly screws 2320 may secure the inner plate 1916 to the plate mounting feature 2412 formed along the side of the top plate 1912 opposite that of the button features 1914. The button feature 1914 may be enabled to flex or bend when pressed by a user while the section of the top plate 1912 containing the plate mounting feature may stay stationary. A series of screw post features 2416 (as shown in FIG. 24) may be formed centrally along the bottom of the inner plate 1916. Holes formed on the bottom of the screw post features 2416 may be threaded to accommodate the long screws 2160 (as shown in FIG. 21).

Various UID embodiments may include optical output, such as in the form of LED light output at the top or sides of the UID. For example, a series of light pipes 2418 (as shown in FIG. 24) may also be formed along the bottom of the inner plate 1916 which may allow light emanating from the LEDs 2574 (as shown in FIG. 25) to pass through to the inner plate 1916. In such embodiments, the inner plate 1916 may be composed of translucent or partially translucent materials to allow the light to be visible to a user when the device 1900 is in use. In assembly the screw post features 2416 may fit through holes formed through the actuator assembly 2130 (as shown in FIG. 21) allowing the top assembly 1910 to be secured to the base assembly 1920 via the long screws 2160. In some embodiments, various other elements may be built into the top assembly 1910 including, but not limiting to, a scroll wheel, and/or touch pad, and/or audio input or output element such as piezo buzzers, speakers, microphones, and the like.

Figure 26:
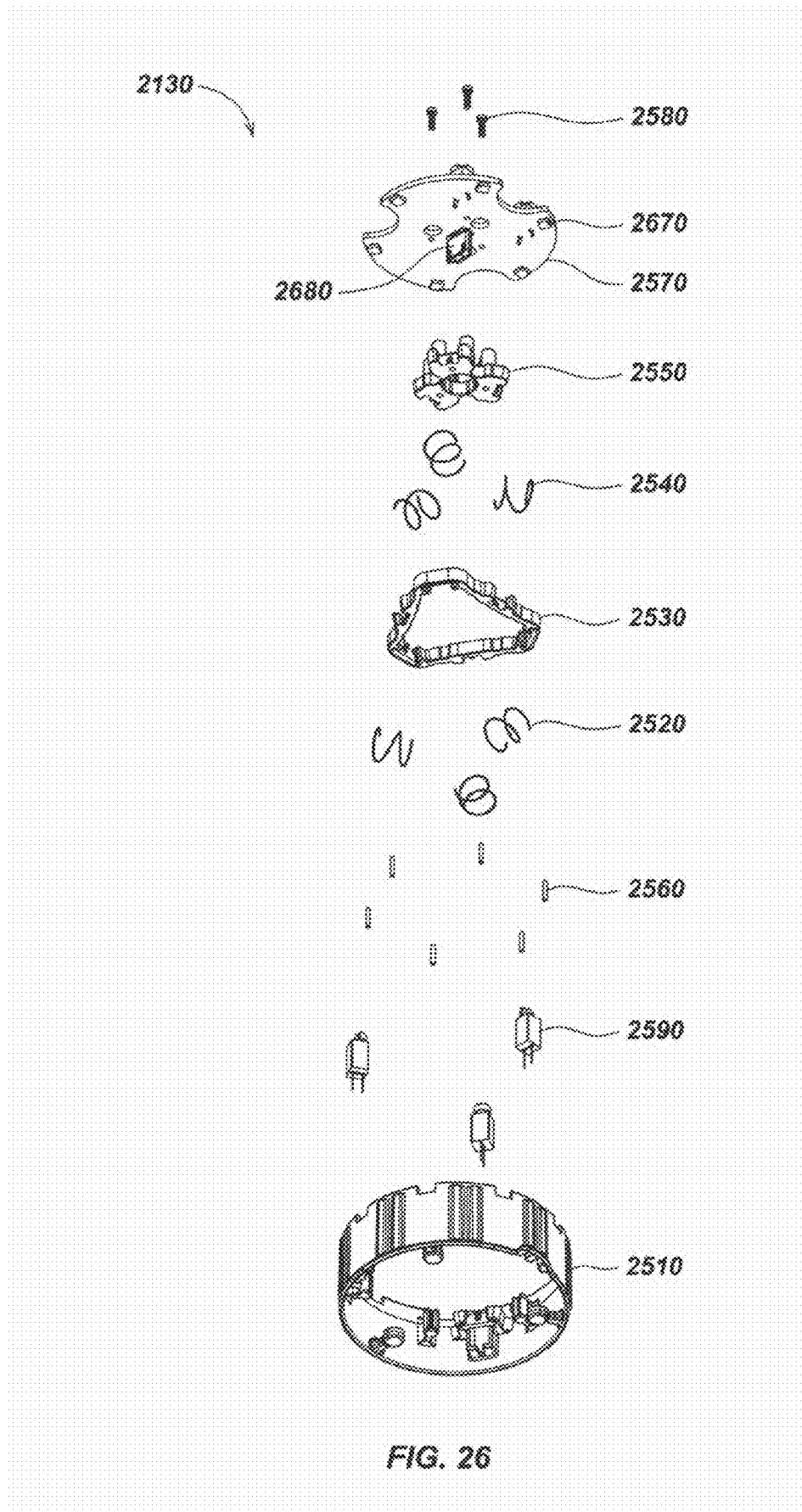
FIG. 26 is a bottom up exploded view of the actuator assembly embodiment of FIG. 25.

Turning to FIGS. 25 and 26, the actuator assembly 2130 may include an outer actuator element or grip 2510, a series of outer springs 2520 forming an outer spring array, an inner actuator element 2530, a series of inner springs 2540 forming an inner spring array, a mounting or core join element 2550, a series of magnets 2560, and a PCB 2570. The PCB 2570 may attach to the core-join element 2550 by a series of PCB screws 2580 or other attachment mechanisms.

One or more vibration motors, such as the vibration motors 2590, may also be included to provide haptic feedback to the user. In the user interface device embodiment 1800, multiple vibration motors 2590 may be used that may be controlled in timing, intensity, and direction to provide unique haptic feedback to the user such as described previously herein with respect to the embodiment shown in FIG. 8. The outer springs 2520 and the inner springs 2540 may comprise tin plated wire or other conductive material so as to, when used in combination with other wiring not illustrated, electrically connect the vibration motors 2590. Damping elements (not shown) may be disposed on or within springs 2520 and 2540. The outer actuator element 2510 may be largely cylindrical in shape and comprise materials allowing the outer actuator element 2510 to bend and flex when squeezed by the user to deform the actuator assembly. When such squeeze-type force is applied to the actuator grip 2510, each of the magnets 2560 may move relative to a paired magnetic sensors 2670 (as shown in FIG. 26), which may be three axis MLX-90399 sensors available from Melexis Microelectronic Integrated Systems, on the underside of the PCB 2570. Details of the positioning of magnets 2560 and their paired magnetic sensor 2670 are further illustrated in the sectional views of FIGS. 30 and 31.

Referring back to FIGS. 25 and 26, the magnetic sensors 2670 may generate signal corresponding to the displacement and position and/or tilt or other orientation shift of the magnets, which may then be communicated to a processing element, such as the processing element 1810 of FIG. 18. The processing element may then generate a particular output signal or command to be provided to an electronic computing system corresponding the actuator assembly translation or deformation, such as the selection of a menu item in virtual space or movement of a virtual object.

A set of tact switches 2572 and a series of light emitting diodes or LEDs 2574 may also be included on the topside of the PCB 2570 while a wiring connector 2680 (as shown in FIG. 26) may further be situated centrally on the underside of the PCB 2570. The tact switches 2572 may be activated when pressing or clicking the button features 1914 and generate signals that may be communicated to a processing element, such as the processing element 1810 of FIG. 18. The wiring connector 2680 may accommodate, for instance, a male micro-B plug of the connector cable 1930 and may allow communication between components connected to the PCB 2570, such as the magnetic sensors 2670, and a processing element, such as the processing element 1810 of FIG. 18. The wiring connector 2680 may also be dimensioned so as to fit within or allow connected wiring to pass through wiring passage 2754 (as shown in FIG. 27) on the core-join element 2550.

The LEDs 2574 may be configured and oriented to emit light to travel through the light pipes 2418 (as shown in FIG. 24) and through the translucent inner plate. The LEDs 2574 may be RGB LEDs enabled to emit various colors of light. In some embodiments, the color and/or duty cycle, and/or intensity of the light emitted from the LEDs may be used to communicate information, such as device status, feedback from a connected electronic computing device or system, and/or other information to a user. The positioning of LEDs 2574 and light pipes 2418 in an exemplary embodiment are further illustrated in FIG. 32.

In some embodiments, one or more proximity sensors may be included and coupled to the processing element to provide detection of the presence of a user's hand. These may be, for example, capacitive sensors or other proximity detection sensors. In such embodiments, the detected presence of a user's hand may be used to change the state of the user interface device 1900 from a "released" to a "displaced" state. An initialization procedure may be implemented in conjunction with the processing element, whereby the measurement of each of the magnets 2560 during the last recorded "released" state may be used as a basis to calculate future displacements of each magnet 2560 that may result from displacements of the actuator grip 2510 containing each of the magnets 2560. Suitable proximity sensors include, for example, the commercially available MTCH101 or MTCH112 from Microchip Technology Inc. Detected proximity information may be used for other functions, such as for minimizing power consumption when the UID is not in use, or for enabling the UID in embodiments where user interaction is not normally done, such as with earthquake or vibration sensor UID devices.

Figure 28:
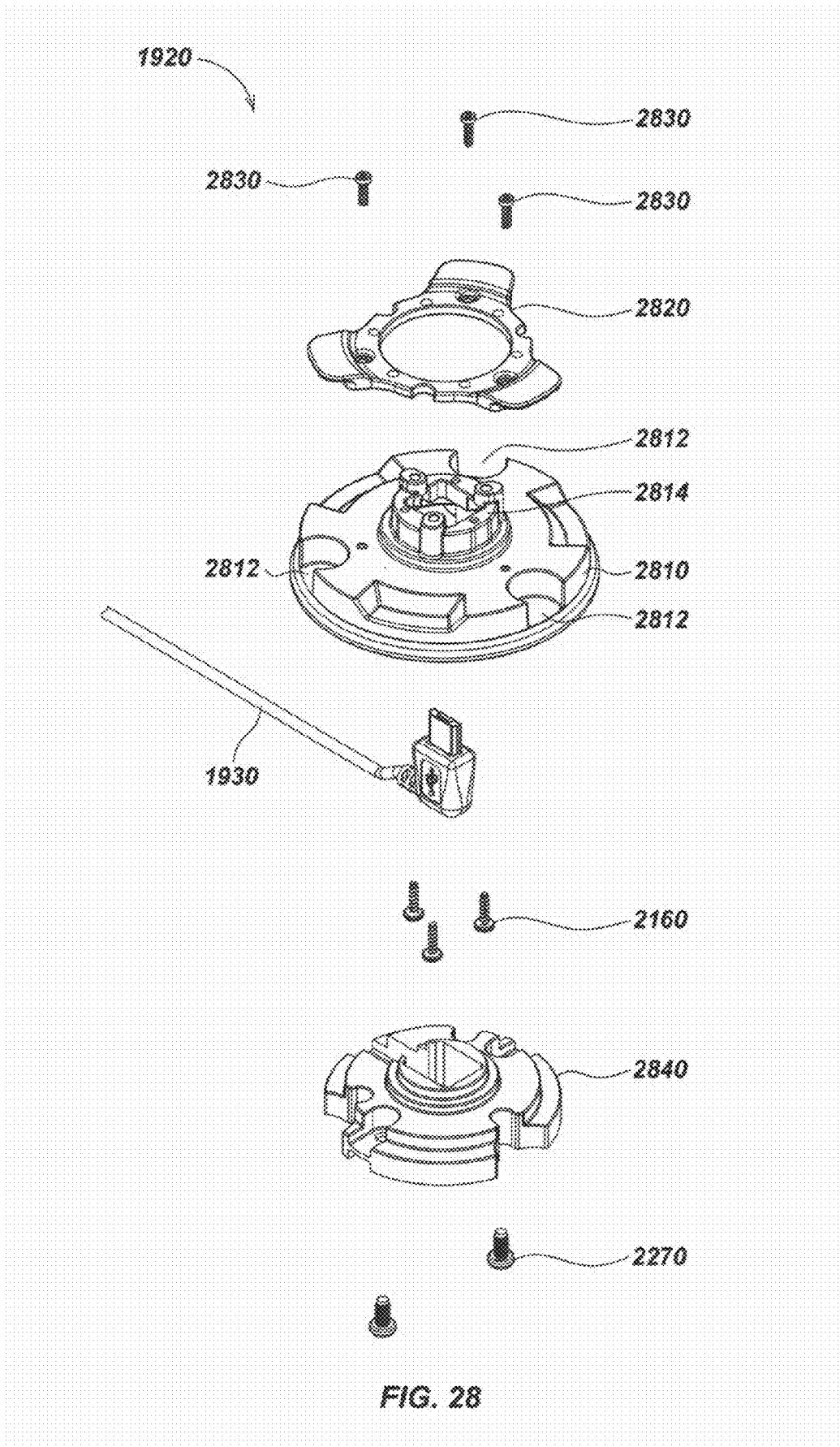
FIG. 28 is a top down isometric view of the limiter assembly embodiment of the user interface device embodiment of FIG. 19.

Turning to FIG. 27, a series of magnet retaining arms 2712 may be formed extending inward along the circumference of the outer actuator element or actuator grip 2510 to retain the magnets 2560. In the user interface device 1900 embodiment, a total of six of the magnet retaining arms 2712 may be formed to accommodate a total of six of the magnets 2560, however, other embodiments may use fewer or more magnets and corresponding magnetic sensors and retaining arms or other retaining structures, such as holes, tabs, etc. A series of three grip spring retention features 2714 and three limiting arms 2716 may also be formed extending inward along the inner circumference of the outer actuator element 2510. The limiting arms 2716 may be formed such that each limiting arm 2716 may extend within a limiting pocket 2812 (as shown in FIG. 28) on the base assembly 1920 (as shown in FIG. 21) so as to limit the travel of the outer actuator element 2510 when in use.

A series of vibrator motor pockets 2718 may be formed along the inner circumference of the outer actuator element 2510 to secure the vibrator motors 2590. Limiting arm bumpers 2717 may further encapsulate the end of each limiting arm 2717 to soften contact between the limiting arms 2716 and a limiting pocket 2812 (as shown in FIG. 28).

The outer springs 2520 of the outer spring array may extend radially between the outer actuator element or actuator grip 2510 and the inner actuator element 2530 such that one end of each of the outer springs 2520 may be secured to or within one of the grip spring retention features 2714 on the outer actuator element 2510 and the opposite end of each outer spring 2520 may be secure to or within an inner actuator element spring retainer feature 2732 on the inner actuator element 2530.

In the user interface device embodiment 1900, magnetic induction may be used to secure the end of the outer springs 2520 in place to the outer and inner actuator elements and the core-join element. Further description of a magnetic induction method as may be used in conjunction with the disclosures herein is provided in co-assigned U.S. patent application Ser. No. 13/110,910 filed May 18, 2010, entitled USER INTERFACE DEVICES, APPARATUS, AND METHODS, the content of which is incorporated by reference herein.

The inner springs 2540 of the inner springs array may extend radially between the inner actuator element 2530 and the mounting or core-join element 2550 such that one end of each of the inner springs 2540 may be secured to or within an inner actuator element spring retainer feature 2734 on the inner actuator element 2530 and the opposite end of each inner spring 2540 may be secure to or within a core-join spring retainer feature 2752 on the core-join element 2550. The aforementioned magnetic induction method may be used to secure the inner springs 2540 in place. The use of multiple concentric spring assemblies, such as that present with the use of the outer springs 2520 and the inner springs 2540, may allow for a greater range of motion to the actuator grip 2510 with attached magnets 2560. Further, the use of spring arrays in an overlapping spring array configuration may further enhance actuator assembly movement.

Turning to FIG. 28 the base assembly 1920 may include a limiting plate 2810, a cover plate 2820, a cable retention element 2840, and a connector cable 1930. The limiting plate 2810 may be formed with a series of limiting pocket 2812 and a central mounting feature 2814. In assembly, each of the limiting pockets 2812 may allow one limiting arm 2716 (as shown in FIG. 27) on the outer actuator element 2510 to extend within the limiting pocket 2812. The cover plate 2820 may secure to the top of the limiting plate 2810 through the screws 2830 such that top of each limiting pocket 2812 is covered by a section of the cover plate 2820 and the central mounting feature 2814 may extend centrally through the cover plate 2820. The travel of the outer actuator element 2510 with attached limiting arms 2716 may thereby be limited.

The limiting pockets 2812 and/or the limiting arms 2717 (as shown in FIG. 27) may be lined with elastomer or other cushioning material to soften contact between the limiting arms 2716 and the limiting pocket 2812. For instance, limiting arm bumpers 2717 may encapsulate the end of each limiting arm 2717 to soften contact between the limiting arms 2716 and the limiting pocket 2812.

The mounting or core-join element 2550 (as shown in FIG. 25) may be secured atop the central mounting feature 2814 of the frame at the central columnar section through the use of screws 2150 (as shown in FIG. 21), securing the actuator assembly 2130 to the base assembly 1920. A series of long screws 2160 may fit through holes on the limiting plate 2810 which may secure the limiting plate and the base assembly 1920 to the top assembly 1910 in a fixed position.

The connector cable 1930 may fit through an opening formed centrally on the limiting plate 2810, allowing the connector cable 1930 to plug into the wiring connector 2680 (as shown in FIG. 26) on the PCB 2570. The positioning of connector cable 1930 within the user interface device embodiment is further illustrated in FIG. 29.

The cable retention element 2840 and/or the limiting plate 2810 and the cover plate 2820 may be secured to the bottom of the limiting plate 2810 by the large screws 2270 and may function to hold the connector cable 1930 in place. The cable retention element 2840 and/or the limiting plate 2810 and/or the cover plate 2820 may comprise dense materials such as, but not limited to, zinc, lead, steel, or brass to aid in keeping the user interface device 1900 stable and stationary upon an operating surface such as operating surface 320 illustrated in FIG. 3. In alternate embodiments, other base assembly 1920 components may also comprise such dense materials to provide additional weight to user interface device 1900, or separate weights may be added.

Figure 29:
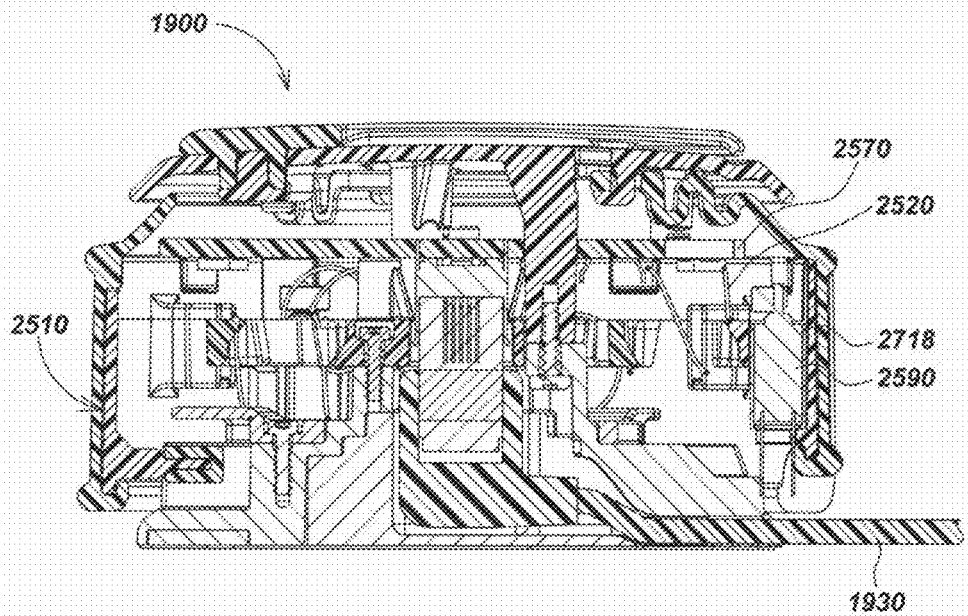
FIG. 29 is a sectional view of the embodiment of FIG. 20B taken along line 29-29.

Turning to FIG. 29, the vibration motors 2590 may be configured to provide haptic feedback to a user of the user interface device 1900 through the actuator assembly. The vibration may be controlled by one or more processing elements, such as through use of software or firmware to generate particular vibrational patterns corresponding to the desired output, such as described previously herein. For example, one or more vibration motors 2590 may be controlled in timing, intensity, frequency, and/or direction to provide unique haptic feedback to the user in response to a UID action or state or in response to a signal from a coupled electronic computing device or system. The vibration motors 2590 may be positioned along the inner circumference of the actuator grip 2510 and stowed within a vibration motor pocket 2718. The outer springs 2520 may comprise tin plated wire or other conductive material so as to, when used in combination with other wiring not illustrated, electrically connect the vibration motors 2590.

Figure 30:
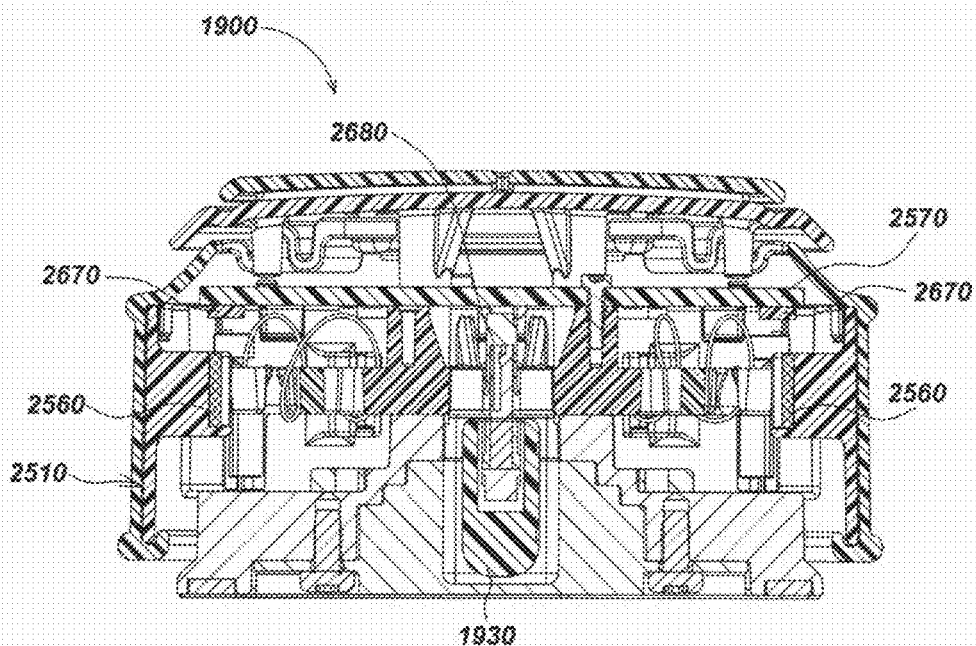
FIG. 30 is a sectional view of the embodiment of FIG. 20B taken along line 30-30.

As illustrated in FIG. 30, the connector cable 1930 may be configured to mate with the wiring connector 2680 situated centrally on the underside of the PCB 2570. In use, the connector cable 1930 mated with wiring connector 2680 may be used for transmission of signals between components connected to the PCB 2570, such as the magnetic sensors 2670, and a coupled electronic computing device or system. These signals may be generated by the magnetic sensors 2670 responsive to displacements of the actuator grip 2510 and attached magnets 2560.

Figure 31:
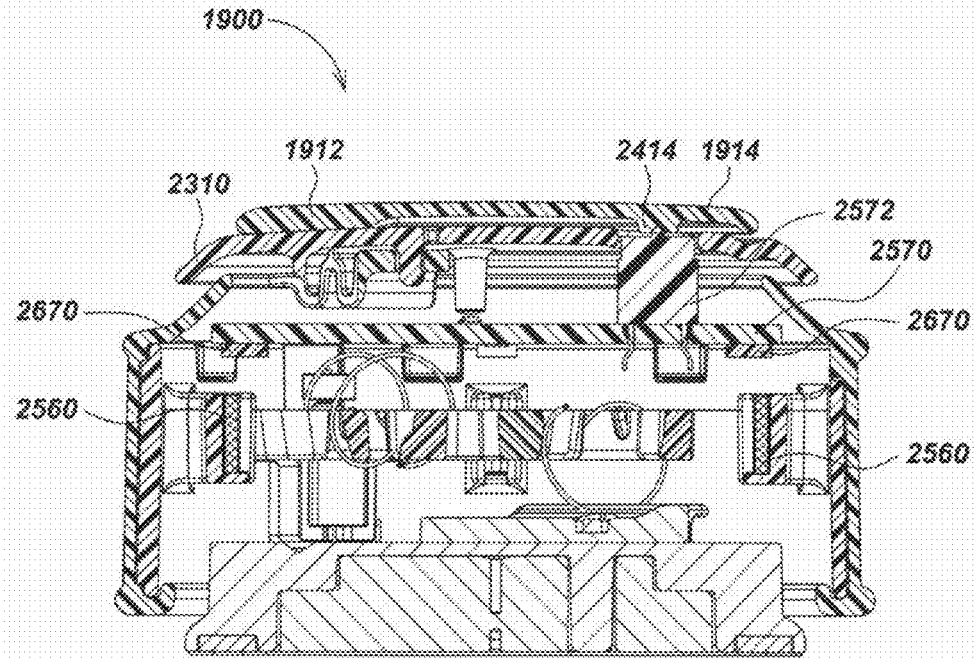
FIG. 31 is a sectional view of the embodiment of FIG. 20B taken along line 31

Turning to FIG. 31, beneath each button feature 1914 on the user interface device embodiment 1900, a tact switch punch 2414 may be formed such that when a user presses the button feature 1914, the tact switch punch 2414 activates a tact switch 2572. The tact switch 2572 may be connected to the top side of the PCB 2570 so as to generate a signal responsive to activation of the tact switch 2572. This signal may be communicated to a coupled electronic computing device or system such as a personal computer and may be interpreted, for instance, as a right click or left click or other push button type command.

Figure 32:
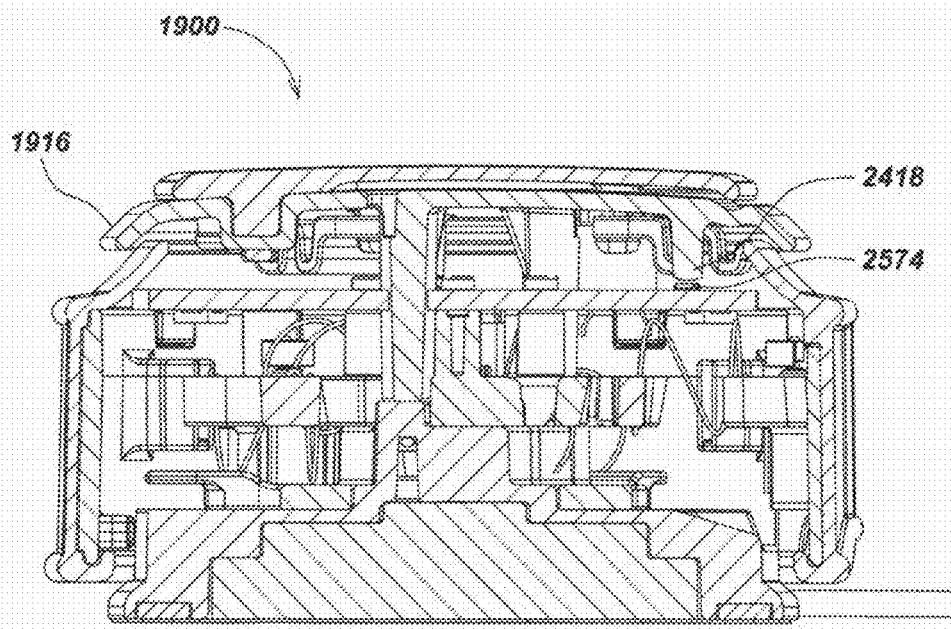
-FIG. 32 is a sectional view of the embodiment of FIG. 20B taken along line 32-32.

Turning to FIG. 32, in some embodiments one or more light pipes 2418 may be formed along the bottom of the inner plate 1916. The light pipes 2418 may be used to allow light emanating from the LED 2574 to pass through to the inner plate 1916. In such embodiments, the inner plate 1916 may comprise translucent or partially translucent materials to allow the light to be visible to a user when the device 1900 is in use. In some embodiments, the color and/or duty cycle and/or intensity of light emanating from the LEDs 2574 may be selectively varied so as to communicate information such as device status to a user or actions or status associated with an application program running on a coupled electronic computing device or system, such as the status of a virtual object in a CAD system, or status of a real object such as a vehicle status or equipment status.

Figure 36:
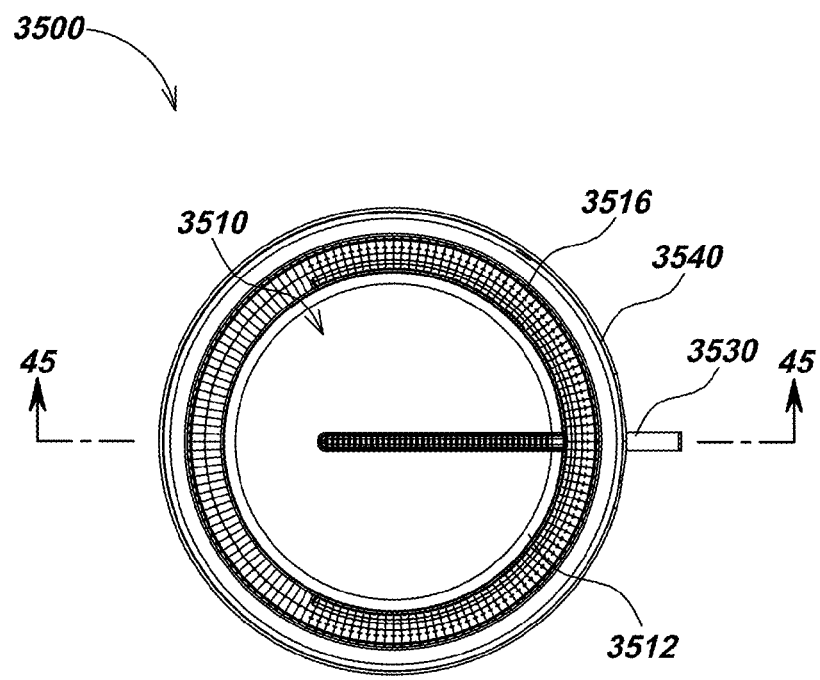
FIG. 36 illustrates details of the user interface device embodiment of FIG. 35 in a top-down view.
Figure 37:
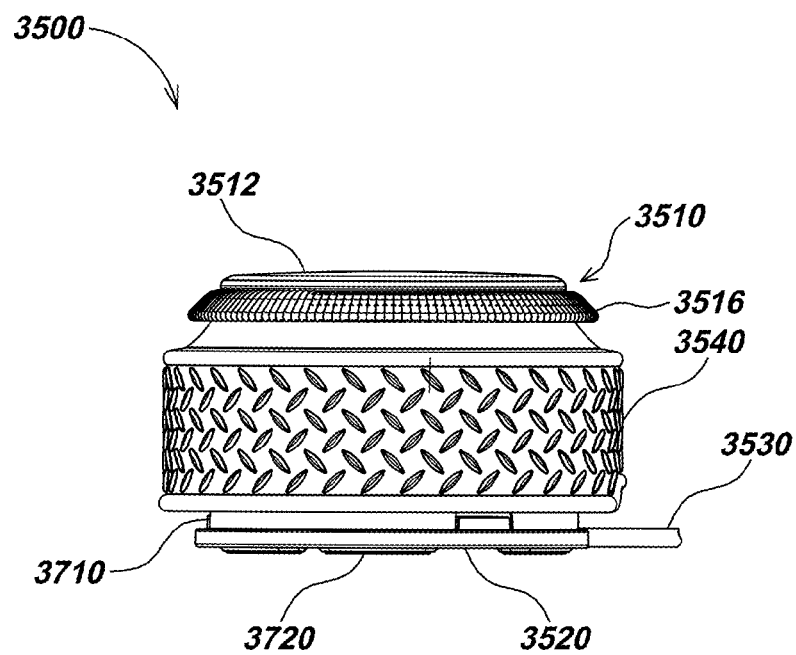
FIG. 37 illustrates details of the user interface device embodiment of FIG. 35 in a side view.

Turing to FIG. 35, details of another embodiment 3500 of a UID in accordance with certain aspects are illustrated. Embodiment 3500 includes an overmolded grip or actuator cover 3540 for enclosing an actuator assembly (internal to the UID as shown in FIG. 35), a base including a base plate 3520, an electrical connector 3530, such as a USB connector cable, a top including a top assembly 3510, and an outer cover plate 3512 with two switch or button features 1914. Additional elements (not shown) such as lights or other visible outputs, audible inputs or outputs, and the like may be disposed on the top assembly. The actuator cover 3540 may comprise a pliant material such as elastomer or similar material and be made to move and flex during displacements of the actuator components, similarly to the actuator cover illustrated in FIGS. 1-10. The actuator cover 3540 may further be formed or shaped to circumscribe actuator components within the user interface device 3500 and aid in preventing unwanted external substances, such as dust or fluids, from accessing the internal workings of the user interface device embodiment 3500. Light rings 3516 of an at least partially transparent material may be included in the top assembly to allow light, such as from one or more LEDs within the UID, to be provided as visual output to a user, such as described previously herein with respect to LEDs and/or haptic output elements. FIG. 36 and FIG. 37 illustrate embodiment 3500 from a top down view and a side view. As shown in FIG. 37, elastomeric feet or other grip elements or structures 3720 may be disposed on the bottom of the base plate 3520 to aid in gripping ability on an operating surface. The base assembly may include dense or heavy materials such as described previously herein to weight the base down for better stability on the operating surface.

Figure 38:
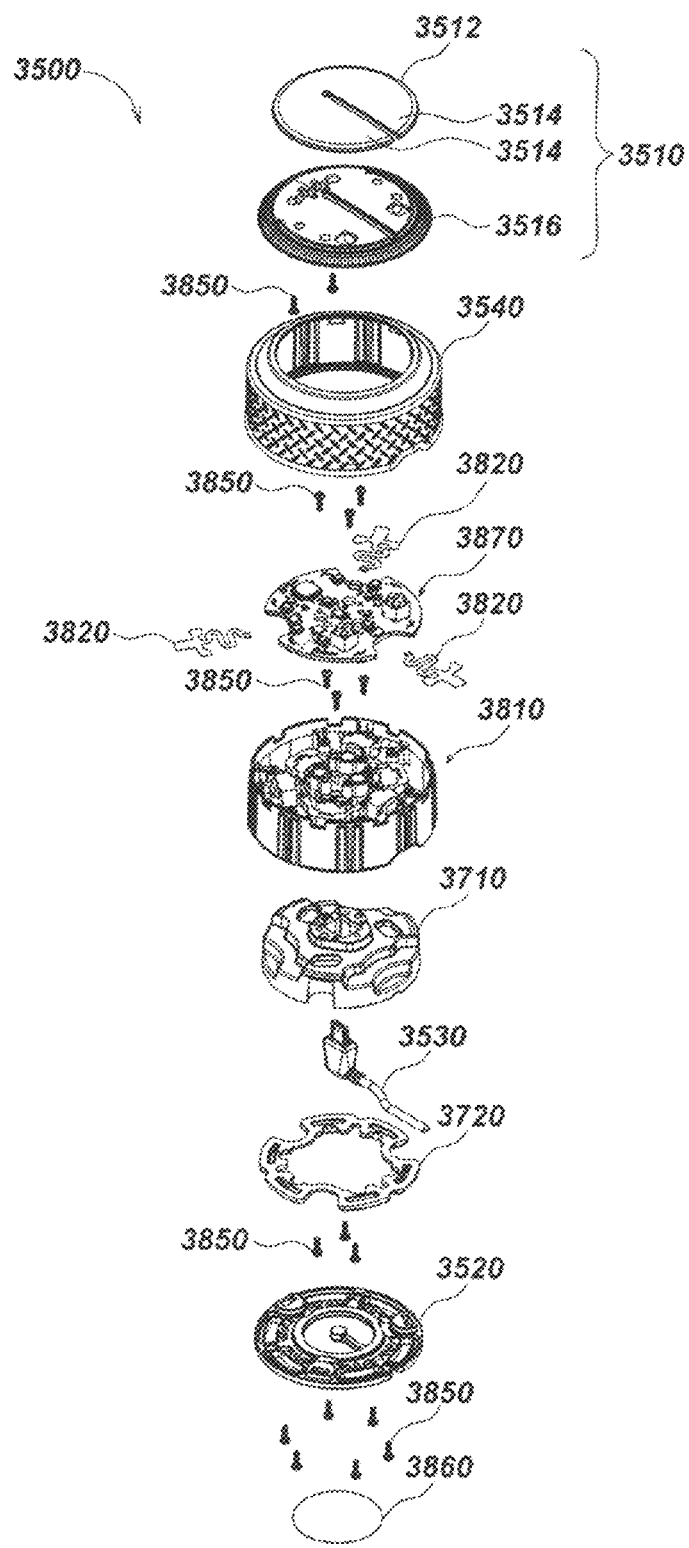
FIG. 38 is a top down exploded view of the user interface device embodiment of FIG. 35.

FIG. 38 illustrates an exploded top down view of UID embodiment 3500. Screws 3850 may be used to secure various elements of the UID together. The frame assembly may include the top assembly elements of plate 3510 and

Figure 39:
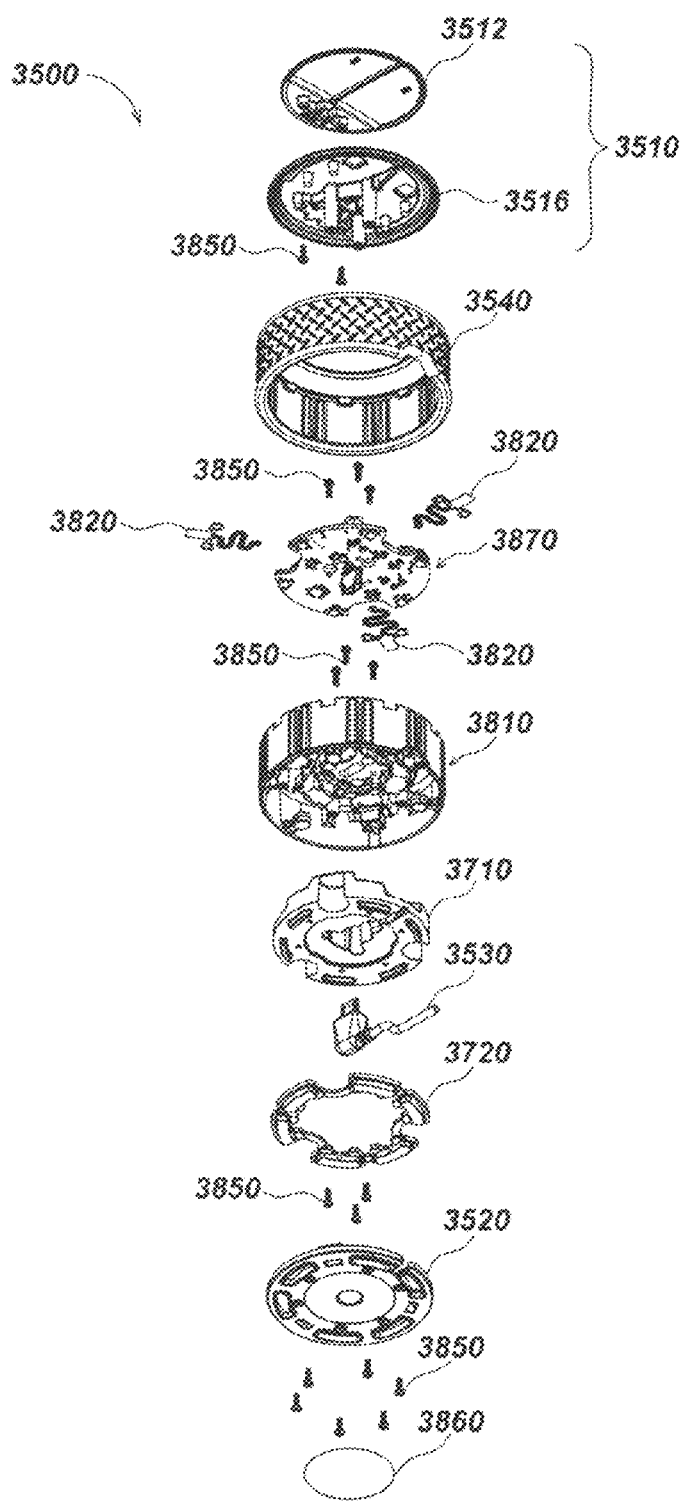
FIG. 39 is a bottom up exploded view of the user interface device embodiment of FIG. 35.

3550, through which light, switch actions, and the like may be transferred from the top assembly to PCB embodiment 3870. Flexible circuit cables 3820, as further described with respect to FIGS. 43 and 44, may be used to transfer power and/or control signals between the PCB and the actuator assembly, such as to power or control vibrational motors 4090 as shown in FIG. 40. The base assembly may include a bottom cover 3860, base plates 3520 and 3570, as well as limiter assembly 3710. Actuator assembly 3810 may be coupled to the frame through a core-join element similar to those described previously herein, and may include similar actuator elements and configurations to those described previously herein. FIG. 39 similarly illustrates an exploded bottom up view of UID embodiment 3500.

FIG. 40 illustrates additional details of the actuator assembly embodiment 3810 of UID embodiment 3500 and core-join element 4050 for coupling the actuator assembly to the frame. Actuator assembly 3810 includes outer springs 4020 forming an outer spring array for coupling an outer actuator element or grip element 4010 with inner actuator element 4030, as well as inner springs 4040 for coupling the inner actuator element 4030 with the core-join element 4050. The outer spring array and inner spring array may have an overlapping spring array configuration such as described previously herein. A damping element 4070, such as foam or other damping materials, may be disposed on or within the inner and/or outer springs. In an exemplary embodiment the damping element is cross-shaped and positioned on the inside of each spring coil. The damping element may be glued or formed or molded to the springs to retain it in place during operation. Memory foam materials may be used for the damping element 4070, or other foam or flexible damping materials may alternately be used.

Magnets 4060 may be mounted in the actuator assembly in the outer actuator element 4030 on, for example, retaining arms 4012 or elsewhere on or within the actuator assembly components. The magnets of embodiments such as embodiment 3500 and/or the previously described embodiments may be arranged with reverse-oriented polarities within the magnet array. For example, the magnets as shown in FIG. 40 may alternate polarities (e.g., from South up to North up to South up, etc.) along the outer actuator element. This may improve sensing performance. Vibrational motors 4090 and associated electrical connectors may be disposed on the outer actuator element 4010 to provide haptic user feedback such as described previously herein.

Figure 41:
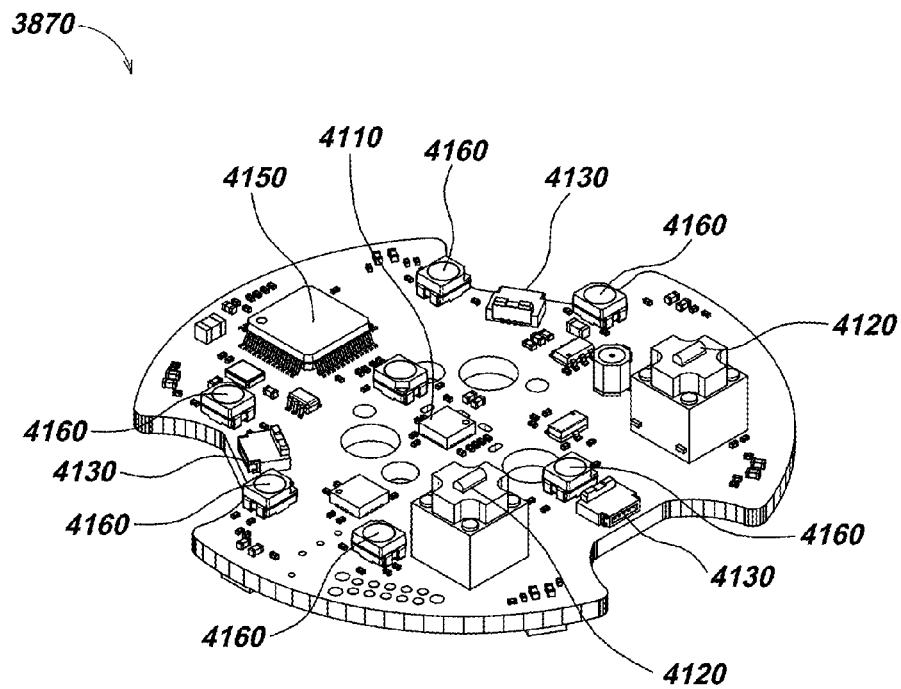
FIG. 41 is a top-down isometric view of an embodiment of a PCB of the user interface device embodiment of FIG. 35.
Figure 42:
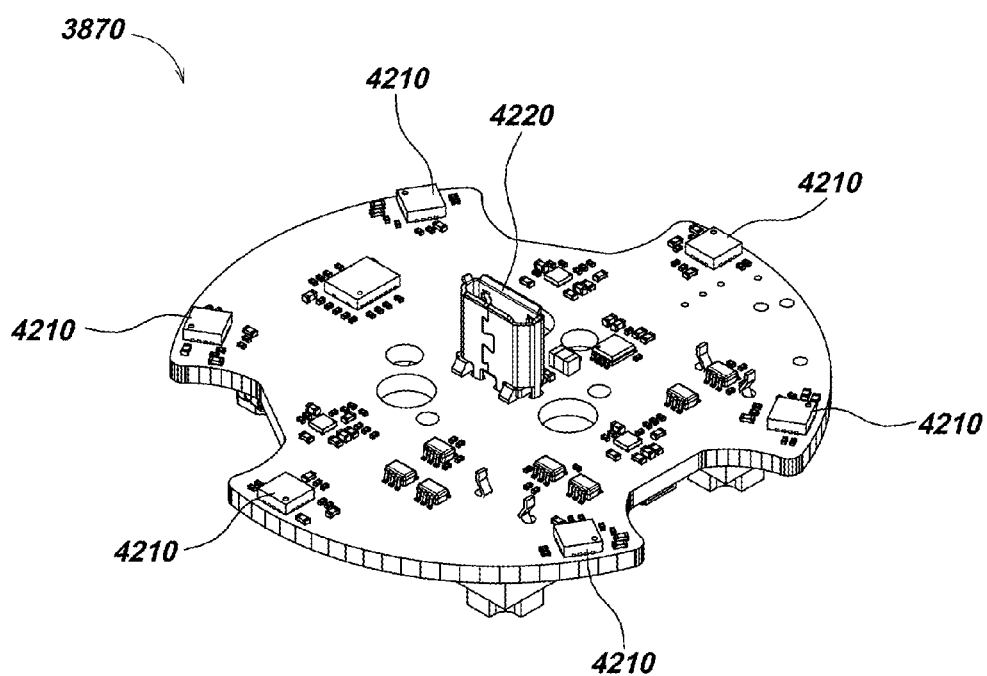
FIG. 42 is a bottom-down isometric view of the PCB embodiment of FIG. 41.

FIG. 41 and FIG. 42 illustrate details of the printed circuit board embodiment 3870 of UID embodiment 3500 from top and bottom views. As shown in FIG. 41, the PCB 3870 may include various electronic circuit elements including a processing element 4150, a gyroscopic sensor 4110, tact switches 4120 (typically mechanically coupled to the UID top assembly to implement user switching actions), LEDs 4160, electrical connectors 4130 for coupling power and/or signaling to the vibrational motors through a flex circuit such as flex circuit 3820, as well as other components such as accelerometers, compass sensors, memory devices, analog and digital circuit elements, wired or wireless communication modules, and the like. These various sensor elements may be electronically coupled to the processing element to provide additional input signals. For example, the gyroscopic sensor 4110 may be used to sense motion of the UID for use in calibration or other signal processing, as may be accelerometers, compass sensors, and the like.

FIG. 42 illustrate additional components on the PCB embodiment 3870 including magnetic field sensors 4210 for sensing magnetic fields from magnets 4060 in multiple axes and a connector 4220 such as a USB micro or USB mini connector for coupling a cable to the UID for communication with an external electronic computing device or system.

In some embodiments, such as earthquake sensors, vibrational sensors, or other sensors for external use, additional circuit elements (not shown) such as GPS or other positional system modules, cellular communication systems modules, Wi-Fi modules, and the like may be used and coupled to or disposed on the PCB to determine positional information associated with the UID and communicate information to external devices or systems through external wired or wireless networks.

Figure 43:
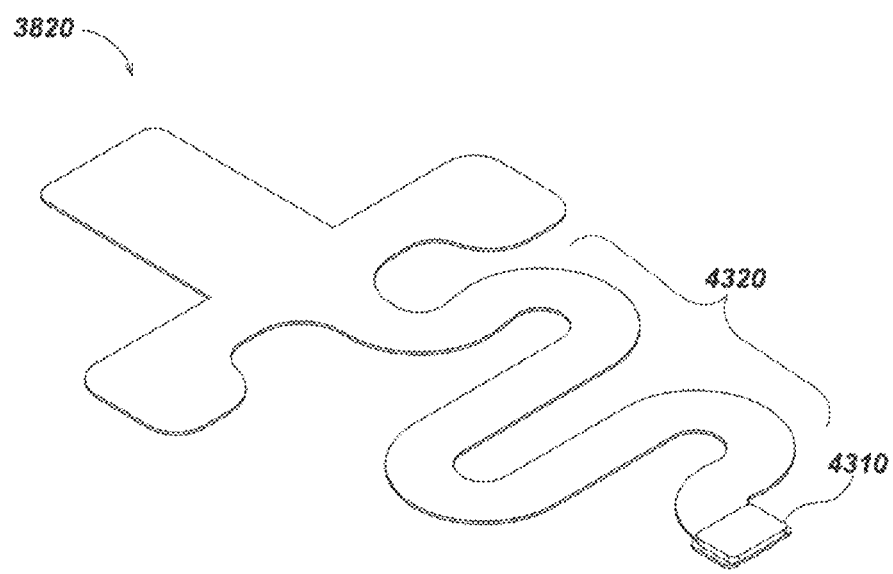
FIG. 43 illustrates details of a flexible circuit connector embodiment top view.
Figure 44:
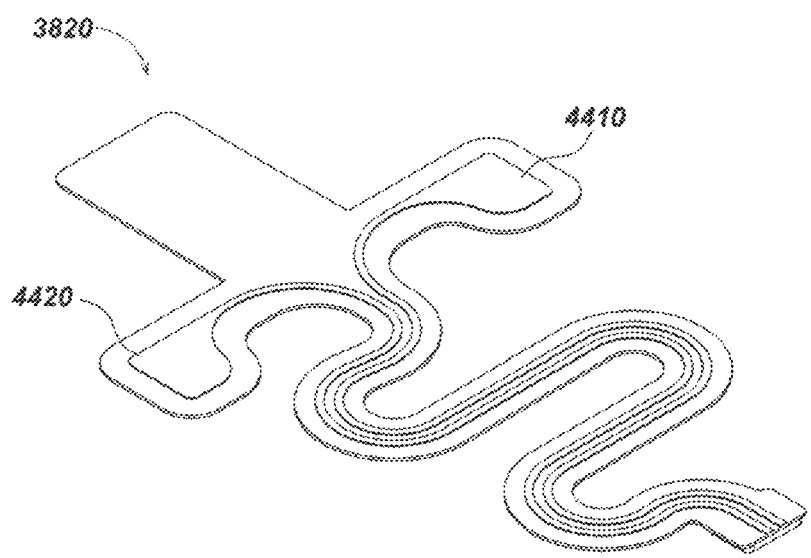
FIG. 44 illustrates details of a flexible circuit connector embodiment bottom view.
Figure 45:
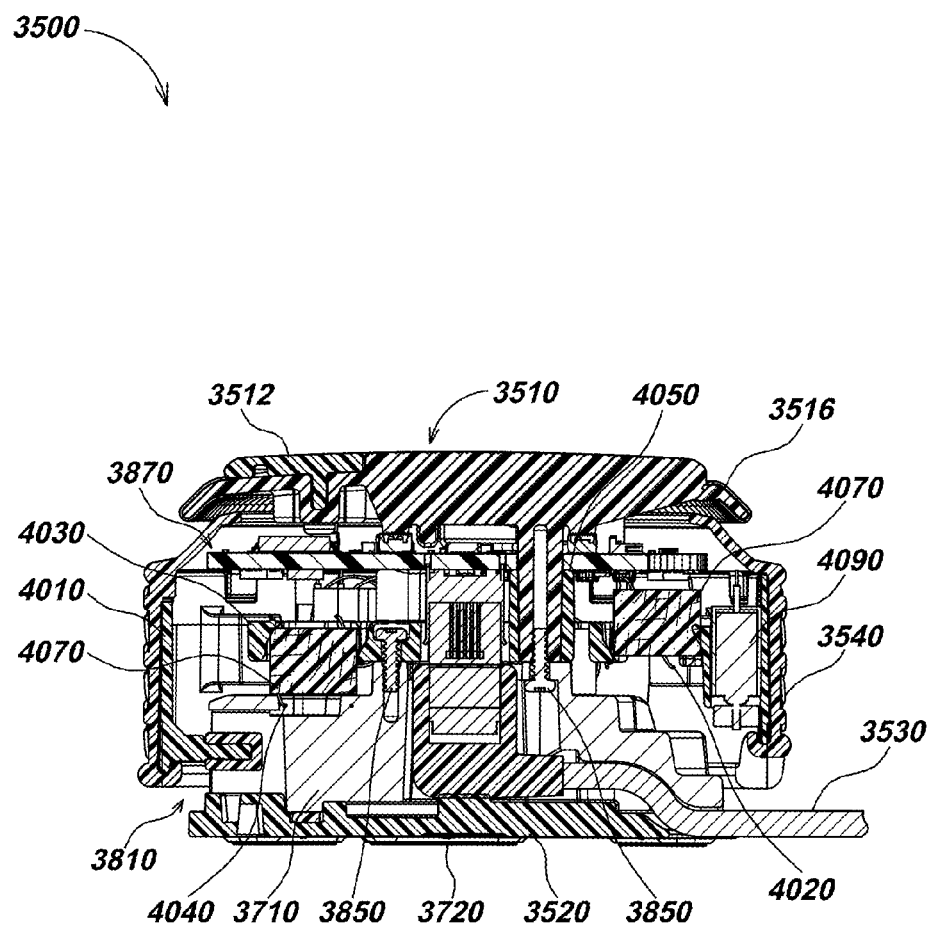
FIG. 45 illustrates details of a user interface device embodiment in cross-sectional view.

FIG. 43 and FIG. 44 illustrate details of flex circuit cable embodiment 3820 for coupling power and/or signals from the PCB 3870 to the vibrational motors 4090 on the actuator assembly. As shown in FIG. 41, the flex circuit may be of a flexible substrate material, and may include a connector 4310 at one end for coupling signals or power from traces 4410 and 4420 (as shown in FIG. 42) between the PCB and the actuator assembly. A flexible section 4320 of flex circuit 3810 may include curved sections such as those shown to all the flex circuit to bend and twist as the actuator assembly is moved to prevent fatigue or breakage of the cable. Pads on the ends of traces 4410 and 4420 as shown may be used to provide electrical contacts with a corresponding connector of the vibrational motors 4090.

FIG. 35 illustrates UID embodiment 3500 from a cutaway side view showing the various internal components and their relative positioning in a released state while on a level operating surface.

The various elements of UID embodiment 3500 may be the same as or similar to those described previously herein with respect to other embodiments.

In one or more exemplary embodiments, the functions, methods and processes described herein may be implemented in whole or in part in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer or other processing element or device.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processing element. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media The various illustrative functions and circuits described in connection with the embodiments disclosed herein with respect to user interface functions such as generation of output signals in response to sensed magnet position, generation of haptic feedback, generation of light output or other user output, calibration functions, earthquake or vibrational sensing, and/or other functions may be implemented or performed in one or more processing elements of a UID or external to the UID with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, DSP, or state machine. One or more memories may be coupled to the processing element or integral with the processing element. A processor may also be implemented as a combination of computing devices, e.g., a combination of a DSP and a microprocessor, a plurality of microprocessors, one or more microprocessors in conjunction with a DSP core, or any other such configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Signaling in UIDs as described herein may be implemented in accordance with industry standards such as the USB standard or other wired or wireless communication standards such as Bluetooth and Wi-Fi standards, Ethernet, and the like.

The presently claimed invention is not intended to be limited to the aspects shown herein, but is to be accorded the full scope consistent with the disclosures herein and accompanying drawings wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the disclosure. For example, although various details are described in conjunction with the drawings of particular embodiments herein, these details may be combined in additional embodiments through combinations of elements described herein or illustrated in the drawings but not necessarily shown or described in the same embodiment. Thus, the invention is not intended to be limited to the aspects shown herein but is to be accorded the widest scope consistent with the appended claims and their equivalents.

We claim:

1. A user interface device (UID), comprising:
    a frame including a base assembly and a top assembly; wherein the top assembly is in a fixed position relative to the base assembly;
    an actuator assembly disposed between the top assembly and the base assembly, the actuator assembly including:
    an outer actuator element and an inner actuator element; and
    a plurality of springs mechanically coupling the one or more actuator elements to the frame, the plurality of springs comprising an outer spring array and an inner spring array; and
    a damping element disposed on or within one or more springs of the plurality of springs; and
    a plurality of sensors disposed within the frame between the top assembly and the base assembly for sensing positional information associated with the actuator assembly and providing one or more sensor output signals corresponding to the sensed positional information.

2. The UID of claim 1, further comprising a plurality of magnets disposed between the top assembly and the base assembly; wherein the sensors are magnetic field sensors for sensing magnetic fields from the magnets and generating the positional information based at least in part on the sensed magnetic fields.

3. The UID of claim 2, wherein the magnets are disposed on the actuator assembly and the sensors are disposed on a printed circuit board element coupled to the frame.

4. The UID of claim 3, further comprising a Universal Serial Bus (USB) connector disposed on the printed circuit board.

5. The UID of claim 2, wherein the magnetic sensors are three-axis magnetic sensors for providing output signals corresponding to magnetic fields sensed in three orthogonal axes at a point or small area in space.

6. The UID of claim 1, wherein the one or more actuator elements include an outer actuator element and the plurality of springs comprise a spring array coupled between the outer actuator element and the frame or core-join element fixedly coupled to the frame.

7. A user interface device (UID), comprising:
    a frame including a base assembly and a top assembly; wherein the top assembly is in a fixed position relative to the base assembly;
    an actuator assembly disposed between the top assembly and the base assembly, the actuator assembly including:
    one or more actuator elements; and
    a plurality of springs mechanically coupling the one or more actuator elements to the frame; and
    a plurality of sensors disposed within the frame between the top assembly and the base assembly for sensing positional information associated with the actuator assembly and providing one or more sensor output signals corresponding to the sensed positional information;
    wherein the one or more actuator elements include an outer actuator element and an inner actuator element, and the plurality of springs comprise an outer spring array coupled between the outer actuator element and the inner actuator element, and an inner spring array coupled between the inner actuator element and the frame or a core-join element fixedly coupled to the frame.

8. The UID of claim 7, wherein the outer actuator element has a substantially cylindrical shape and the inner actuator assembly has a triangular shape.

9. The UID of claim 7, wherein the outer spring array and the inner spring array are in an overlapping spring array configuration.

10. The UID of claim 7, further including a damping element disposed on or within one or more of the springs of the inner spring array and/or the outer spring array.

11. The UID of claim 10, wherein the damping element comprises a memory foam material.

12. The UID of claim 7, further comprising a plurality of magnets disposed on the outer actuator element; wherein the sensors are magnetic field sensors for sensing magnetic fields from the magnets and generating the positional information based at least in part on the sensed magnetic fields.

13. The UID of claim 12, wherein the outer actuator element has a cylindrical shape and the magnets are disposed on a retaining arm of the outer actuator element.

14. The UID of claim 12, wherein the plurality of magnets consists of six magnets arrayed equidistantly around the outer actuator element in a circular array.

15. The UID of claim 12, further comprising a haptic feedback element disposed on the actuator assembly.

16. The UID of claim 15, wherein the haptic feedback element is a vibrational motor coupled to a printed circuit board of the UID using a flexible circuit cable.

17. The UID of claim 12, further comprising a plurality of switches on the top assembly.

18. The UID of claim 12, further comprising a printed circuit board coupled to the frame or to an element fixed to the frame, wherein the magnetic sensors are disposed on the printed circuit board.

19. The UID of claim 18, further comprising a processing element disposed on the printed circuit board for receiving output signals from the magnetic field sensors corresponding to positions of the magnets and generating, based at least in part on the received output signals, a UID output signal for provision to a coupled electronic computing device or system.

20. The UID of claim 18, further comprising a plurality of LEDs disposed on the printed circuit board.

21. The UID of claim 18, further comprising a gyroscopic sensor disposed on the printed circuit board and coupled to the processing element for providing gyroscopic data to the processing element.

22. The UID of claim 12, wherein one or both of the inner spring array and the outer spring array consists of three coil springs.

23. The UID of claim 12, wherein the inner spring array springs and coupled radially between the inner actuator element and the frame or core-join element and the outer spring array springs are coupled radially between the inner actuator element and the outer actuator element.

24. The UID of claim 12, further comprising a flexible grip cover disposed around the actuator assembly.

25. The UID of claim 1, further comprising a limiter assembly for limiting the motion of the actuator element to a predefined range of motion.

26. The UID of claim 25, wherein the limiter assembly includes a plurality of limiting arms and corresponding limiting pockets.

27. A user interface device (UID), comprising:
a frame including a base assembly and a top assembly; wherein the top assembly is in a fixed position relative to the base assembly;
an actuator assembly disposed between the top assembly and the base assembly, the actuator assembly including:
an outer actuator element having a cylindrical shape;
an inner actuator element;
an outer spring array including a plurality of springs mechanically coupling the outer actuator element to the inner actuator element;
an inner spring array including a plurality of springs mechanically coupling the inner actuator element to the frame or to an element coupled to the frame;
and a plurality of magnets disposed on the outer actuator element in an equidistant circular array; and
a printed circuit board having a processing element and a plurality of multi-axis magnetic sensors, the printed circuit board disposed within the frame between the top assembly and the base assembly for sensing positional information associated with ones of the plurality of magnets and providing one or more sensor output signals corresponding to the sensed positional information to the processing element; wherein the processing element generates a UID output signal corresponding to a position, movement, displacement or deformation of the actuator assembly based at least in part on the multi-axis magnetic sensor outputs.

28. A method of providing a user interface device (UID) output signal to an electronic computing device or system, comprising:
sensing, at a plurality of sensors, positional information associated with corresponding sensed elements disposed on an actuator element of the UID and providing a plurality of sensor output signals to a processing element;
generating, in the processing element, based at least in part on the received plurality of sensor output signals, a UID output signal corresponding to a position, translation, displacement or deformation of the actuator assembly; and
providing the UID output signal to a communicatively coupled electronic computing device or system;
wherein the UID comprises:
a frame including a base assembly and a top assembly; wherein the top assembly is in a fixed position relative to the base assembly;
an actuator assembly disposed between the top assembly and the base assembly, the actuator assembly including:
an outer actuator element and an inner actuator element;
a plurality of springs mechanically coupling the actuator elements to the frame, the plurality of springs including an outer spring array coupled between the outer actuator element and the inner actuator element, and an inner spring array coupled between the inner actuator element and the frame or a core-join element fixedly coupled to the frame; and
a plurality of sensors disposed within the frame between the top assembly and the base assembly for sensing positional information associated with the actuator assembly and providing one or more sensor output signals corresponding to the sensed positional information.

29. The method of claim 28, wherein the sensors are multi-axis magnetic field sensors and the sensed elements are magnets.

* * * * *